United States Patent
Nakae

(10) Patent No.: US 8,656,161 B2
(45) Date of Patent: Feb. 18, 2014

(54) INFORMATION SHARING SYSTEM, INFORMATION SHARING METHOD, GROUP MANAGEMENT PROGRAM AND COMPARTMENT MANAGEMENT PROGRAM

(75) Inventor: Masayuki Nakae, Tokyo (JP)

(73) Assignee: NEC Corporation, Tokyo (JP)

( * ) Notice: Subject to any disclaimer, the term of this patent is extended or adjusted under 35 U.S.C. 154(b) by 1374 days.

(21) Appl. No.: 11/791,892

(22) PCT Filed: Nov. 30, 2005

(86) PCT No.: PCT/JP2005/021982
§ 371 (c)(1),
(2), (4) Date: May 30, 2007

(87) PCT Pub. No.: WO2006/059639
PCT Pub. Date: Jun. 8, 2006

(65) Prior Publication Data
US 2008/0052514 A1    Feb. 28, 2008

(30) Foreign Application Priority Data
Nov. 30, 2004 (JP) .................... 2004-346703

(51) Int. Cl.
H04L 29/06 (2006.01)
(52) U.S. Cl.
USPC ............................................. 713/168; 726/22
(58) Field of Classification Search
USPC ............................................. 713/168; 726/22
See application file for complete search history.

(56) References Cited

U.S. PATENT DOCUMENTS

| 6,986,046 B1* | 1/2006 | Tuvell et al. ................ 713/171 |
| 2004/0103202 A1* | 5/2004 | Hildebrand et al. ......... 709/229 |
| 2006/0053196 A1* | 3/2006 | Spataro et al. .............. 709/205 |

FOREIGN PATENT DOCUMENTS

| JP | 03-068042 | 3/1991 |
| JP | 05-181734 | 7/1993 |
| JP | 08-255132 | 10/1996 |
| JP | 2001-350663 | 12/2001 |
| JP | 2003-091660 | 3/2003 |
| JP | 2004-015530 | 1/2004 |
| JP | 2004-054779 | 2/2004 |
| JP | 2004-094958 | 3/2004 |

(Continued)

OTHER PUBLICATIONS

Yuichi Nakamura, "Selinux Nyumon Secure OS de Anzen na Sever o Kochiku suru", Nikkei Linux, vol. 5, No. 10, Nikkei Business Publications, Inc., Sep. 8, 2003, pp. 141 to 148.

(Continued)

Primary Examiner — Vu Le
Assistant Examiner — Tracy Mangialaschi
(74) Attorney, Agent, or Firm — Scully, Scott, Murphy & Presser, P.C.

(57) ABSTRACT

An information sharing system manages computing resources such as files and processes by virtually assigning them to a compartment that is a unique area identified by a group ID. As the information sharing system detects a file input event of an object by using the compartment, it authorizes only referring to files belonging to the same compartment or a lower order compartment. Additionally, as the information sharing system detects a file output event of an object, it allows files to be arranged within only the same compartment. By doing so, it is possible for remotely located users of a user group to share confidential information within the group and at the same time also share information ordinarily and more broadly.

18 Claims, 34 Drawing Sheets

(56) References Cited

FOREIGN PATENT DOCUMENTS

| | | |
|---|---|---|
| JP | 2004-227403 | 8/2004 |
| JP | 2004-272380 | 9/2004 |
| JP | 2004-529408 | 9/2004 |
| WO | 02/061554 | 8/2002 |

OTHER PUBLICATIONS

Reality Check: Security for Your Information Assets: Part III—The Trusted Solaris Advantage, [online], Dec. 20, 2003, Sun Microsystems, Inc., [retrieval date Feb. 14, 2006], Internet URL:http://www.sun.com/executives/realitycheck/reality-122003.html.

Shiro Ootsuru, "Zentaizo to Saishin Doko o Fukan suru Tameno Security Saishin Gijutsu Matrix Part 2-6 Trusted OS no Kino to Donyu no Point", Security Magazine vol. 8, Kabushiki Kaisha Shoeisha, Apr. 1, 2003, pp. 85 to 90.

Hiroshi Nagase et al., "Access Right Assignment Method which Based on Margin of Hierarchical Security Level", vol. 41, No. 8, Aug. 15, 2000, pp. 2255 to 2262.

* cited by examiner

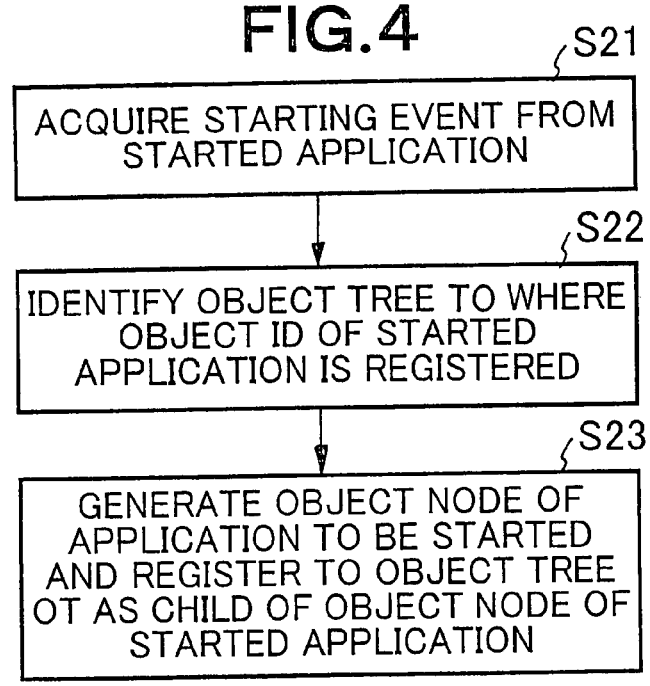
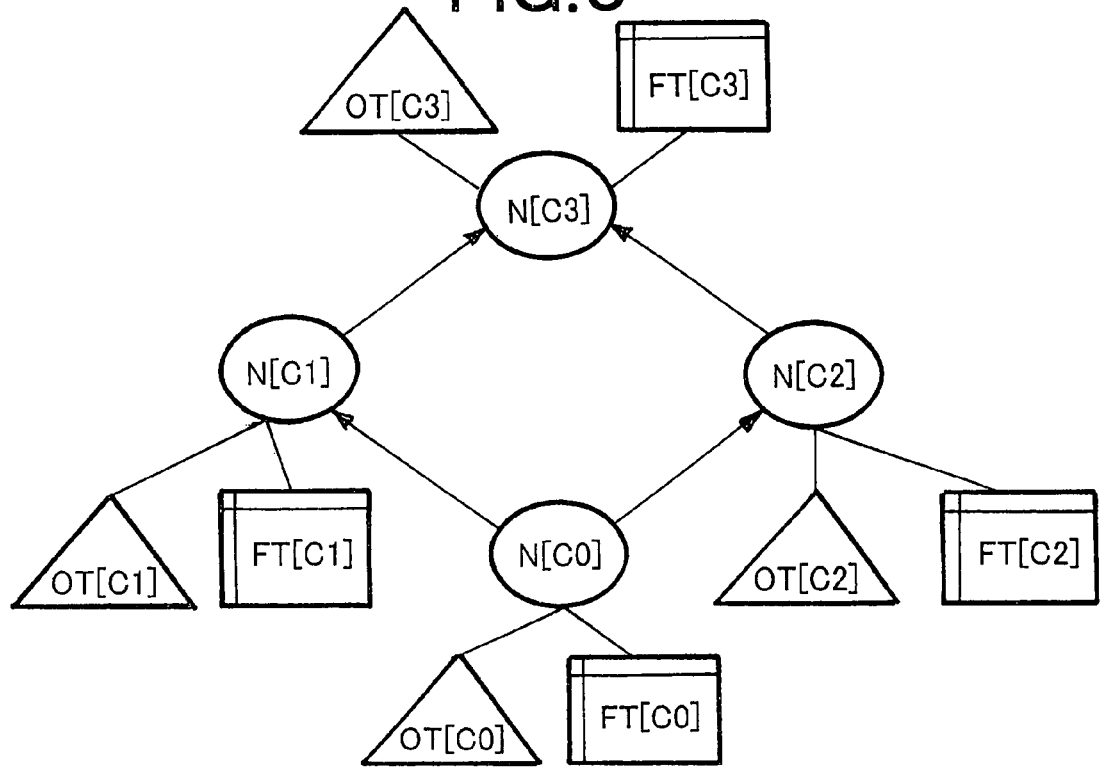

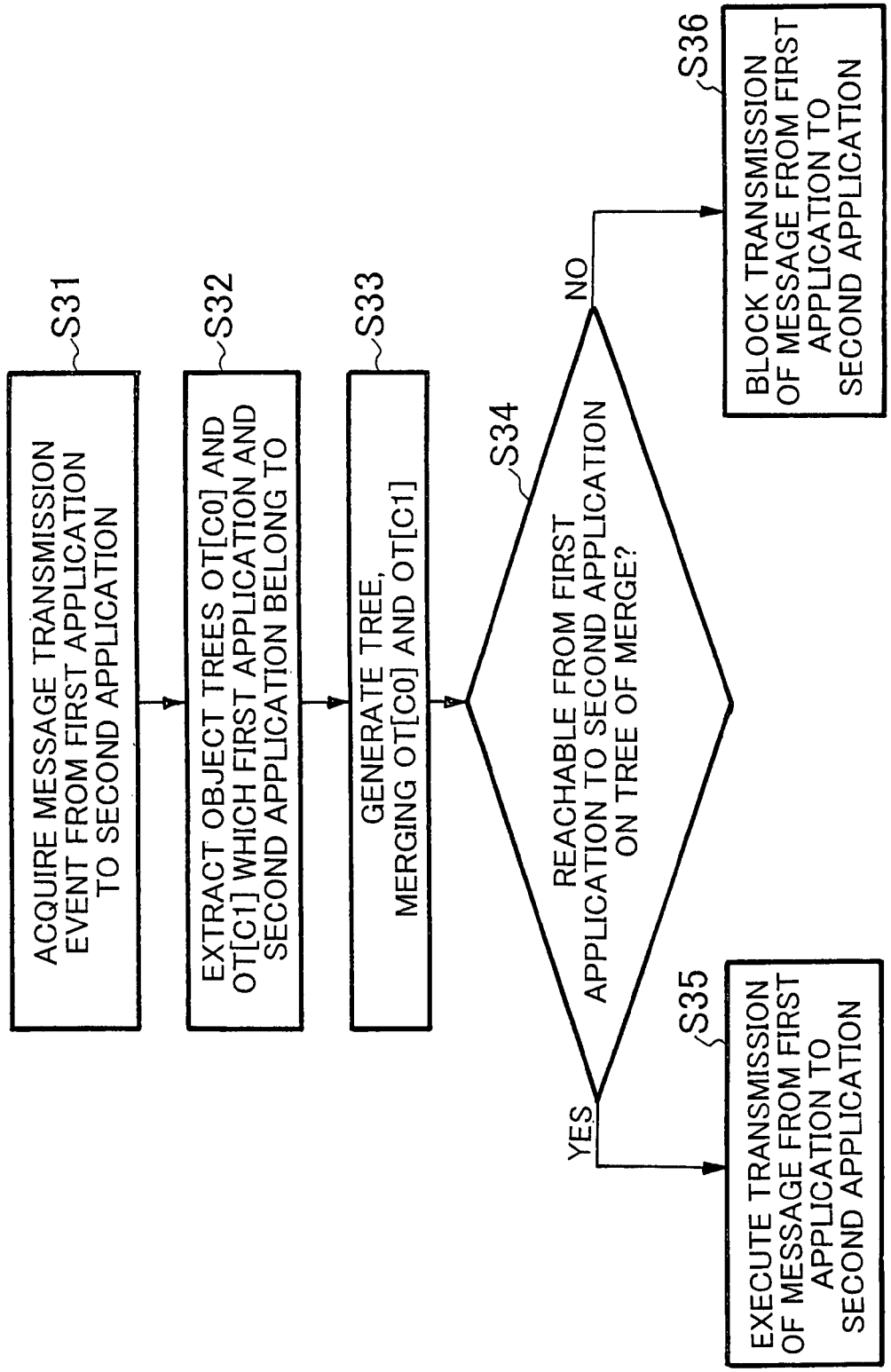

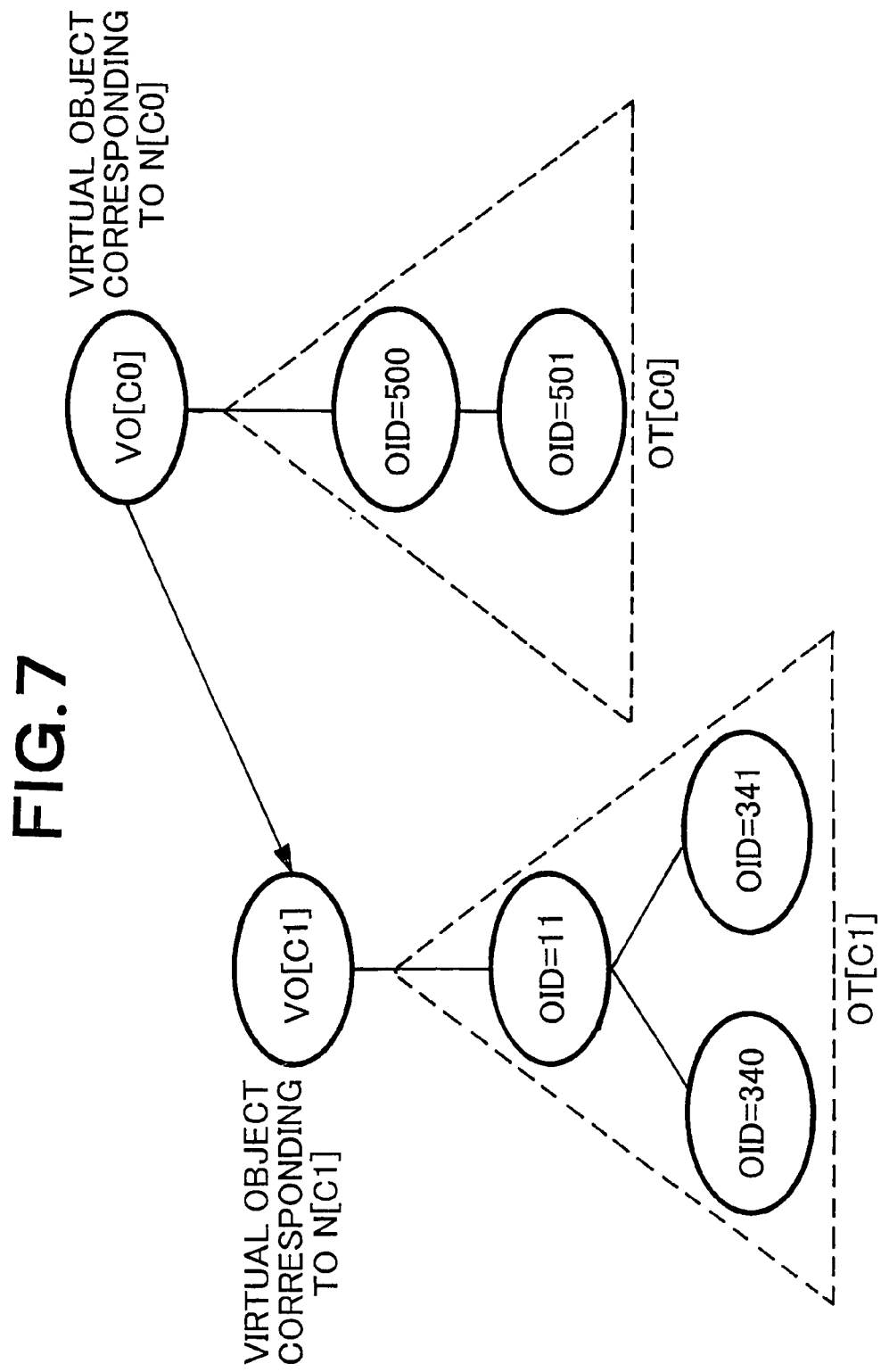

| FILE NAME | ARRANGEMENT ADDRESS |
|---|---|
| /dir1/dir1-1/file1 | 10350862 |
| /dir2/file2 | 8394 |

FT[C0]

| FILE NAME | ARRANGEMENT ADDRESS |
|---|---|
| /dir1/dir1-1/file1 | 374 |
| /dir2/file3 | 7035275 |

FIG.9

S41: ACQUIRE FILE LIST EVENT BY APPLICATION

S42: EXTRACT FILE ARRANGEMENT TABLE FT[C1] OF COMPARTMENT C1 WHICH APPLICATION BELONGS TO

S43: EXTRACT FILE ARRANGEMENT TABLE FT[C0] OF LOWER ORDER COMPARTMENT C0 RELATIVE TO COMPARTMENT C1, AND MERGE FILE ARRANGEMENT TABLES FT[C0] AND FT[C1]

S44: EXTRACT FILE NAME LIST FROM FILE ARRANGEMENT TABLE OF MERGE AND RETURN IT TO APPLICATION

FIG.11

S41b: ACQUIRE FILE READ EVENT BY APPLICATION

S42: EXTRACT FILE ARRANGEMENT TABLE FT[C1] OF COMPARTMENT C1 WHICH APPLICATION BELONGS TO

S43: EXTRACT FILE ARRANGEMENT TABLE FT[C0] OF LOWER ORDER COMPARTMENT C0 RELATIVE TO COMPARTMENT C1, AND MERGE FILE ARRANGEMENT TABLES FT[C0] AND FT[C1]

S45: READ FILE ENTITY ON SECONDARY MEMORY DEVICE, REFERRING TO LOGIC ADDRESS CORRESPONDING TO FILE NAME, FROM FILE ARRANGEMENT TABLE OF MERGE, AND RETURNS IT TO APPLICATION

FIG.12

S51: ACQUIRE FILE OUTPUT EVENT BY APPLICATION

S52: EXTRACT FILE ARRANGEMENT TABLE FT[C1] OF COMPARTMENT C1 WHICH APPLICATION BELONGS TO

S53: WRITE TO FILE ENTITY ON SECONDARY MEMORY DEVICE, REFERRING TO LOGIC ADDRESS CORRESPONDING TO FILE NAME, FROM FILE ARRANGEMENT TABLE FT[C1]

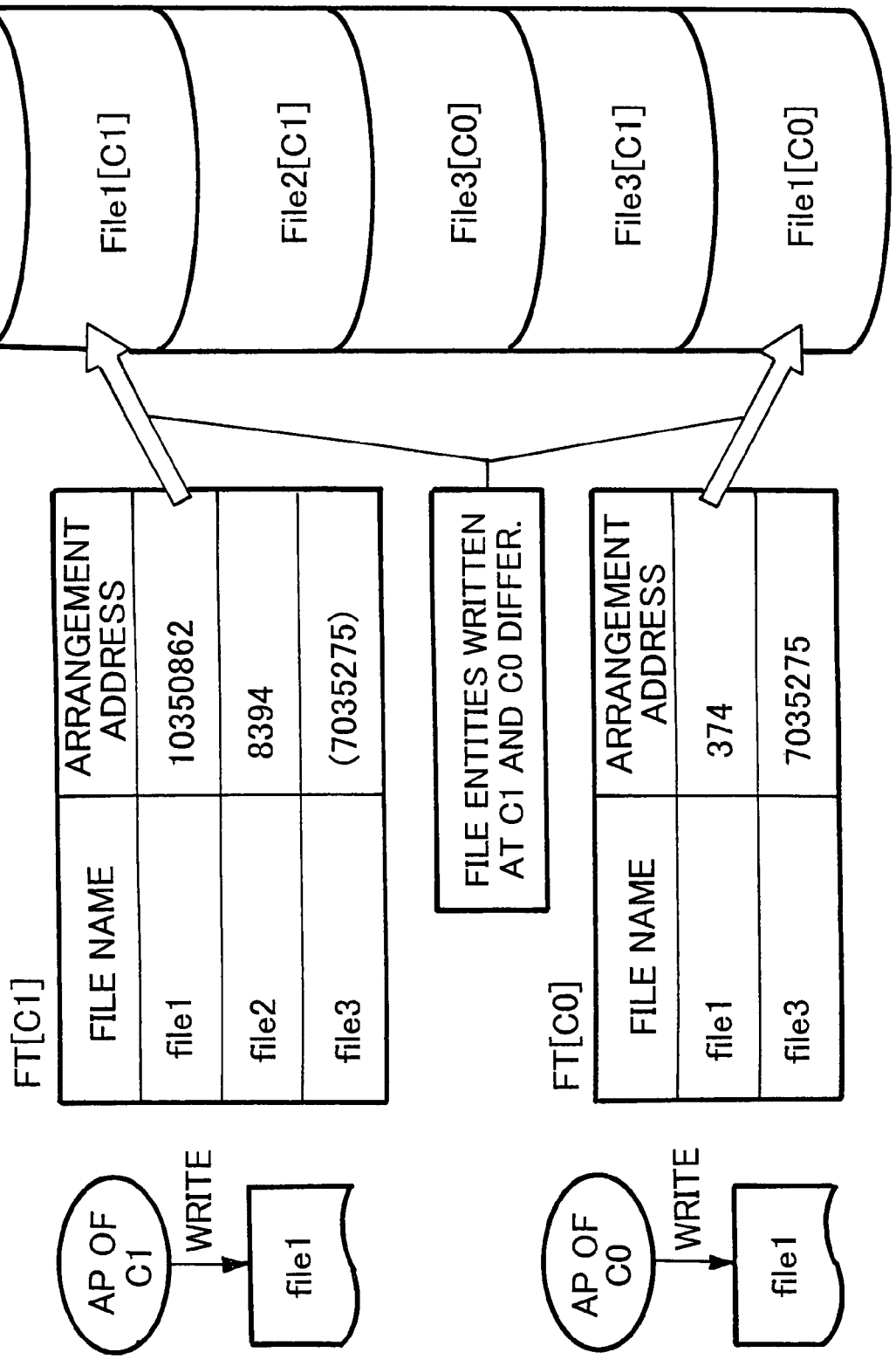

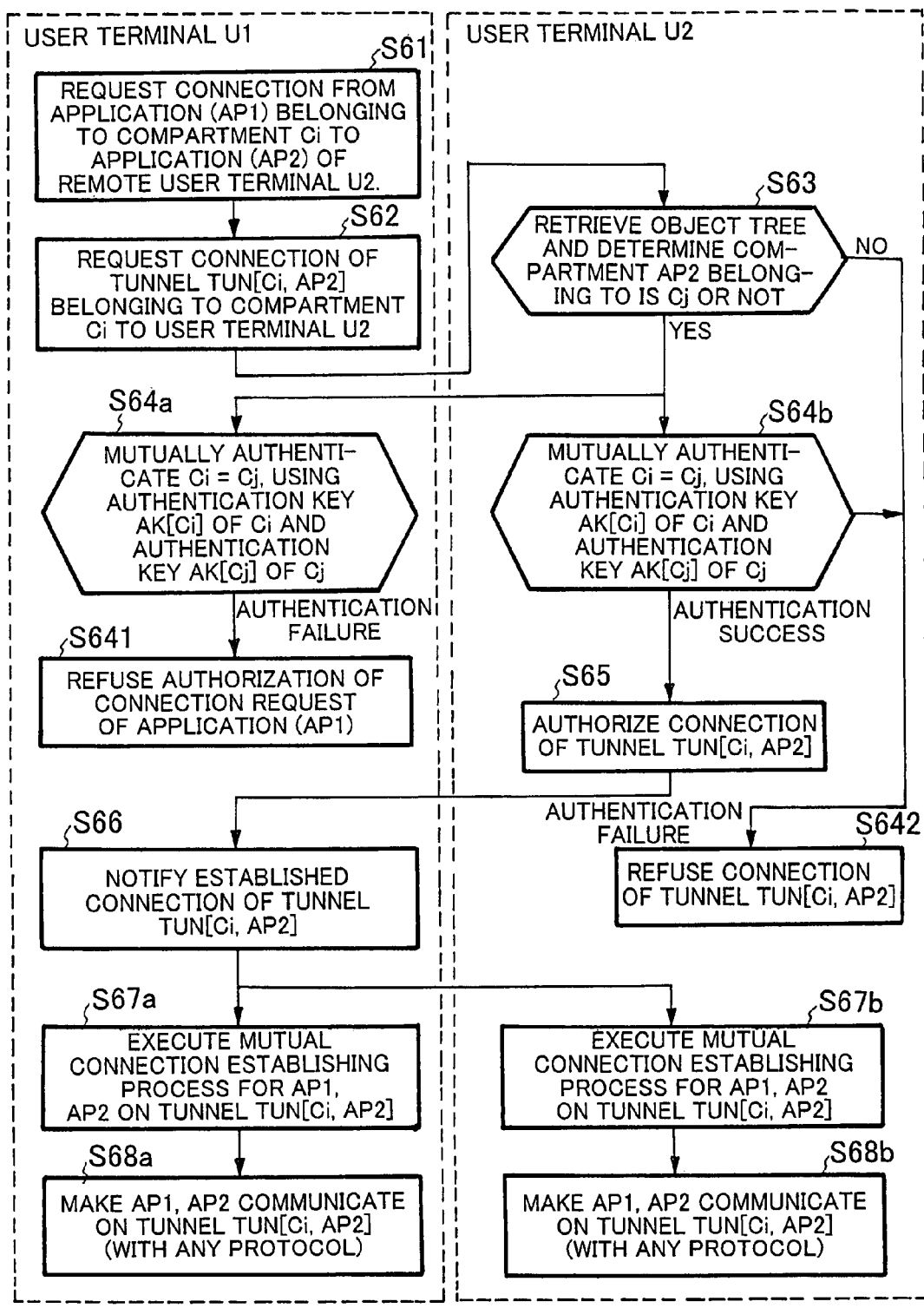

| GROUP ID | AUTHENTICATION KEY | MEMBER ID |
|---|---|---|
| Group-1 | A8BC0f | USER-1<br>USER-2<br>USER-3<br>CONF-SERV |
| Group-2 | 21AAB3 | USER-2<br>USER-4<br>USER-5<br>CONF-SERV |
| ⋮ | ⋮ | ⋮ |

FT[Group-1]

| FILE NAME | ARRANGEMENT ADDRESS |
|---|---|
| PROPOSAL | 374 |
| MINUTE | 7035275 |

FT[PUBLIC]

| FILE NAME | ARRANGEMENT ADDRESS |
|---|---|
| PAPER | 374 |
| PROPOSAL | 7035275 |

INFORMATION SHARING SYSTEM, INFORMATION SHARING METHOD, GROUP MANAGEMENT PROGRAM AND COMPARTMENT MANAGEMENT PROGRAM

TECHNICAL FIELD

The present invention relates to an information sharing system and an information sharing method for sharing information within a group. More particularly, the present invention relates to an information sharing system and an information sharing method that make it possible to share group information at remote areas, while preventing secrets from leaking. The present invention also relates to a server and a user terminal of an information sharing system. The present invention further relates to a group management program to be installed in a server of an information sharing system and a compartment management program to be installed in a user terminal of an information sharing system.

BACKGROUND ART

Multi-level security (MLS) systems are known as systems capable of preventing secrets from leaking, while allowing contents having a plurality of security levels to be edited and referred to.

For instance, Patent Document 1 describes an access right management control system for a file system that utilizes an MLS system. In fact, the Patent Document 1 shows an access control system for handling two or more than two security levels that utilize "access right numbers". With this system, only users can become subjects and objects are files on the table of a database or on a file system. Access right numbers are assigned in advance to both the object and the subjects. When a user tries to access a file in the system, the user is authorized to access the file when the user's access right number is less than the access right number of the file but rejected to access the file when the user's access right number is not less than the access right number of the file.

Patent Document 2 describes a method of securely transferring data and a security level change selection mechanism as a method utilizing an MLS system. More specifically, the Patent Document 2 describes an MLS-based copy & paste control system that can be used in an X window system where each window has a security level. An MLS-based copy & paste control system is a system where copy & paste from a window of an unclassified level to a window of a secret level is authorized but copy & paste in the other way is not authorized or the destination window is raised to the secret level for paste. The Patent Document 2 also shows an installation system of relaying all inter-window communications for copy & paste by a given "selection manager", using a uniformly expanded X server, and collectively managing paste control operations according to security levels.

Patent Document 3 describes an information processing apparatus that utilizes an MLS system. The information processing apparatus supports the MLS having two-dimensional security levels by using an operating system (OS). The two-dimensional security levels are expressed by means of a combination (1, n) of an access right level 1 and an access right range n. The access right level 1 is a value that can be compared for magnitude and the access right range n is a character string that only defines a same value relationship. A security level is defined in the form of a combination (1, n) for a process and a file. For instance, assume that a process of security level (P1, Pn) tries to access a file of security level (F1, Fn). Then, the information processing apparatus authorizes the access of the process to the file only when the relationships of "P1≥F1" and "Pn=Fn" hold true.

Of the above-described security levels, the access right level may typically take a value that indicates "secret" or "unclassified". On the other hand, access right ranges may be interpreted as categories of information having different properties. Two-dimensional security levels are employed in the information processing apparatus described in the Patent Document 3 by combining an access right level and an access right range. With this arrangement, when two information categories of "personal information" and "technological information" are handled as access right ranges for security levels, it is possible to manage confidential information in each of such information categories as independent confidential information. For example, if there is a process by way of which it is possible to access a file belonging to the information category of "personal information" in terms of the access right range of security level, it is not possible to access any file belonging to the information category of "technological information" in terms of the access right range of security level by way of such a process.

Patent Document 1: JP 5-181734-A (Paragraphs 0028-0030, FIG. 8)

Patent Document 2: JP 8-255132-A (Paragraphs 0020-0024, FIGS. 1, 4)

Patent Document 3: JP 2001-350663-A (Paragraphs 0039-0047, FIGS. 1, 7)

DISCLOSURE OF THE INVENTION

Problems to be Solved by the Invention

With any of the above cited known security protection techniques using an MLS system, it is not possible to control secret transmissions to remote user terminals because security protection is limited to handlings of the files in each user terminal. Therefore, it is difficult to reliably protect confidential information in a group when the information is remotely shared within the group by means of a network.

Additionally, with any of the above-cited known security protection techniques, it is not possible to synchronously handle the relationship between the inclusive relations among groups and the settings of the security levels of pieces of information. In other words, when there are a plurality of groups, it is difficult to prevent secrets from leaking to unrelated groups (e.g., out of a company), while allowing a relatively large group and partial groups belonging to the large group to freely share information and also allowing the members of a closed group to share information. For example, it is not possible to handle the pieces of information that are limitedly shared in each division, while referring to the information being shared in a company.

As described above, with the known techniques using an MLS system, it is only possible to control handlings of files by means of an application (AP) in each user terminal. In other words, it is not possible to centrally control accesses to contents among a plurality of remotely located user terminals. Additionally, when there are a number of user groups, information may be shared within a group or among groups. Then, it is not possible to centrally define the control of accesses to contents by defining security levels.

It is therefore an object of the present invention to make it possible to reliably protect confidential information within a group when the information is shared among remote areas via a network.

Another object of the present invention is to prevent secrets from leaking to unrelated groups, while allowing a relatively large group and partial groups belonging to the large group to freely share information and also allowing the members of a closed group to share information.

Means for Solving the Problems

According to the present invention, the above objects are achieved by providing an information sharing system using a computer for sharing information within groups, characterized by comprising: a group management means configured to: manage the correspondence relations between each of the groups and the members belonging to the group; and output group identification information for identifying at least one of the groups in response to an input of member identification information for identifying the members; a compartment generation means configured to generate a compartment that is region virtually partitioned and dedicated to a group, so as to associate and assign computing resources including software and files in the computer to the group based on the group identification information, the compartment being so configured as to make the relationship among the groups analyzable; and a monitoring means configured to: monitor the operation of the application software accessing the computing resources; analyze the belonging relation of the compartment and the application software; and control authorization/non-authorization of execution of the input/output process between the application software and the computing resources based on the result of the analysis.

The group management means is typically realized by the control section of a group management server and a group management database. The computing resources typically include files, processes and networks. The compartment generation means is typically realized by a compartment configuration management means that operates according to a directive of a compartment generation directing means. The member identification information is typically a member ID. The group identification information typically includes a group ID and an authentication key. The monitoring means typically authorizes an input/output process between pieces of application software in a same compartment and prohibits any input/output process to and from a different compartment.

Preferably, the group management means is arranged in a server and the compartment generation means and the monitoring means are arranged in a user terminal communicably connected to the server via a communication network. With this arrangement, the group management means associates the group identification information for identifying the group and the member identification information for identifying the members and accumulates these pieces of information. Upon receiving the member identification information from the user terminal, the group management means extracts the group identification information corresponding to the received member identification information and transmits the extracted group identification information to the user terminal via the communication network. The compartment generation means generates the compartment based on the group identification information received from the group management means. The monitoring means monitors the operation of the application software installed in the user terminal, detects an event of the application software, identifies the compartment to, which the application software of which the event is detected belongs and controls authorization/non-authorization of execution of an input/output process corresponding to the event between the application software and the computing resources based on the identified compartment. Preferably, the server is a group management server.

In the above-described arrangement, the information sharing system may be adapted to monitor application operation events relating to starting other new application software by the application software and operations for devices for inputting/outputting files and accessing networks at each of the user terminals connected to each other via the communication network.

Preferably, the information sharing system further comprises a server for managing user groups having a secret and the constitution of the members and is adapted to deliver in advance a sequence of a group ID and an authentication key (group ID/authentication key sequence) as group identification information to the monitoring means of the user terminals of the member belonging to a same group. The monitoring means that receives the delivered group ID/authentication key sequence virtually generates a compartment that is a unique area identified by a group ID as destination of assignment of computing resources such as application software, files and networks. The monitoring means manages the partial order relation relating to the security levels of the compartments and controls accesses of the application software to the computing resources based on the rules as listed below, monitoring the operation of the application.

(1) The application software that belongs to compartment A can access the computing resources belonging to the same compartment A for reading and writing. (2) When the compartment A has a security level higher than some other compartment, or compartment B, the application software belonging to the compartment A can access the computing resources belonging to the compartment B only for reading. (3) When the compartment A has a security level lower than some other compartment, or compartment C, the application software belonging to the compartment A can access the computing resources belonging to the compartment C only for writing. (4) Accesses to the computing resources belonging to compartments having no higher order/lower order relationship are totally prohibited.

Since accesses are controlled according to the above rules (1) through (4), the monitoring means of each user terminal assigns an object such as a process or a window of application software to an appropriate compartment each time a starting event of the application software is detected. Then, the monitoring means authorizes only referring to the file or files of the same compartment or a compartment of a lower order than the same compartment for a file read event of the object. Additionally, the monitoring means has a file or files arranged in the same compartment for a file write event of the object.

With the above-described arrangement, it is possible to prevent confidential information of a particular group from leaking to some other group when a user who belongs to a plurality of groups refers to or edit pieces of confidential information in more than one group at the same time. It is also possible to preserve the files in a lower order compartment when a file in the lower order compartment that is authorized to be shared more broadly is arranged in an upper order compartment where information can be shared only within a more limited scope. Therefore, the user would not unintentionally narrow the scope of sharing and hence information can be freely shared.

When the monitoring means of a user terminal detects a network connection event from the application software belonging to a particular compartment to the application software of some other user terminal, the monitoring means of the two terminals start the communication process for the two pieces of application software only after mutually authenticating that the two pieces of application software belong to the particular compartment for sure. With this arrangement, it is possible for remotely located members of a same group to share confidential information in security.

The group management means may be adapted to output a combination of at least one or more than one group IDs and an authentication key as group identification information based on member identification information.

The monitoring means may be adapted to control authorization or non-authorization of execution of at least a file input/output event or a network input/output event based on the belonging relation of a compartment and a piece of application software. With such an arrangement, it is possible to control authentication or non-authorization of a file input/output process between two pieces of application software.

The compartment generation means may be adapted to generate a compartment by generating predetermined configuration information based on group identification information. With such an arrangement, it is possible to virtually generate a compartment by generating predetermined configuration information. Predetermined configuration information has compartment nodes that form nodes as elements of a graph showing a data structure and also an object tree and a file arrangement table as attributes thereof. An object tree shows the tree structure of the objects that correspond to application software. A file arrangement table shows information on the locations where files are stored.

Preferably, the group management means includes a means for generating an adjacency matrix showing the inclusion relation of a group and some other group and the compartment generation means includes a means for defining the order relation between compartments by adding a directed edge between the generated compartments based on the generated adjacency matrix.

With the above-described arrangement, the group management server of an information sharing system may have a group alteration means and manages alterations to the members of any group. An information sharing system may further comprise a group relation computation means that generates a group ID/authentication key sequence by referring to the group management database each time it receives a request for a group ID/authentication key sequence from a user terminal. The group relation computation means may generate an adjacency matrix showing the inclusion relation of the groups and sends it to the requesting user terminal.

Preferably, upon receiving the group ID/authentication key sequence and the adjacency matrix, the user terminal prepares a compartment that corresponds to the group ID. Preferably, the user terminal refers to the adjacency matrix and defines the security level of the compartment of a smaller group so as to make it higher than the security level of the compartment of a broader group that includes the former compartment without fail.

With the above-described arrangement, it is possible to allow the broader group and the smaller group to freely share information in addition to allowing the members of a closed group to share information and at the same time prevent secrets from leaking to unrelated groups (e.g., groups outside a company). For example, it is possible to handle information that is shared within a department in a limited manner, referring to the information that is shared in an entire company.

Preferably, the monitoring means includes a compartment configuration graph management means for managing a compartment configuration graph of nodes and edges connecting the nodes as a graph of a data structure showing the belonging relation of compartments and pieces of application software. This means is realized by, for example, the compartment configuration management means. The expression that compartment configuration graph management means manages "the compartment configuration graph" means that the compartment configuration graph management means holds the compartment configuration graph and updates the compartment configuration graph each time when an event of application software is detected.

Preferably, the monitoring means includes a file access control means for limiting the range of files that application software can access to the files belonging to the compartment to which the application software belongs or to the lower order compartment relative to the former compartment. The file access control means may be realized by the compartment configuration management means. With such an arrangement, it is possible to prevent information from leaking to unrelated groups when application software accesses a file.

Preferably, the monitoring means includes a messaging control means for limiting the range within which the application software can transmit a message in a same host computer to the compartment to which the application software belongs or to application software belonging to any of lower order compartments relative to the former compartment based on the compartment configuration graph. The messaging control means can be realized by the compartment configuration management means. With such an arrangement, it is possible to prevent information from leaking to unrelated groups when application software transmits a message within a same host.

Preferably, the monitoring means includes a network access control means for limiting the range within which application software can transmit a message in a same host computer or some other computer other than the host computer connected via a network to the pieces of application software belonging to the same compartment. The network access control means may be realized by the compartment configuration management means. With such an arrangement, it is possible to prevent information from leaking to unrelated groups when application software transmits a message via a network.

Preferably, the monitoring means includes a compartment management means for altering the compartment to which a piece of application software belongs and managing the files of each compartment according to a directive from the user. The compartment management means may be realized by the compartment configuration management means that operates according to a directive from the compartment rearrangement directing means. With such an arrangement, it is possible to update the compartment each time when the group is altered.

Preferably, the group management means includes a group alteration means for preparing a new group, deleting a group, adding a member and excluding a member.

The server of an information sharing system for sharing information within a group according to the present invention is a server (e.g., a group management server) adapted to manage the correspondence relation of the group and the members belonging to the group and includes a group management means for outputting a combination of at least one or more than one group IDs and an authentication key upon receiving member identification information for identifying a member. The server may be realized by the group management server.

The server of an information sharing system according the present invention may include an adjacency matrix generation means for generating an adjacency matrix showing the inclusion relation of a group and some other group. With such an arrangement, when there is a plurality of groups, it is possible to prevent confidential information from leaking to unrelated groups, while allowing a broader group and a smaller partial group thereof to freely share information and also allowing the members of a closed group to share information.

The user terminal of an information sharing system according to the present invention is a user terminal of an information sharing system for sharing information within a group and includes a compartment generation means for generating a compartment that is a partition or a region virtually partitioned and dedicated to a group in order to associate and assign computing resources including software and files in the computer of the user terminal to the group according to the combination of a group ID and an authentication key for identifying the group, the compartment being so configured as to make the relationship among the groups analyzable, and a monitoring means for monitoring the operation of the application software and controlling authorization/non-authorization of execution of at least either a file input/output event or a network input/output event based on the belonging relation of each compartment and application software.

Preferably, the user terminal of an information sharing system according to the present invention includes an adjacency matrix generation means for generating an adjacency matrix showing the inclusion relation of a group and some other group and a directed edge adding means for defining the order relation among compartments by adding one or more than one directed edges among the compartments generated by the compartment generation means based on the adjacency matrix generated by the adjacency matrix generation means. With such an arrangement, when there is a plurality of groups, it is possible to prevent confidential information from leaking to unrelated groups, while allowing a broader group and a smaller partial group thereof to freely share information and also allowing the members of a closed group to share information.

In another aspect of the present invention, there is provided an information sharing method of sharing information within groups by means of an information sharing system having a server and a user terminal communicably connected to the server via a communication network, characterized by comprising: a step for the server to manage the correspondence relations of the group and the members belonging to the group and transmit a combination of at least one or more than one group IDs and an authentication key to the user terminal via the communication network upon receiving member identification information for identifying a member; a step for the user terminal to generate a compartment, or a region virtually partitioned and dedicated to a group, in order to associate and assign computing resources including software and files in the computer to the group, the compartment being so configured as to make the relationship among the groups analyzable, corresponding to each combination of a group ID and an authentication key received from the server; a step for the user terminal to generate a compartment configuration graph of nodes and edges connecting the nodes as a graph of a data structure including at least order relations among compartments, a belonging relation between a compartment and application software or a belonging relation between a compartment and a file; and a step for the user terminal to monitor the operation of the application software and control authorization or non-authorization of execution of at least a file input/output event or a network input/output event based on the compartment configuration graph.

Preferably, an information sharing method further comprises: a step for the server to generate an adjacency matrix showing the inclusion relation between the group and a group other than the group upon receiving the member identification information; a step for the server to transmit the generated adjacency matrix to the user terminal via the communication network along with the combination of a group ID and an authentication key; a step for the user terminal to generate a compartment configuration graph based on each combination of a group ID and an authentication key and the adjacency matrix received from the server; and a step for the user terminal to monitor the operation of the application software and control authorization/non-authorization of execution of the application software so as to authorize an access to and read the information belonging to the compartment of a group based on the generated compartment configuration graph from the application software belonging to the compartment of some other group including the former group. With the above-described arrangement, when there is a plurality of groups, it is possible to prevent confidential information from leaking to unrelated groups, while allowing a broader group and a smaller partial group thereof to freely share information and also allowing the members of a closed group to share information.

In still another aspect of the present invention, there is provided a group management program to be used by an information sharing system for sharing information within a group, characterized by causing a computer to manage the correspondence relation of the group and the members belonging to the group and execute a group management process of generating a combination of at least one or more than one group ID and an authentication key upon receiving member identification information for identifying a member.

Preferably, a group management program according to the present invention causes a computer to execute an adjacency matrix generation process of generating an adjacency matrix showing the inclusion relation of a group and some other group. With such an arrangement, when there is a plurality of groups, it is possible to prevent confidential information from leaking to unrelated groups, while allowing a broader group and a smaller partial group thereof to freely share information and also allowing the members of a closed group to share information.

In another aspect of the present invention, there is provided a compartment management program to be used by an information sharing system for sharing information within a group, characterized by causing a computer to execute: a process of managing compartments for associating computing resources to a group and assigning them and generating a compartment, or a region virtually partitioned and dedicated to a group, in order to associate and assign computing resources including software and files in the computer to the group, the compartment being so configured as to make the relationship among the groups analyzable, corresponding to each combination of a group ID and an authentication key; a process of generating a compartment configuration graph of nodes and edges connecting the nodes as a graph of a data structure including at least one piece of information of order relations among compartments, a belonging relation between a compartment and application software or a belonging relation between a compartment and a file; and a process of monitoring the operation of the application software and controlling authorization or non-authorization of execution of at least a file input/output event or a network input/output event based on the compartment configuration graph.

Preferably, a compartment management program according to the present invention causes a computer to execute a process of generating a compartment configuration graph as a graph of a data structure including at least one piece of information of order relations among compartments, a belonging relation between a compartment and application software or a belonging relation between a compartment and a file based on each combination of a group ID and an authentication key and an adjacency matrix. With such an arrangement, when there is a plurality of groups, it is possible to prevent confidential information from leaking to unrelated groups, while allowing a broader group and a smaller partial group thereof to freely share information and also allowing the members of a closed group to share information.

Advantages of the Invention

Thus, according to the present invention, the computing resources in a computer are associated with a compartment, or a region virtually partitioned and dedicated to a group and managed, the compartment being so configured as to make the relationship among the groups analyzable. Thus, it is possible for remotely located members of a same group to share information and reliably protect confidential information within the group reliably for the purpose of security. Additionally, when there is a plurality of groups, it is possible to prevent confidential information from leaking to unrelated groups, while allowing a broader group and a smaller partial group thereof to freely share information and also allowing the members of a closed group to share information.

BRIEF DESCRIPTION OF THE DRAWINGS

FIG. 4 is a flowchart of a process that a user terminal can execute for a starting event of an application of the first embodiment;

FIG. 5 is a schematic illustration of a compartment configuration graph that can be used for the first embodiment;

FIG. 6 is a flowchart of a process that a monitoring means can execute when a message is transmitted from the first application to the second application in the first embodiment;

FIG. 7 is a schematic illustration of a merged object tree that can be used for the first embodiment;

FIG. 8 is a schematic illustration of file arrangement tables of compartments in the compartment configuration graph of the first embodiment;

FIG. 9 is a flowchart of a process that a monitoring means can execute when an application surveys files in the first embodiment;

FIG. 11 is a flowchart of a process that a monitoring means can execute when an application reads a file in the first embodiment;

FIG. 12 is a flowchart of a process that a monitoring means can execute when an application makes an alteration such as writing in a file in the first embodiment;

FIG. 13 is a schematic illustration of the relationship between a file arrangement table and a file entity on a secondary memory device in the first embodiment;

FIG. 14 is a flowchart of a process that can be executed when two user terminals connected to each other via a network communicate with each other in the first embodiment;

EXPLANATION OF REFERENCE SYMBOLS

Figure 1:
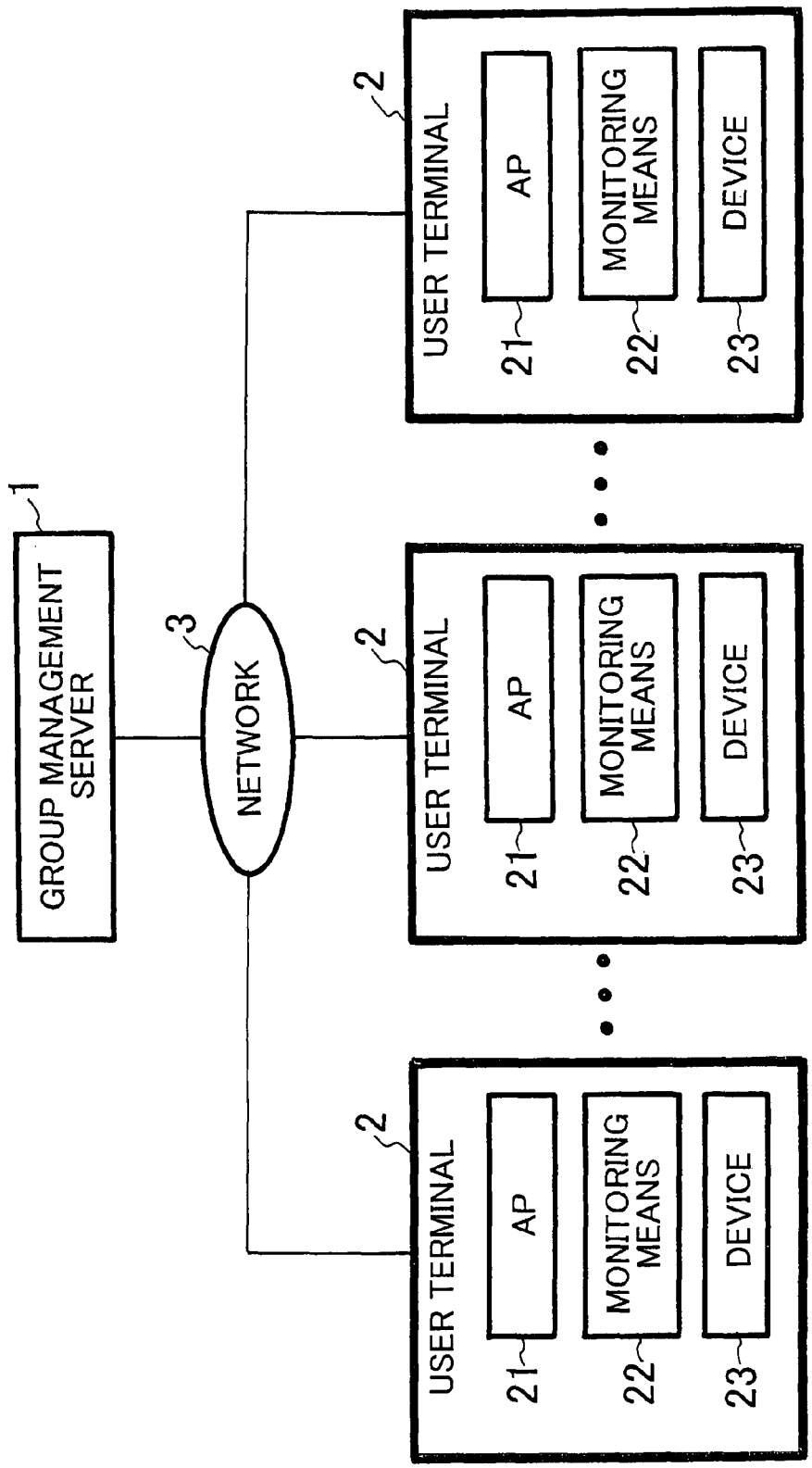
FIG. 1 is a schematic block diagram of a first embodiment of information sharing system according to the present invention, showing a possible configuration thereof.

1: group management server
2: user terminal
3: network
4: teleconferencing server
11: communication interface means
12: group management database
13: group alteration means
14: group relation computation means
21: application
22: monitoring means
23: device
221: event acquisition means
222: compartment generation directing means
223: compartment configuration management means
224: device control means
225: compartment rearrangement directing means
226: compartment switching means
231: network device
232: primary memory device
233: secondary memory device
234: display device
235: input device
411: moving image delivery application
412: file sharing application

BEST MODE FOR CARRYING OUT THE INVENTION

Now, the present invention will be described in greater detail by referring to the accompanying drawings that illustrate preferred embodiments of the invention.
(First Embodiment)

Firstly, the first embodiment of the present invention will be described by referring to the related drawings. FIG. 1 is a schematic block diagram of the first embodiment of information sharing system, showing a possible configuration thereof. As shown in FIG. 1, the information sharing system comprises a group management server 1 and a plurality of user terminals 2. Also as shown in FIG. 1, in the information sharing system, at least a group management server 1 and at least two user terminals 2 are communicably connected to each other via a network 3 such as the Internet.

Referring to FIG. 1, various pieces of application software (to be referred to simply as application (AP) hereinafter) 21 are installed in each of the user terminals 2 for operation and each of the user terminals 2 is equipped with a monitoring means 22 and various devices (to be referred to collectively as device hereinafter) 23. Using the monitoring means 22, the user terminals 2 monitors input/output operations that take place between the application 21 and the device 23 and blocks unauthorized copying and transfers of and references to information among compartments (which will be described in greater detail hereinafter) that correspond to groups.

Figure 2:
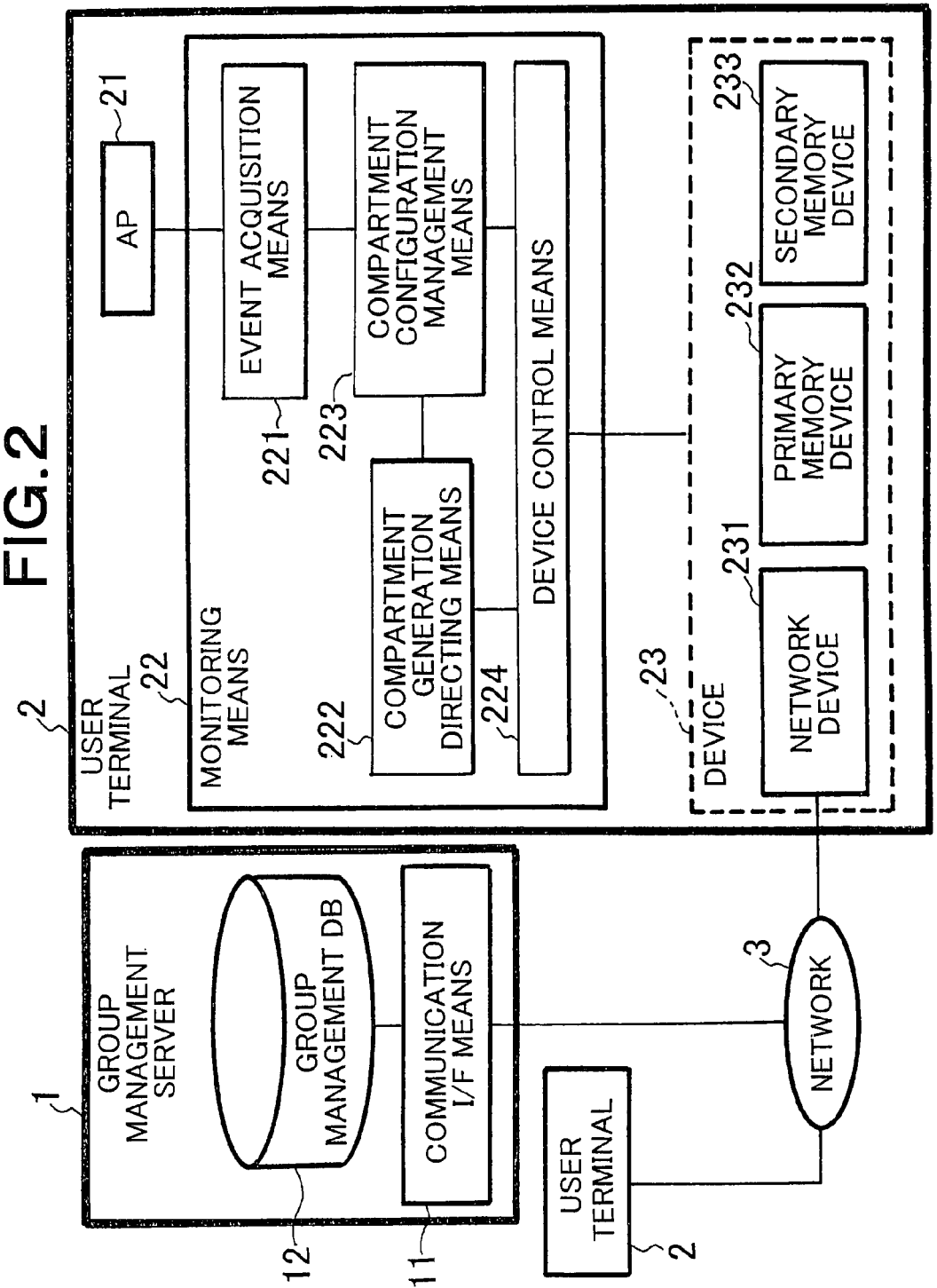
FIG. 2 is a schematic block diagram of the group management server and the user terminals of the first embodiment, showing a possible configuration thereof.

FIG. 2 is a schematic block diagram of the group management server 1 and the user terminals 2 of the first embodiment, showing a possible configuration thereof. The group management server 1 may typically be a server run by an information sharing management business operator that provides information sharing management services of managing information sharing within groups. To be more specific, the group management server 1 is an information processing apparatus, which may be a computer having a CPU (central processing unit) such as a workstation or a personal computer operating under the control of programs. As shown in FIG. 2, the group management server 1 is equipped with a communication interface (I/F) means 11 and a group management database (DB) 12 in addition to a control section (not shown) for controlling the overall operation of the group management server 1.

The communication interface means 11 has a function of transmitting/receiving data via the network 3. In this embodiment, the communication interface means 11 receives member IDs for identifying members, or users, via the network 3. Additionally, the group management server 1 has a function of extracting the group ID and a predetermined authentication key for identifying the group to which the members belong and delivering the group ID and the authentication key it extracts to user terminals 2. In this embodiment, the communication interface means 11 transmits the group ID and the authentication key that are extracted to user terminals 2 via the network 3.

The group management database 12 is a database that holds the relationship of the group ID, the authentication key and the member IDs. In this embodiment, the group management database 12 associate the group ID, the authentication key and the member IDs with each other, and stores them. In this embodiment, the group management server 1 extracts the group ID and the authentication key that corresponds to a member ID in response to the request from the communication interface means 11, and returns them to the communication interface means 11.

Each of the user terminals 2 is an information processing terminal formed by a computer having a CPU such as a personal computer operating under the control of programs. As shown in FIG. 2, each of the user terminals 2 functionally includes various applications (to be referred to collectively as application hereinafter) 21, a monitoring means 22 and various devices (to be referred to collectively as device hereinafter) 23. The devices 23 include at least a network device 231, a primary memory device 232 and a secondary memory device 233.

The monitoring means 22 is specifically realized by the CPU of the user terminal 2 that operates according to preset programs. As shown in FIG. 2, the monitoring means 22 functionally includes an event acquisition means 221, a compartment generation directing means 222, a compartment configuration management means 223 and a device control means 224.

The event acquisition means 221 has a function of detecting an event of the application 21 and delivering the detected event to the compartment configuration management means 223. For example, the event acquisition means 221 acquires (detects) an operation event relating to the start of the application 21 or an input to or an output from the device 23 by means of a predetermined method, and transmits (outputs) the acquired event to the compartment configuration management means 223. A method that is generally referred to as event hook may be used as the method of detecting an operation event of the application 21.

The compartment generation directing means 222 is connected to the network 3 via the device control means 224 and the network device 231. The compartment generation directing means 222 has a function of receiving the delivery of the group ID and the authentication key of the group to which the user of the user terminal 2 belongs from the group management server 1 via the device control means 224 and the network device 231. The compartment generation directing means 222 also has a function of directing the compartment configuration management means 223 to generate a compartment having the group ID and the authentication key that are received.

The expression of "compartment" as used in this letter of specification refers to a region dedicated to a group that is virtually partitioned in order to associate and assign computing resources including software and files in a computer to a group and corresponds to a partition formed in such a way that the relations among groups can be analyzed there. For instance, a "compartment" is a region particularly belonging to a group that is identified by a group ID. More specifically, a "compartment" is a partition of a file or an object formed on a group by group basis, each group sharing information, and indicates a concept of a set of resources where computing resources contained in a computer are partitioned. Computing resources contained in a computer typically include processes (applications, windows and objects) and one or more than one networks (sharing ranges). In this embodiment, the compartment configuration management means 223 generates configuration information for forming a compartment according to a directive of the compartment generation directing means 222 as will be described hereinafter. Thus, a compartment is virtually generated.

The compartment configuration management means 223 has a function of generating configuration information for forming a compartment according to the directive of the compartment generation directing means 222 and holding the generated configuration information of the compartment. The compartment configuration management means 223 also has a function of identifying the compartment to which an object, a file or an application belongs according to the operation event input from the event acquisition means 221. For example, the compartment configuration management means 223 identifies the compartment to which an object arranged on the primary memory device 232, a file arranged on the secondary memory device 233 or an application on some other user terminal 2 connected via the network device 231 belongs.

The compartment configuration management means 223 additionally has a function of detecting an unauthorized data flow among compartments and, upon detecting an unauthorized data flow, blocking the operation event that corresponds to the data flow. The compartment configuration management means 223 still additionally has a function of handing over the operation event corresponding to a data flow that is found to be an authorized data flow among compartments to the device control means 224. In this embodiment, when the data flow attributable to an operation event is a data flow within a same compartment or a data flow from a lower order compartment to a higher order compartment, the compartment configuration management means 223 transfers the operation event to the device control means 224.

The device control means 224 has a function of controlling the device 23 based on the information (compartment configuration information) that the compartment configuration management means 223 holds for the operation event transferred from the compartment configuration management means 223. In this embodiment, the device control means 224 executes a process of establishing a tunnel among and mutually authenticating monitoring means 22 when applications 21 communicate with each other via network devices 231 based on the configuration information of a compartment. Additionally, the device control means 224 executes a messaging process among objects stored in the primary memory device 232 or a process of inputting to or outputting from a file entity stored in the secondary memory device 233 based on the compartment configuration information.

The network device 231 has a function of transmitting/receiving data via the network 3 according to directives of the device control means 224. The primary memory device 232 stores various objects. The secondary memory device 233 stores various files.

In this embodiment, the memory device (not shown) of the group management server 1 stores various programs for managing groups. For example, the memory device of the group management server 1 stores a group management program for causing a computer to execute a group management process of generating at least one or more than one combinations of a group ID and an authentication key in response to an input of member identification information for identifying members.

In this embodiment, the memory device (not shown) of the user terminal 2 stores various programs for generating and managing compartments. The memory device of the user terminal 2 stores a compartment management program for causing a computer to execute a compartment generation process of generating a compartment configuration graph containing information on the compartments corresponding to the respective combinations of a group ID and an authentication key, the order relationship at least among compartments, the belonging relationship of compartments and application software or the belonging relationship of compartments and files and an access control process of monitoring the operation of application software and controlling authorization and non-authorization of execution of at least file input/output events or network input/output events based on the compartment configuration graph.

Now, the operation of this embodiment will be described below.

(Operation of Compartment Generation)

Figure 3:
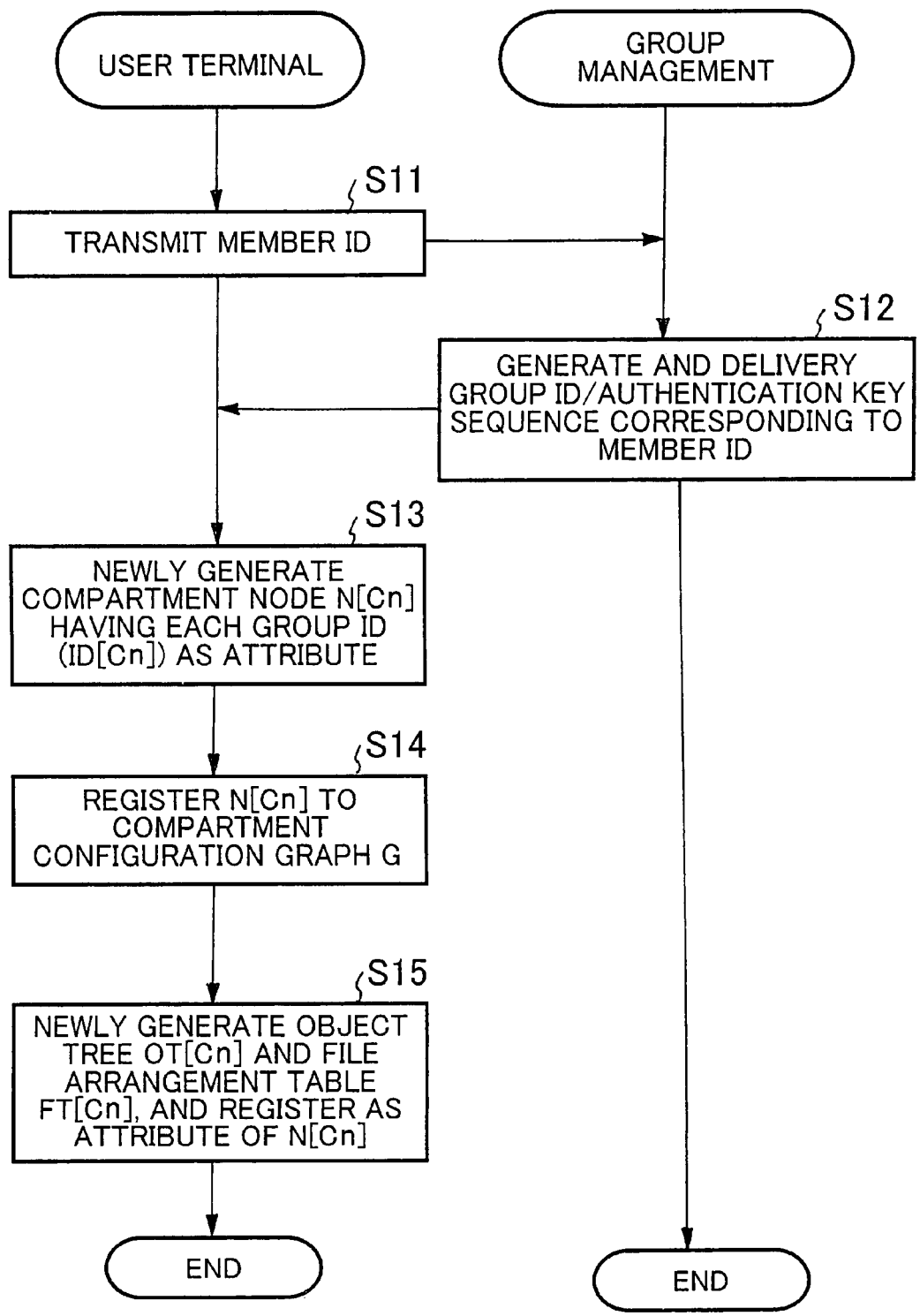
FIG. 3 is a flowchart of a compartment generation process by means of which a user terminal can generate a compartment in the first embodiment.

Firstly, an operation of generating a compartment of the user terminal 2 will be described. FIG. 3 is a flowchart of a compartment generation process by means of which the user terminal 2 can generate a compartment in the first embodiment. In this embodiment, the user of each of the user terminals 2 has concluded an agreement with the information sharing management business operator for receiving information sharing management services. A member ID is assigned to each of the users and the group to which the user belongs is registered in advance to the group management server 1. The group management server 1 associates the member IDs and the group IDs according to the contents of user registration and stores them in the group management database 12.

In the following description of the embodiment, the compartment generated for group n is expressed as compartment Cn. Additionally, the group ID assigned to group n is expressed as ID[Cn].

As shown in FIG. 3, the user terminal 2 transmits the predetermined member ID to the group management server 1 via the network 3 (Step S11). More specifically, for example, as the user starts operating the user terminal 2, the user terminal 2 transmits the member ID to the group management server 1 via the network 3. To be more accurate, the network device 231 of the user terminal 2 transmits the member ID to the group management server 1 according to the directive from the compartment generation directing means 222. The communication interface means 11 of the group management server 1 receives the member ID from the user terminal 2 via the network 3.

For example, the user terminal 2 transmits as member ID the user ID logged in the user terminal 2 according to an appropriate authentication system that may involve the use of a password or a user certificate or the equipment ID stored in the tamperproof device (not shown) in the user terminal 2 to the group management server 1. The group management server 1 may perform an operation of multi-element authentication when the user terminal 2 transmits both the user ID and the equipment ID.

Then, the group management server 1 searches the group management database 12 based on the received member ID and extracts the group ID and the authentication key that correspond to the member ID. The group management server 1 then generates a sequence of combinations of the group ID and the authentication key it extracts and transmits it to the user terminal 2 via the network 3 (Step S12). If the group management server 1 finds a new corner group that newly comes to belong to the information sharing system, it extracts a sequence of combinations of all the group IDs and the all the authentication keys (to be also referred to as group ID/authentication key sequence hereinafter) from the group management database 12 and distributes it to the user terminal 2.

Thereafter, the compartment generation directing means 222 of the user terminal 2 receives the group ID/authentication key sequence via the network 3 and the network device 231. Additionally, the compartment generation directing means 222 directs the compartment configuration management means 223 so as to newly generate a compartment node N[Cn] that includes the group IDs (ID[Cn]) and the authentication keys as attributes. Then, the compartment configuration management means 223 generates a compartment node N[Cn] according to the directive of the compartment generation directing means 222 (Step S13).

Subsequently, the compartment configuration management means 223 registers the generated compartment node N[Cn] to a predetermined compartment configuration graph G (Step S14). A [compartment configuration graph G] is a graph that indicates the relationship among the compartments generated by the compartment configuration management means 223 and information on the configuration thereof and has a data structure formed by using a set of nodes and a set of edges (directed edges and undirected edges) connecting the nodes. For example, a [compartment configuration graph G] shows the belonging relationships of compartments and application software. A compartment configuration graph G may be stored in the secondary memory device 233 or in a separately provided tamperproof device. The process relating to a compartment configuration graph G to be executed by the compartment configuration management means 223 can be executed by means of a processing program for graphs that is based on a graph algorithm operable on a computer.

In this embodiment, a compartment configuration graph G contains only compartment nodes N [Unclassified] having the lowest security level (the unclassified level) as initial value. As the compartment configuration management means 223 generates a compartment node N[Cn], it registers the generated compartment node N[Cn] to the compartment configuration graph G by adding the newly generated N[Cn] to a position that can be traced from N[Unclassified] by means of at least a single directed edge.

Then, the compartment configuration management means 223 newly generates an object tree OT[Cn] that shows a tree structure of the objects corresponding to the compartment node N[Cn] and a file arrangement table FT[Cn] that indicates the file arrangement (stored position) corresponding to the compartment node N[Cn]. Then, the compartment configuration management means 223 stores the object tree OT[Cn] and the file arrangement table FT[Cn] that are newly generated in the compartment configuration graph G as attributes of the compartment node N[Cn].

As the processing operations of Steps S11 through S15 are carried out in the above-described manner, it becomes possible to automatically connect the compartment generation directing means 222 to the group management server 1 when the user terminal 2 is started and generate an appropriate compartment in the user terminal 2 of the member whenever a new user group is formed. In other words, the compartment configuration management means 223 virtually generates a compartment Cn by generating configuration information such as a compartment node N[Cn], an object tree OT[Cn], a file arrangement table FT[Cn] and so on. It may alternatively be so arranged that, upon receiving a mail message notifying the formation of a new group, the compartment generation directing means 222 is connected to the group management server 1 to generate a compartment in the user terminal 2.

(Operation for Starting Event of Application)

Now, an operation for a starting event of an application 21 will be described below. FIG. 4 is a flowchart of a process that a user terminal 2 can execute for a starting event of an application 21 of the first embodiment. As an example, it is assumed here that an application that has been started (to be also referred to as "started application" hereinafter) starts another application (to be also referred to as "application to be started" hereinafter) at the user terminal 2. While the expression of "starting an application" in the following description of this embodiment, the CPU of the user terminal 2 actually executes processes according to various applications.

Referring to FIG. 4, when an application that has been started starts another application, the event acquisition means 221 acquires (detects) a starting event of the application to be started (Step S21) and outputs it to the compartment configuration management means 223. Assume that an event that the event acquisition means 221 acquires has at least an object ID for identifying the object of the application that is the source of event generation as attribute.

Then, the compartment configuration management means 223 searches for each of the compartment nodes of the compartment configuration graph G based on the object ID of the started application that is an attribute of the starting event of the application to be started as input from the event acquisition means 221. Thereafter, the compartment configuration management means 223 identifies the object tree OT[Ci] having the object node of the started application (Step S22).

After identifying the object tree OT[Ci], the compartment configuration management means 223 newly generates an object node of the application to be started and registers it to the object tree OT[Ci] as a child node of the object node of the started application (Step S23). At this time, the compartment configuration management means 223 also generates the object ID of the application to be started and stores it in the object tree OT[Ci] as an attribute of the object node of the application to be started.

As the processing operations of Steps S21 through S23 are carried out in the above-described manner, it becomes possible to make the newly started application belong to an appropriate compartment. Additionally, it is possible to provide a user interface by means of which a compartment to be accessed can be selected by providing a special launcher that can arbitrarily select a compartment to which it belongs as starting application.

(Operation for Inter-Object Message Transmission Event)

Now, an operation for an inter-object message transmission event of transmitting an inter-object message will be described below. FIG. 5 is a schematic illustration of a compartment configuration graph G that can be used for the first embodiment. Assume here that the user terminal 2 stores a compartment configuration graph G as shown in FIG. 5. In this embodiment, the compartment configuration management means 223 manages four compartments C0, C1, C2, C3 based on the compartment configuration graph G as shown in FIG. 5.

Compartment nodes are connected by means of directed edges and an outgoing side compartment (having no arrow of directed edge) is at an order lower than an incoming side compartment (having at least an arrow of directed edge). The higher-lower relationship is transitional. For instance, a compartment node N[C] and another compartment node N[D] that can be reached by forwardly (in the direction indicated by the arrow of a directed edge) tracing a plurality of directed edges from N[C] are so interpreted as to show a relationship of N[D]>N[C] (in other words, the compartment D is at an order higher than the compartment C). On the other hand, the compartment node N[C] and another compartment node N[E] that can be reached by backwardly (in the direction opposite to the direction indicted by the arrow of a directed edge) tracing a plurality of directed edges from N[C] are so interpreted as to show a relationship of N[C]>N[E] (in other words, the compartment C is at an order higher than the compartment E). A compartment that cannot be reached by tracing directed edges on the compartment configuration graph G is regarded as "incomparable".

In the instance of FIG. 5, it will be seen that there is a relationship of N[C0]<N[C1], N[C0]<N[C2], N[C1]<N[C3] and N[C2]<N[C3] but N[C1] and N[C2] are incomparable relative to each other. In other words, the compartments C1 and C2 are at an order higher than the compartment C0 and the compartment C3 is at an order higher than the compartments C1 and C2. The compartments C1 and C2 are incomparable for the higher-lower relationship.

Assume that there are two applications 21 (the first application and the second application), of which the first application belongs to the compartment C0, while the second application belongs to the compartment C1 in the following description of this embodiment. The operation of the monitoring means 22 that takes place when a message (signal) is transmitted from the first application to the second application in such a situation will be described below. FIG. 6 is a flowchart of a process that a monitoring means 22 can execute when a message is transmitted from the first application to the second application.

Referring to FIG. 6, the event acquisition means 221 acquires (detects) the message transmission event from the first application to the second application (Step S31) and transmits (outputs) it to the compartment configuration management means 223. The compartment configuration management means 223 refers to the compartments N[C0] and N[C1] out of the compartment configuration graph G. Then, the compartment configuration management means 223 extracts the object trees OT[C0] and OT[C1] to which the first application and the second application respectively belong based on the compartment nodes N[C0] and N[C1] (Step S32).

Then, the compartment configuration management means 223 executes the following process as shown in FIG. 7. Firstly, the compartment configuration management means 223 generates virtual objects VO[C0] and VO[C1] that correspond respectively to the compartment nodes N[C0] and N[C1]. Then, the compartment configuration management means 223 connects the object trees OT[C0] and OT[C1] for a child of the virtual objects VO[C0] and VO[C1]. Additionally, the compartment configuration management means 223 adds a directed edge showing a direction same as the direction between the compartment nodes N[C0] and N[C1] between the virtual objects VO[C0] and VO[C1]. As a result, a tree is generated by merging (binding) the object trees OT[C0] and OT[C1].

Subsequently, the compartment configuration management means 223 checks (determines) if it is possible to get to the virtual object VO[C1] that corresponds to the compartment C1 to which the second application belongs on the tree produced as a result of the merge or not by tracing undirected edges and directed edges from the virtual object VO[C0] that corresponds to the compartment C0 to which the first application belongs (Step S34). An undirected edge is treated as a directed edge that can be traced in two directions.

If, as a result, it is determined that it is possible to get to the second application, the compartment configuration management means 223 authorizes the passage (output) of the message transmission event from the first application to the second application (Step S35). If, on the other hand, it is determined that it is not possible to get to the second application, the compartment configuration management means 223 blocks the passage of the message transmission event from the first application to the second application (Step S36). If such as the case, the compartment configuration management means 223 typically controls the operation so as to prevent the message transmission event from the first application to the second application from passing.

As the processing operations of Steps S31 through S36 are carried out in the above-described manner, it becomes possible, for example, to authorize a paste operation from the clipboard (the first application) belonging to the compartment C0 to the editor (the second application) belonging to the compartment C1. Additionally and conversely, it is possible to prohibit a paste operation from the editor to the clipboard. With this arrangement, then, it is possible to prevent information from leaking to a lower order compartment or an incomparable compartment as a result of a copying & pasting operation.

(Operation for File Input/Output Event)

Now, an operation for a file input/output operation of inputting/outputting a file will be described below. In this embodiment, a file arrangement table FT is a correspondence table where file names and the file entities on the secondary memory device 233 are respectively made to correspond to each other. It is assumed here that, when an application makes a file access, it can access a file entity by determining the arrangement address from the file name based on the file arrangement table FT.

FIG. 8 is a schematic illustration of the file arrangement table FT[C0] of the compartment C0 and the file arrangement table FT[C1] of the compartment C1 in the compartment configuration graph of FIG. 5, shown as examples. The access control method for accessing a file entity from the application belonging to the compartment C1 by means of the file arrangement tables of FIG. 8 will be discussed below. The file control method will be described in terms of two cases including (1) a case where the application reads or surveys files and (2) a case where the application makes an alteration to a file typically by writing on the file.

(1) Operation of Reading or Viewing File

Firstly, a case where the application reads or views files will be described below. FIG. 9 is a flowchart of a process that the monitoring means 22 can execute when an application surveys files. Referring to FIG. 9, the event acquisition means 221 acquires (detects) a file surveying event of an application (Step S41) and transmits (outputs) it to the compartment configuration management means 223.

Then, the compartment configuration management means 223 determines to which compartment the application belongs based on the input file surveying event. It is assumed here that the application belongs to the compartment C1. As the compartment configuration management means 223 determines that the application belongs to the compartment C1, it extracts the file arrangement table FT[C1] that corresponds to the compartment C1 (Step S42).

Figure 10:
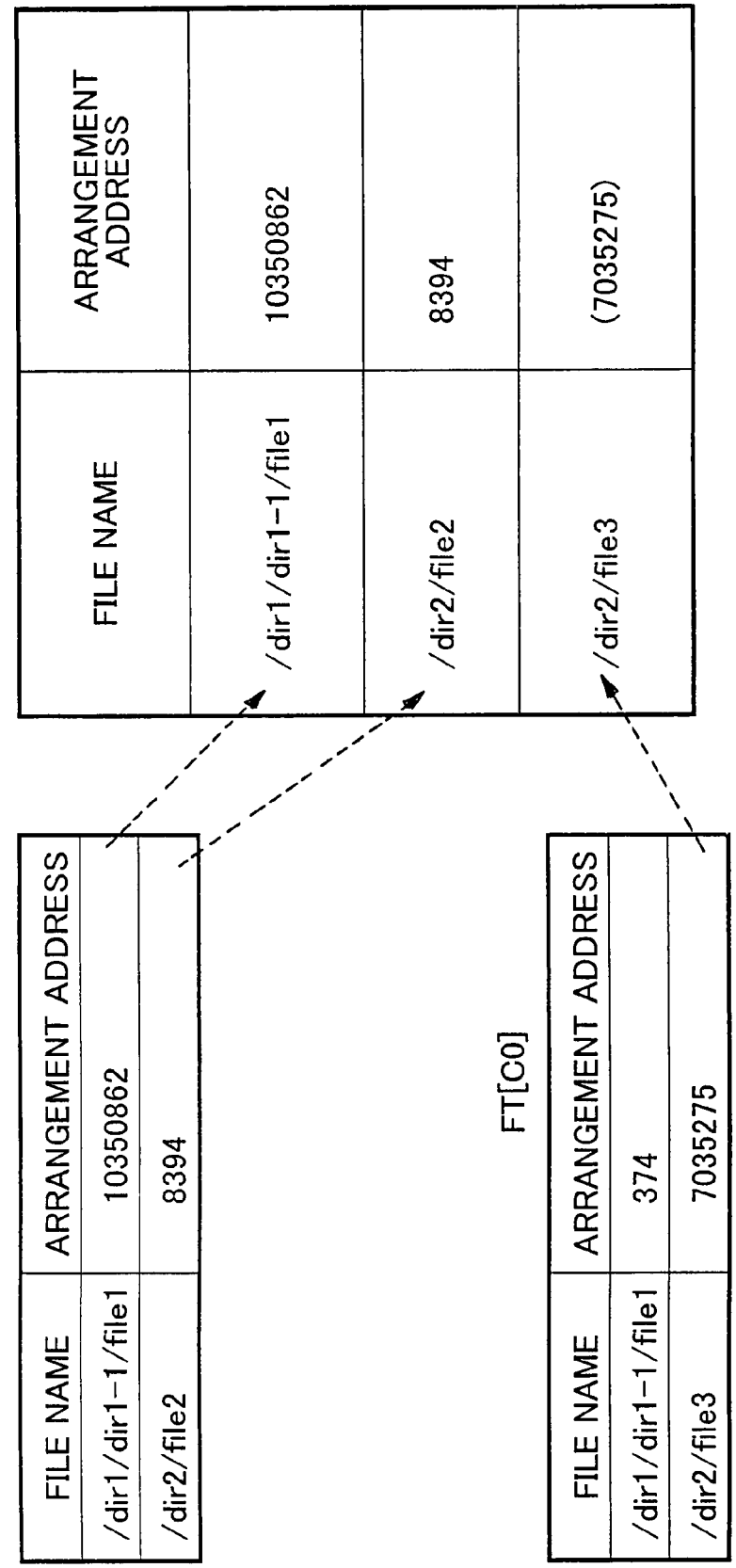
FIG. 10 is a schematic illustration of an integrated FT (file arrangement table) that can be used for the first embodiment.

Subsequently, the compartment configuration management means 223 extracts the file arrangement table FT[C0] that corresponds to the compartment C0 that is a compartment at a lower order relative to the compartment C1. Then, the compartment configuration management means 223 merges (binds) the file arrangement tables FT[C1] and FT[C0] (Step S43) and generates a bound file arrangement table (to be also referred to as bound FT hereinafter) as a result of the merging. At this time, if there is another file having the same file name, the compartment configuration management means 223 adopts the record (a combination of a file name and an arrangement address) of the upper order file arrangement table FT to generate a bound FT. In this instance, the compartment configuration management means 223 forms a bound FT as shown in FIG. 10.

Thereafter, the compartment configuration management means 223 determines if the input event is an event requesting a file list or not. If it is determined that the event is an event requesting a file list, the compartment configuration management means 223 extracts the file name list and returns it to the application (Step S44).

FIG. 11 is a flowchart of a process that a monitoring means 22 can execute when an application reads a file in the first embodiment. Referring to FIG. 11, the event acquisition means 221 acquires (detects) the file reading event of the application (Step S41b) and transmits (outputs) it to the compartment configuration management means 223. The compartment configuration management means 223 extracts the file arrangement tables FT[C1] and FT[C0] as in the case of the file surveying event and merges the file arrangement tables FT[C1] and FT[C0] (Steps S42, S43).

Then, the compartment configuration management means 223 searches for the column of the file names of the merged file arrangement tables and extracts the arrangement address of the file to be read in. As the compartment configuration management means 223 acquires the arrangement address, it reads in the file entity of the secondary memory device 233 via the device control section 224 and returns the input file entity to the application (Step S45).

(2) Operation of Altering a File Such as Writing on a File

Now, a case where the application makes an alteration to a file typically by writing on the file will be described below. FIG. 12 is a flowchart of a process that the monitoring means 22 can execute when an application makes an alteration by writing on a file. Referring to FIG. 12, the event acquisition means 221 acquires (detects) the file output event (Step S51) and transmits (outputs) it to the compartment configuration management means 223.

Then, the compartment configuration management means 223 confirms that the application belongs to the compartment C1 and then, unlike the process for an input event, extracts only the file arrangement table FT[C1] for the compartment C1 (Step S52). Then, the compartment configuration management means 223 processes only the file arrangement table FT[C1] for altering and/or deleting file names. For updating files, the compartment configuration management means 223 inputs the arrangement address described in the file arrangement table FT[C1] to the device control section 224 and writes the contents of the alteration to the file entity of the secondary memory device 233 (Step S53).

As the processing operations of Steps S51 through S53 are carried out in the above-described manner, it becomes possible to store file entities in different respective compartments even in a case where files are written out by a same file name. For instance, when the applications respectively belonging to the compartments C0 and C1 write out files by means of a same file name [file1] as shown in FIG. 13, on the secondary memory device, the files are stored in respective compartments as different file entities. Therefore, it is possible to prevent information from leaking from the application belonging to the compartment C1 to the lower order compartment C0.

If there is no [file1] in the compartment C1 at the beginning, the application belonging to the compartment C1 can read in the [file1] of the lower order compartment C0. Thereafter, if a certain secret is added to the application and held with the same file name "file1", the "file1" that is the file after the update is automatically stored in the secondary memory device 233 as a file belonging to the higher order compartment C1 but the "file1" that is the file before the update is maintained as a file still belonging to the compartment C0.

When the security level of "file1" is raised and the compartment to which it belongs is changed from compartment C0 to compartment C1 in a known MLS system as a result of a similar operation, the "file1" belonging to the compartment C0 can be extinguished and consequently it may become difficult to share information in a broad range group that corresponds to the compartment C0. To the contrary, this embodiment can protect the secrets limited to a specific group but does not prevent a broader range group from sharing information.

(Operation for Network Event)

Now, an operation for a network event when user terminals 2 communicate with each other via a network 3 will be described below. FIG. 14 is a flowchart of a process that can be executed when a user terminal (to be referred to as user terminal U1 hereinafter) that is connected to another user terminal (to be referred to as user terminal U2 hereinafter) via a network 3 communicates with the latter.

Referring to FIG. 14, the application (to be referred to as application (AP1) hereinafter) of the user terminal U1 requests connection to the application (to be referred to as application (AP2) hereinafter) of the user terminal U2 (Step S61). Then, the event acquisition means 221 of the user terminal U1 acquires (detects) the network connection request event by means of the application (AP1) and transmits (outputs) it to the compartment configuration management means 223.

Thereafter, the compartment configuration management means 223 of the user terminal U1 confirms that the compartment of the application (AP1) is the compartment Ci. Then, it requests the compartment configuration management means 223 of the user terminal U2 to establish tunnel TUN[Ci, AP2] that belongs to the compartment Ci via the device control means 224 and the network device 231 of the user terminal U1 and those of the user terminal U2 (Step S62).

Subsequently, upon receiving the tunnel establishing request for establishing the tunnel TUN[Ci, AP2], the compartment configuration management means 223 of the user terminal U2 searches for the object tree OT[Ci] that corresponds to the compartment node N[Ci] from the compartment configuration graph and determines if the application (AP2)

belongs to the compartment Ci or not (Step S63). If, as a result, it is not possible to confirm that the application (AP2) belongs to the compartment Ci, the compartment configuration management means 223 immediately refuses the tunnel establishing request (Step S642).

If, on the other hand, it is determined that the application (AP2) belongs to the compartment Ci, the compartment configuration management means 223 of the user terminal U1 and that of the user terminal U2 authenticate each other for that they have the authentication key AK[Ci] of the compartment Ci (Steps S64a, 64b). More specifically, the user terminal U2 may transmit a random number r12 to the user terminal U1. Then, the user terminal U1 transmits an authentication message M12=(h[AK[Ci]](r12), r21) to the user terminal U2. Then, the user terminal U2 transmits an authentication message M21=(h[AK[Ci]](r21)) to the user terminal U1 in return. The user terminals U1 and U2 respectively compute H[Rb](AK[Ci]) and H[Ra](AK[Ci]) and verify that the authentication messages M21 and M12 they receive are correct. Note that the random numbers r12 and r21 are random numbers that are different from each other and h[k](m) is an m-keyed one-directional hash function using a key k.

If, as a result, either of the user terminals U1 and U2 fails in verifying the authentication message of the other party, the user terminals U1 and U2 immediately interrupt (refuse) the connection process of the tunnel TUN[Ci, AP2] (Steps S641, S642).

If, on the other hand, the user terminals U1 and U2 succeed in the mutual authentication, the compartment configuration management means 223 of the user terminal U2 transmits authorization for establishing the tunnel TUN[Ci, AP2] to the user terminal U1 (Step S65). More specifically, the user terminal U2 transmits a notification of authorization for establishing the tunnel to the user terminal U1 via the network 3. Then, the compartment configuration management means 223 of the user terminal U1 transmits an acknowledgement of the authorization for establishing the tunnel to the user terminal U2 (Step S66) to complete the process of establishing the tunnel TUN[Ci, AP2]. In other words, the user terminal U1 transmits a notification (acknowledgement) of the reception of the notification of authorization for establishing the tunnel to the user terminal U2 via the network 3.

Thereafter, the user terminals U1 and U2 execute an application-dependent connection establishing process between the application (AP1) and the application (AP2) by means of the tunnel TUN[Ci, AP2] (Steps S67a, 67b). Then, the user terminals U1 and U2 communicate with each other by means of a predetermined protocol on the tunnel TUN[Ci, AP2] (Steps S68a, S68b).

As the processing operations of Steps S61 through S68 are carried out in the above-described manner, it becomes possible for the remotely located members of a same group to share secrets in security. Additionally, since no third party server is utilized to transmit shared secrets, the affinity for proximity communication techniques such as IrDA and Bluetooth is high. Still additionally, it is possible to use an arbitrarily selected protocol between the application (AP1) and the application (AP2) when a tunneling technique of IP encapsulation is employed.

As described above, in this embodiment, the monitoring means 22 of the user terminal 2 to be used by a member associates applications, file systems and networks with a compartment that is a region dedicated to the group to which the member belongs and manages the compartment. Additionally, the monitoring means 22 authorizes file accesses and network transfers among applications in a same compartment but prohibits writings to files and network transfers between different compartments. Thus, it is possible for remotely located members of a same group to freely share information and prevent information from leaking to the outside of the group. Therefore, confidential information of a group can be reliably protected when the remotely located members of the group share the information via a network.

Additionally, in this embodiment, the central group management server 1 manages only each group and the configuration of the members of the group. Thus, with this embodiment, it is possible for the members to share information and prevent information from leaking without requiring the group management server 1 to manage individual pieces of information and the communication status among the user terminals so long as the monitoring means 22 of the user terminals 2 of the members mutually authenticate a compartment. Therefore, it is possible to operate the entire information sharing system if the number of pieces of information that are shared by the group and the frequency of communication for sharing information increase.

EXAMPLE

Figure 15:
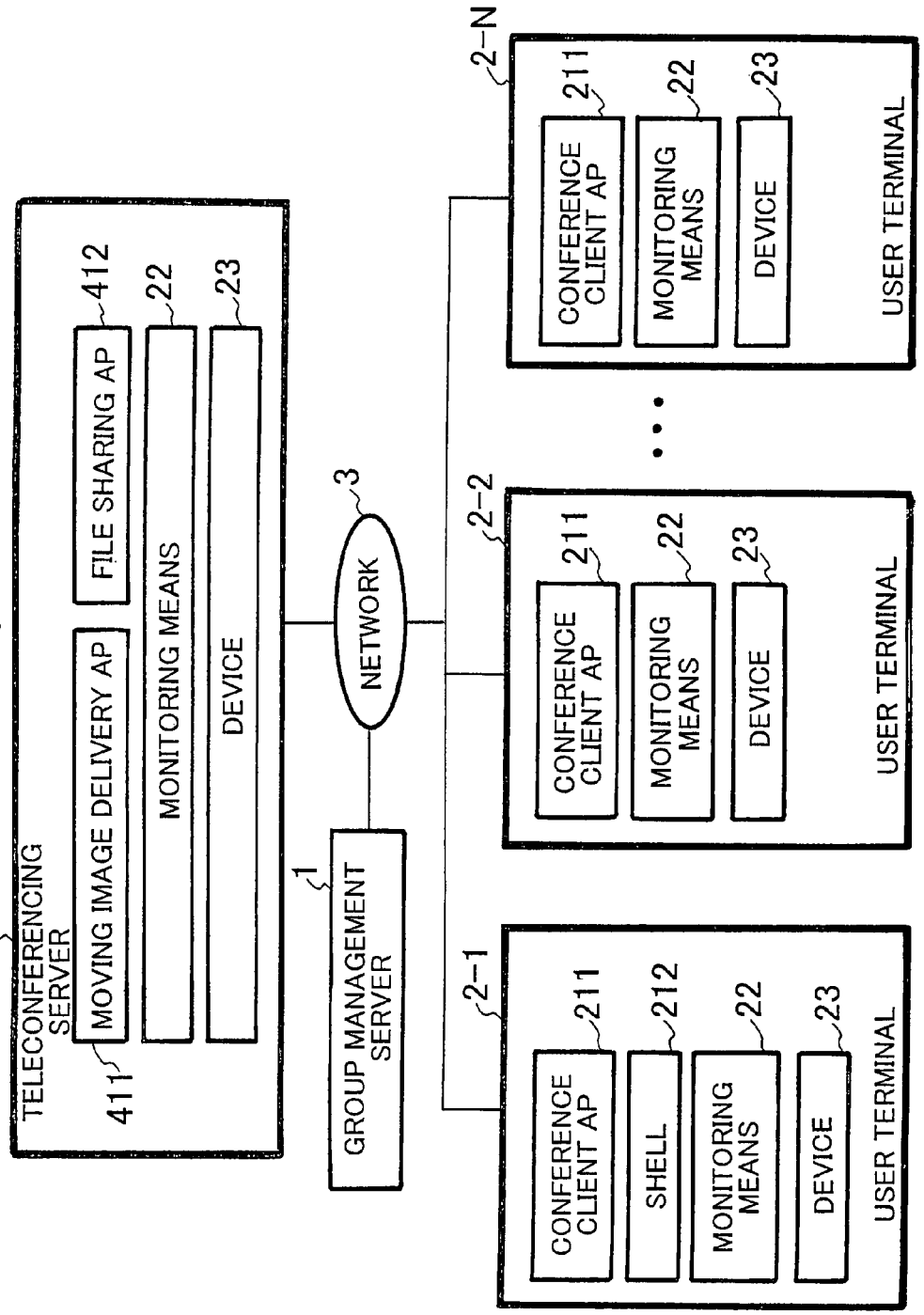
FIG. 15 is a schematic block diagram of an exemplary teleconferencing system realized by applying the first embodiment of information sharing system, showing the configuration thereof.

Now, the operation of this embodiment will be described by way of examples. FIG. 15 is a schematic block diagram of an exemplary system realized by applying the first embodiment of information sharing system, showing the configuration thereof. More specifically, the system of FIG. 15 is a teleconferencing system realized by applying the first embodiment of information sharing system. In this example, the teleconferencing system comprises a group management server 1, N user terminals 2-1 through 2-N and a teleconferencing server 4 that are connected to each other via a network 3 as shown in FIG. 15.

The teleconferencing server 4 of this example includes a monitoring means 22 and devices 23 like the user terminal 2 shown in FIG. 1. Additionally, a moving image delivery application 411 and a file sharing application 412 are installed in the teleconferencing server 4. The moving image delivery application 411 is an application for transmitting the moving image data transmitted from a conference client on any of the user terminals 2-1 through 2-N to all the conference clients of all the other user terminals 2-1 through 2-N. The file sharing application 412 is an application for storing the conference material data transmitted from a conference client on any of the user terminals 2-1 through 2-N.

(A) Operation at Setup Time

Firstly, the operation for setting up the teleconferencing system will be described below. The monitoring means 22 of each of the user terminals 2-1 through 2-N and the teleconferencing server 4 transmits the member IDs that the user terminals 2-1 through 2-N and the teleconferencing server 4 respectively employ via the network 3 (Step S11 in FIG. 3). While the member IDs may be unique IDs of the CPUs or the unique IDs of the secondary memory devices, it is desirable that the read-only tamperproof devices that only the monitoring means 22 can access store the member IDs specific to the respective members. In this example, the member IDs of the user terminals 2-1 through 2-N and the member ID of the teleconferencing server 4 are assumed to be "USER-1" through "USER-N" and "CONF-SERV" respectively.

Figures 16, 17:
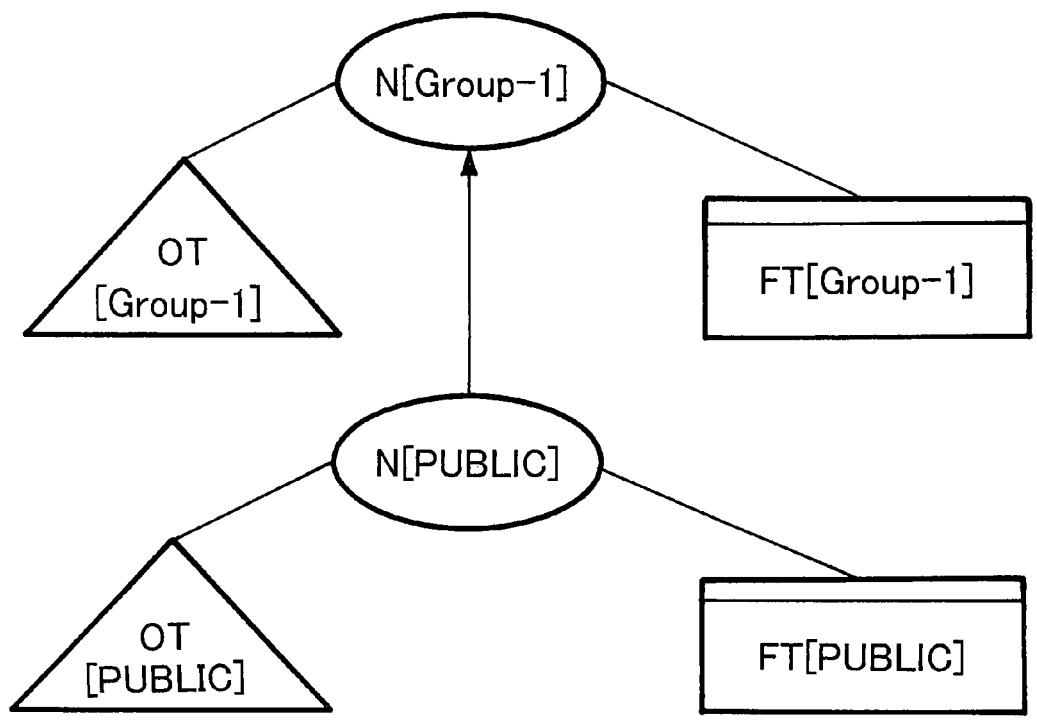
FIG. 16 is a schematic illustration of a group management database that can be used in the exemplary system.
FIG. 17 is a schematic illustration of a compartment configuration graph after the registration of compartment node N[Group-1] in the exemplary system.

Then, the group management server 1 receives the member IDs and identifies an appropriate combination of a group ID and an authentication key based on the received member IDs. Then, the group management server 1 delivers (transmits) the combination of the group ID and the authentication key to the host of the origin of transmission of the member ID (Step S12 in FIG. 3). As a specific method of identifying group IDs and authentication keys, a group management database 11 that holds the correspondences of group IDs, authentication keys and groups of member IDs may be defined in advance as shown in FIG. 16. With such an arrangement, the group management server 1 searches for the group of member IDs having the received ID, using the received ID as key, and determines the combination of a group ID and an authentication key that corresponds to the identified member ID.

A same member ID may be found as a plurality of entries like the member IDs of "CONF-SERV" and "USER-2" shown in FIG. 16. In such a case, the group management server 1 detects all the combinations of a corresponding group ID and an authentication key and sends back the sequence of combinations to the host of the origin of transmission of the member ID. Thus, for example, the group management server 1 may deliver [(Group-1, A8BC0F)] to the user terminal 2-1 (USER-1) and a sequence of [(Group-1, A8BC0F) (Group-2, 21AAB3)] to the user terminal 2-2 (USER-2) and the teleconferencing server 4 (CONF-SERV).

Additionally, the monitoring means 22 of one of the user terminals 2-1 through 2-N that is the host of the origin of transmission or that of the teleconferencing server 4 receives the combinations of a group ID and an authentication key (or the sequence thereof) delivered from the group management server 1. Then, the monitoring means 22 generates one or more than one compartment nodes N that each of the combinations has as attribute (Step S13 in FIG. 3). Thus, for example, the user terminal 2-1 may generate compartment node N [Group-1] and the user terminal 2-2 and the teleconferencing server 4 may generate two compartment nodes N[Group-1] and N[Group-2].

Then, the monitoring means 22 registers the newly generated compartment nodes N to the compartment configuration graph G (Step S14 in FIG. 3) and stores the object tree OT and the file arrangement table FT as attributes of N (Step S15 in FIG. 3).

Figure 18:
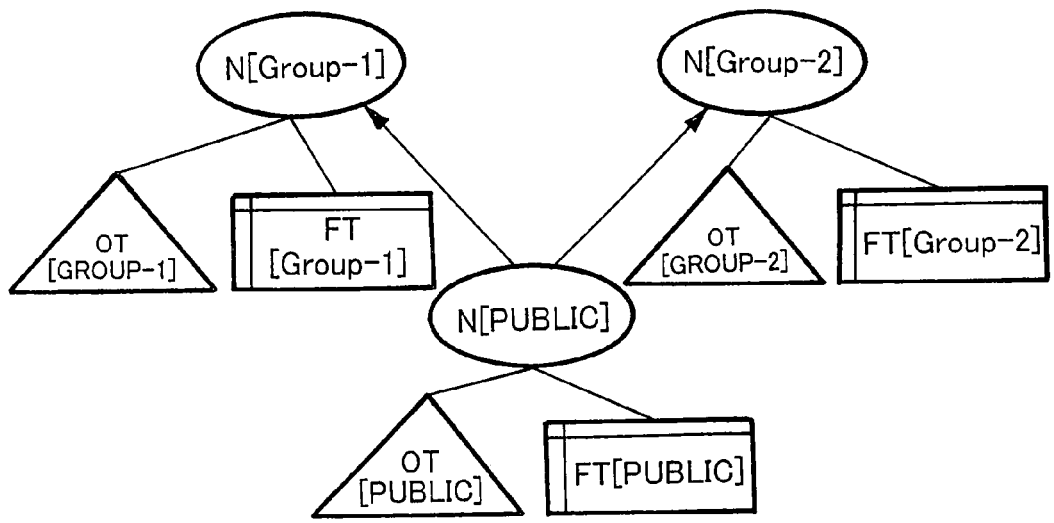
FIG. 18 is a schematic illustration of a compartment configuration graph after the registration of compartment nodes N[Group-1] and N[Group-2] in the exemplary system.

In this example, it is assumed that compartment node N[PUBLIC] that corresponds to an unclassified compartment having the lowest security level is contained in the compartment configuration graph G as the initial value of the compartment configuration graph G. The monitoring means 22 registers the newly generated compartment nodes N to the compartment configuration graph G so as to satisfy the requirement of the relationship of N[PUBLIC]<N. By doing so, for example, the user terminal 2-1 configures the compartment configuration graph G after the registration of N[Group-1] as shown in FIG. 17. On the other hand, the user terminal 2-2 and the teleconferencing server 4 configure the compartment configuration graph G after the registration of N[Group-1] and N[Group-2] as shown in FIG. 18.

(B) Operation at Teleconferencing Realizing Time

Now, the operation at the time of realizing teleconferencing will be described below. In this example, an operation of the teleconferencing system where the user terminal 2-1 and the user terminal 2-2 mutually start a teleconference via the teleconferencing server 4 will be described.

(B-1) Operation at Conference Client Application Starting Time

Firstly, the operation that takes place when the conference client application is started will be described. The user that uses the user terminal 2-1 operates the user terminal 2-1 to start up the conference client application 211. Then, the monitoring means 22 of the user terminal 2-1 captures (detects) a starting event of the conference client application 211 (Step S21 in FIG. 4). In this example, it is assumed that the conference client application 211 is started by means of shell 212 that is a type of application 21. It is also assumed that the shell 212 belongs to the compartment of the group (Group-1).

Then, the monitoring means 22 identifies the object tree OT[Group-1] that belongs to the Group-1 compartment storing the object node O[SHELL] corresponding to the shell 212 out of the object trees contained in the compartment configuration graph G. In this case, the monitoring means 22 retrieves the object ID of the shell 212 as key and identifies the object tree (Step S22 in FIG. 4).

Thereafter, the monitoring means 22 newly generates an object node O[CLIENT] of the conference client application 211 and registers it to the object tree OT[Group-1] as a child node of the O[SHELL] (Step S23 in FIG. 4).

Figure 19:
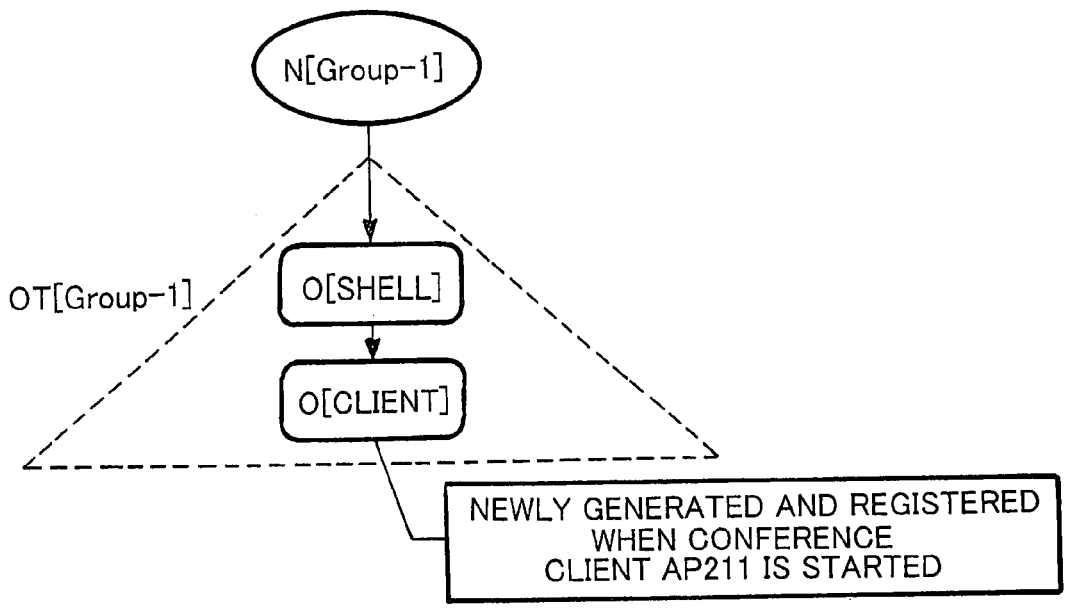
FIG. 19 is a schematic illustration of an object tree at the time of execution of an application at user terminal 2-1 in the exemplary system.

As a result of the above operation, the user terminal 2-1 registers the object tree OT[Group-1] shown in FIG. 19 and completes the starting process of the conference client application 211. The user terminal 2-2 also executes a starting process of the conference client application 211 that is similar to the process of the user terminal 2-1.

(B-2) Operation at Teleconferencing Server Connection Time

Now, the operation that takes place when the teleconferencing server 4 is connected by means of the conference client application will be described below. The user terminal 2-1 starts connecting to the teleconferencing server 4 by means of the conference client application 211. In this case, the monitoring means 22 captures a connection request event from the conference client application 211 to the moving image delivery application 411 on the teleconferencing server 4 (Step S61 in FIG. 14).

Then, the compartment configuration management means 223 of the monitoring means 22 confirms that the conference client application 211 belongs to the Group-1 compartment by searching for the object tree OT[Group-1] in the direction of the parent node. Additionally, the compartment configuration management means 223 requests the compartment configuration management means 223 of the teleconferencing server 4 to establish tunnel TUN[Group-1, P411] that belongs to the Group-1 compartment via the device control means 224 and the network device 231 (Step S62 in FIG. 14). Note that P411 denotes the waiting port that the moving image delivery application 411 is listening to.

Then, upon receiving the request for establishing TUN [Group-1, P411], the compartment configuration management means 223 of the teleconferencing server 4 searches for the object tree OT[Group-1] of the compartment node N[Group-1] in the compartment configuration graph. Then, it confirms that the moving image delivery application 411 belongs to the Group-1 compartment (Step S63 in FIG. 14). In this example, it is assumed that the moving image delivery application 411 has already started under the Group-1 compartment.

Thereafter, the compartment configuration management means 223 of the user terminal 2-1 and that of the teleconferencing server 4 mutually authenticate that they have the authentication key "A8BC0F" of Group-1 (Steps S64a, S64b in FIG. 14). In this example, since both the host of the user terminal 2-1 and that of the teleconferencing server 4 have received the delivery of the authentication key from the group management server 1 at the setup time described above in (A), the mutual authentication is determined to be successful.

Subsequently, the compartment configuration management means 223 of the teleconferencing server 4 transmits the authorization for establishing TUN[Group-1, P411] to the user terminal 2-1 (Step S65 in FIG. 14). Additionally, the compartment configuration management means 223 of the user terminal 2-1 transmits an acknowledgement of the authorization for establishing TUN[Group-1, P411] to the teleconferencing server 4 to complete the process of establishing the tunnel TUN[Group-1, P411] (Step S66 in FIG. 14).

Figure 20:
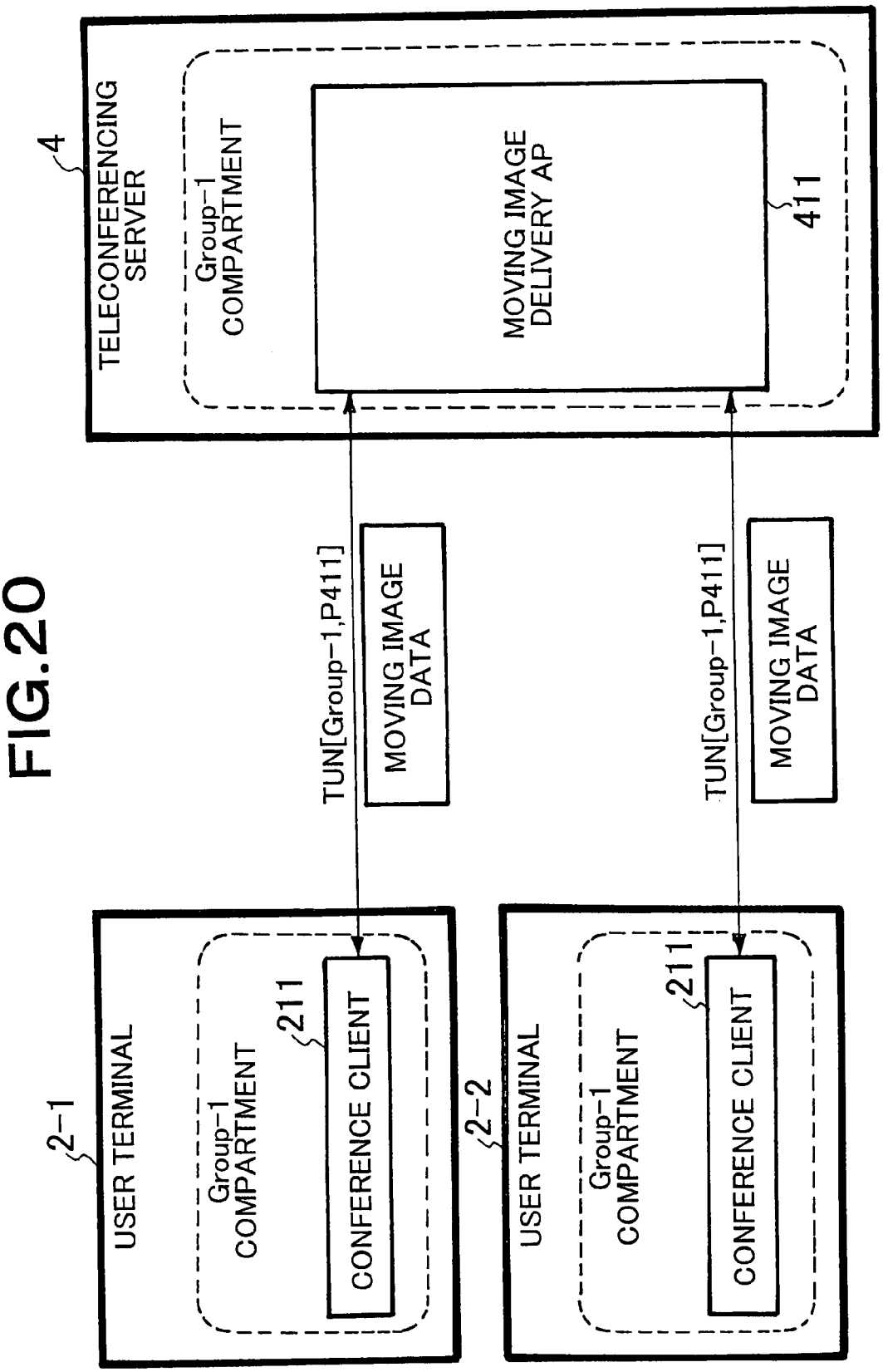
FIG. 20 is a schematic illustration of a specific operation of the teleconferencing system of the exemplary system when delivering moving images.

As a result of the above operation, the conference client application 211 and the moving image delivery application 411 start communicating with each other on the TUN[Group-1, P411] (Step S67 in FIG. 14). Additionally, the conference client application 211 of the user terminal 2-2 and the moving image delivery application 411 of the teleconferencing server 4 start communicating with each other on the TUN[Group-1, P411] as a result of a process similar to the one described above for the user terminal 2-1 and the teleconferencing server 4 as shown in FIG. 20.

(C) Operation at Material Sharing Time in Teleconference

Now, the operation of sharing materials in a teleconference will be described below. In this example, it is assumed that the user terminal 2-2 downloads the conference material file prepared at the user terminal 2-1 via the teleconferencing server 4 to share the conference material file in the teleconferencing system.

(C-1) Operation at Conference Material File Newly Preparing Time

Figures 21, 22:
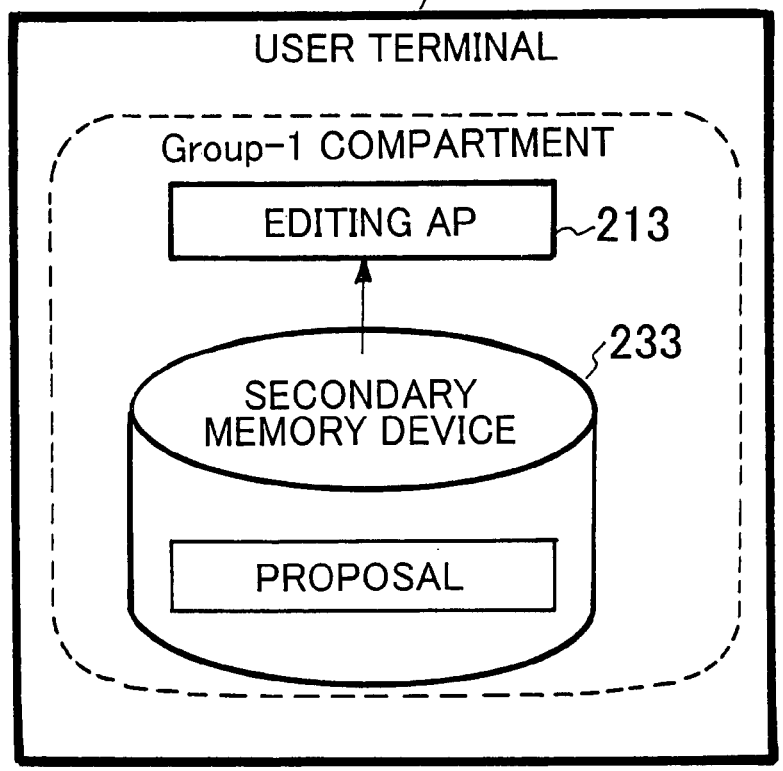
FIG. 21 is a schematic illustration of a specific operation of a monitoring means of the exemplary system when newly preparing a file.
FIG. 22 is a schematic illustration of specific examples of file arrangement tables of the exemplary system.

Firstly, the operation of newly preparing a conference material file will be described. The user using the user terminal 2-1 operates the user terminal 2-1 to prepare a new conference material file by means of an editing application 213 such as a word processor as shown in FIG. 21. In this case, the monitoring means 22 starts the editing application 213 in the Group-1 compartment as in the case of starting the conference client application 211 described in (B-1) above.

Then, the user of the user terminal 2-1 operates the editing application 213 to edit the new conference material file (the file name is "PROPOSAL" in this example) and direct to store it in the secondary memory device 233 in the user terminal 2-1. Then, the editing application 213 issues a file output event. In this case, the monitoring means 22 supplements the file output event and transmits it to the compartment configuration management means 223 (Step S51 in FIG. 12).

Thereafter, the compartment configuration management means 223 searches through the object tree OT[Group-1] in the direction toward the root, using the object ID of the editing application 213 as key. Then, the compartment configuration management means 223 identifies the compartment node N[Group-1] and extracts it by referring to the file arrangement table FT[Group-1] (Step S52 in FIG. 12).

Additionally, the compartment configuration management means 223 retrieves the file name "PROPOSAL" from the file arrangement table FT[Group-1] and tries to acquire the file arrangement entry of the file having the file name "PROPOSAL". Since the file "PROPOSAL" is a new file in this example, the compartment configuration management means 223 fails to acquire the file arrangement entry. Therefore, the compartment configuration management means 223 prepares a new file arrangement entry.

Subsequently, the compartment configuration management means 223 identifies the logical address on the secondary memory device 233 by referring to the file arrangement entry of the conference material file "PROPOSAL". Then, the compartment configuration management means 223 writes out the file entity of the conference material file "PROPOSAL" at the position indicated by the logical address on the secondary memory device 233 as shown in FIG. 21 (Step S53 in FIG. 12).

(C-2) Operation at Conference Material File Uploading Time

Now, the operation that takes place when uploading the conference material file will be described. The user of the user terminal 2-1 operates the user terminal 2-1 by means of the conference client application 211 and directs to upload the prepared conference material file "PROPOSAL" to the teleconferencing server 4. In this case, the conference client application 211 of the user terminal 2-1 executes a process in a manner as described below.

(C-2-1) Operation at Conference Material File Reading Time

Firstly, the conference client application 211 reads the conference material file "PROPOSAL". Then, the user of the user terminal 2-1 operates the user terminal 2-1 by means of the conference client application 211 and specifies the conference material file "PROPOSAL" to be uploaded. In this case, the conference client application 211 issues a file surveying event and tries to acquire the file list stored in the secondary memory device 233.

Thereafter, the monitoring means 22 supplements the file surveying event by the conference client application 211 and transmits the acquired file surveying event to the compartment configuration management means 223 (Step S41 in FIG. 9).

Subsequently, the compartment configuration management means 223 searches through the object tree OT[Group-1] in the direction toward the root, using the object ID of the editing application 213 as key. Then, the compartment configuration management means 223 identifies the compartment node N[Group-1] and extracts it by referring to the file arrangement table FT[Group-1] (Step S42 in FIG. 9).

Then, the compartment configuration management means 223 searches for the compartment node N[PUBLIC] that corresponds to the compartment PUBLIC having the lowest security level, tracing the directed edge of the N[Group-1] in the reverse direction in the compartment configuration graph G. It also extracts the file arrangement table FT[PUBLIC] that corresponds to the compartment PUBLIC. Then, it merges the file arrangement tables FT[Group-1] and FT[PUBLIC] to generate file arrangement table FT[Group-1, PUBLIC] (Step S43 in FIG. 9).

FIG. 22 is a schematic illustration of specific examples of file arrangement tables FT[Group-1] and FT[PUBLIC] of this example. In this example, the FT record of the conference material file "PROPOSAL" exists in the file arrangement table FT[Group-1] along with conference minutes of proceedings file named "MINUTE" as shown in FIG. 22. A treatise file named "PAPER" and a published material named "PROPOSAL" are found in the file arrangement table FT[PUBLIC].

Figure 23:
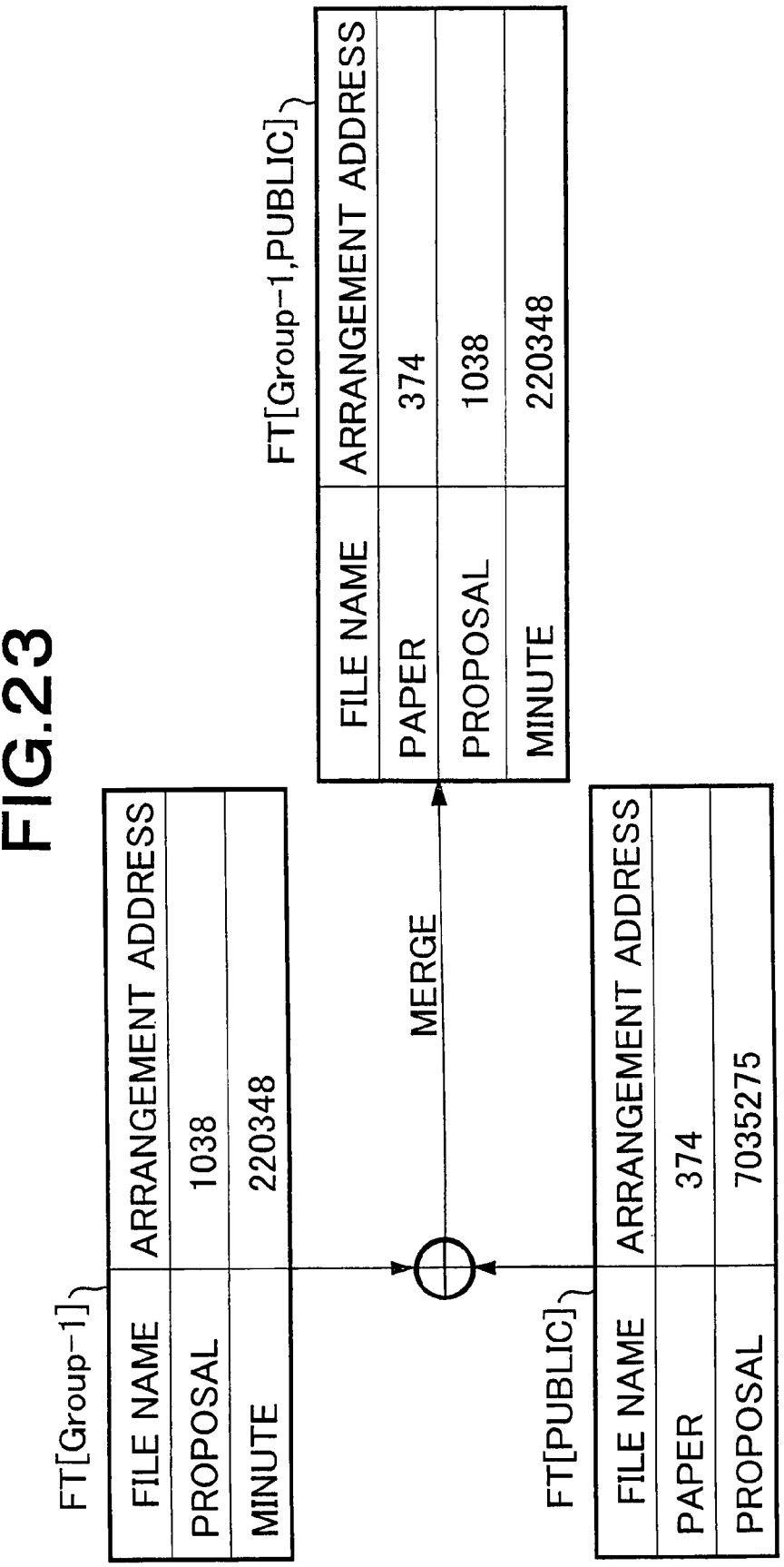
FIG. 23 is a schematic illustration of a specific example of file arrangement table generated by merging file arrangement tables in the exemplary system.

FIG. 23 is a schematic illustration of a specific example of file arrangement table FT[Group-1, PUBLIC] generated by merging the file arrangement tables shown in FIG. 22. As seen from FIG. 23, a total of three FT records of conference material file "PROPOSAL, conference minutes of proceedings file "MINUTE" and a treatise file "PAPER" are found in the file arrangement table FT[Group-1, PUBLIC] generated as a result of the merger.

Then, the compartment configuration management means 223 refers to respective FT records of the file arrangement table FT[Group-1, PUBLIC]. The compartment configuration management means 223 extracts the file name list including "PROPOSAL", "MINUTE", and "PAPER" as a list of file names, and returns the extracted file name list to the conference client application 211.

Figure 24:
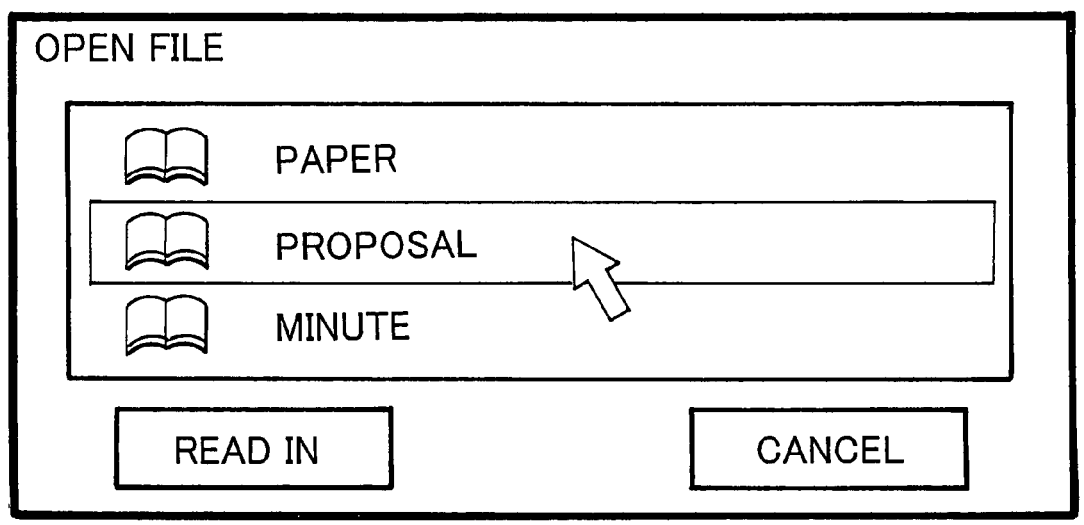
FIG. 24 is a schematic illustration of an example of file selection dialog of a conference client application in the exemplary system.
Figure 25:
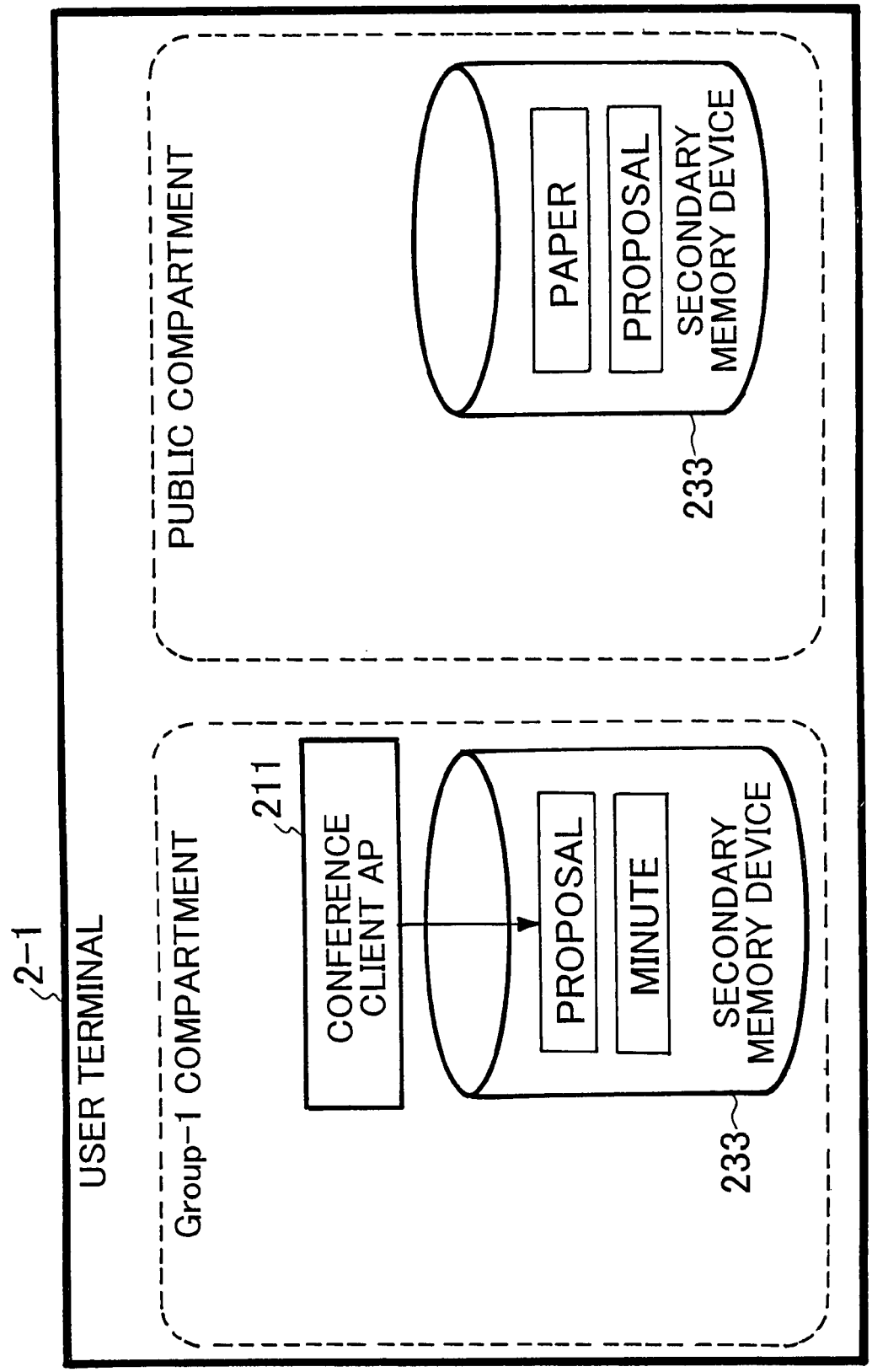
FIG. 25 is a schematic illustration of a specific operation of a monitoring means when reading a file in the exemplary system.

After acquiring the file name list, the conference client application 211 typically displays a dialog as shown in FIG. 24 and presents the file name list to the user of the user terminal 2-1. Additionally, the conference client application 211 prompts the user to specify the file to be read by displaying the dialog. If, for example, the user selects and specifies the file "PROPOSAL", the conference client application 211 issues a reading event for the file named "PROPOSAL" as shown in FIG. 25.

Thereafter, as the monitoring means 22 captures the file reading event (Step S41b in FIG. 11), it requests for the file arrangement table FT[C1] as in the case of the process of acquiring a file surveying event (Step S42 in FIG. 11). The monitoring means 22 also generates file arrangement table FT[Group-1, PUBLIC] as a result of a merger with the file arrangement table FT[C0] (Step S43 in FIG. 11) and identifies the FT record bearing the file name of "PROPOSAL".

In this example, there are a conference material file managed by means of the file arrangement table FT[Group-1] and a published material file managed by means of the file arrangement table FT[PUBLIC] that are both named as "PROPOSAL". With the technique of merging file arrangement tables of this example, the monitoring means 22 gives priority to the file arrangement table FT[Group-1] that has a higher security level for FT entry. Thus, the monitoring means 22 adopts the record of the FT[Group-1] as the FT record of the "PROPOSAL" file in the file arrangement table FT[Group-1, PUBLIC]. Therefore, the monitoring means 22 reads in the file entity of the conference material file located at the logical address described in the FT record of the "PROPOSAL" file that is derived from the FT[Group-1] from the secondary memory device 233. Then, the monitoring means 22 hands over the read in file entity to the conference client application 211 (Step S45 in FIG. 11).

(C-2-2) Operation at Conference Material File Transfer Time

Figure 26:
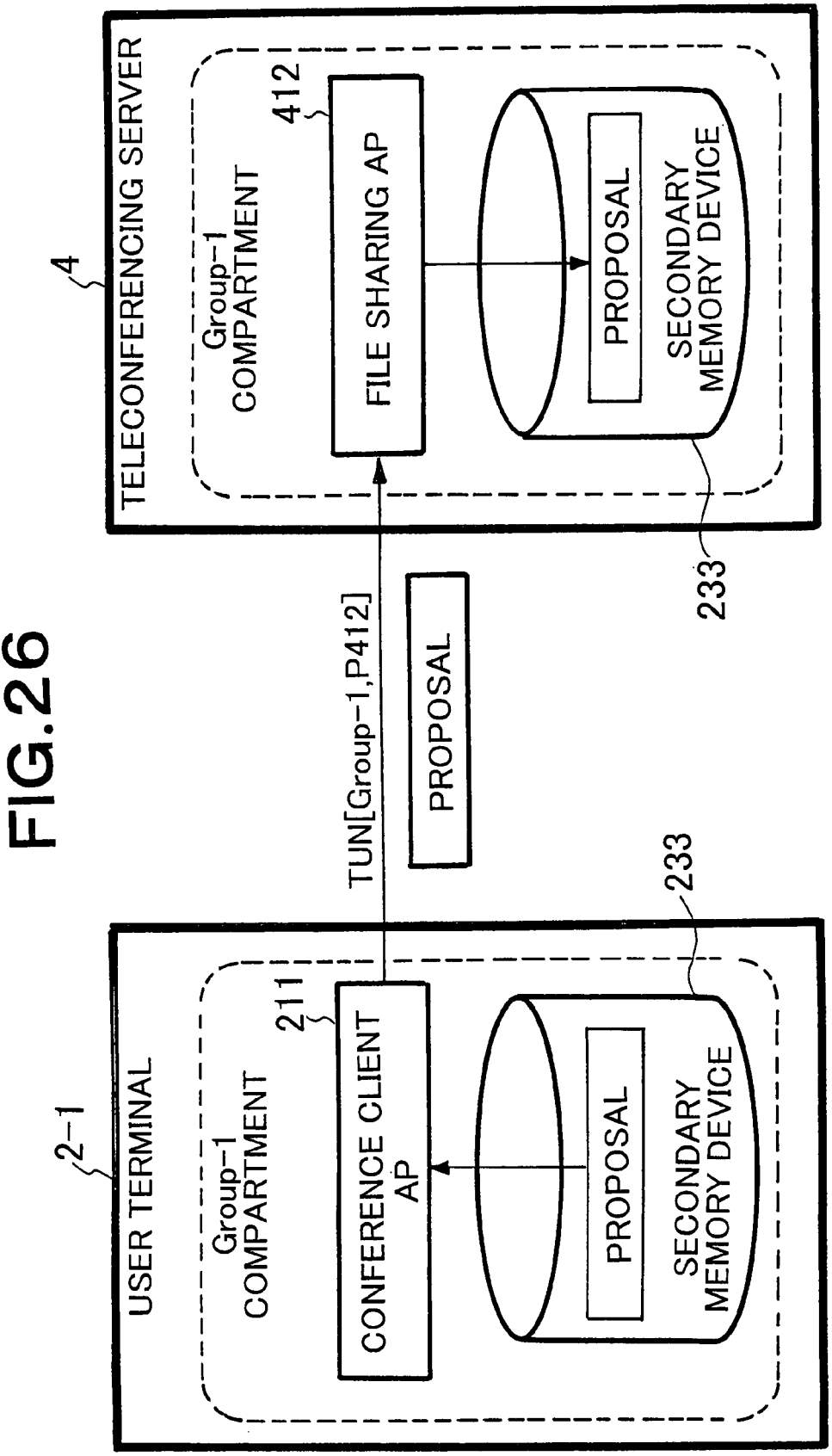
FIG. 26 is a schematic illustration of a file upload process of the exemplary system.

Now, the operation that takes place when transferring a conference material file to the teleconferencing server 4 will be described. As the conference material file is read in, the conference client application 211 of the user terminal 2-1 transfers the conference material file to the file sharing application 412 of the teleconferencing server 4. In this case, the monitoring means 22 of the user terminal 2-1 and the monitoring means 22 of the teleconferencing server 4 establish a tunnel TUN[Group-1, P412] as shown in FIG. 26 by executing a process similar to the process for connecting to the teleconferencing server 4 as described above in (B-2). Then, the conference client application 211 transfers the conference material file to the file sharing application 412. Note that P412 denotes the waiting port that the file sharing application 412 is listening to.

Upon receiving the conference material file, the file sharing application 412 stores the received conference material file in the secondary memory device 233 of the teleconferencing server 4. In this case, the monitoring means 22 of the teleconferencing server 4 identifies the file arrangement table FT[Group-1] of the Group-1 compartment by executing a process similar to the process executed by the monitoring means 22 at the time of newly preparing a conference material file as described above in (C-1). Then, the monitoring means 22 generates an FT record of the file named "PROPOSAL" and stores the file entity of the uploaded conference material file in the secondary memory device 233.

(C-3) Operation at Conference Material File Downloading Time

Now, the operation that takes place when downloading the conference material file will be described. When the user terminal 2-2 refers to the conference material file "PROPOSAL", the conference client application 211 of the user terminal 2-2 makes a connection request to the file sharing application 412 of the teleconferencing server 4. Additionally, as a result of the connection request, the monitoring means 22 of the user terminal 2-2 and that of the teleconferencing server 4 jointly establish a tunnel TUN [Group-1, P412].

Additionally, in response to the file surveying request from the conference client application 211, the file sharing application 412 issues a file surveying event to the secondary memory device 233. In this case, the monitoring means 22 of the teleconferencing server 4 generates a file arrangement table FT[Group-1, PUBLIC] by merging the file arrangement table belonging to the Group-1 compartment and the file arrangement table belonging to the PUBLIC compartment by executing a process similar to the process for reading in the conference material file described above in (C-2-1). Additionally, the monitoring means 22 extracts the file names described in each of the FT records and hands them over to the file sharing application 412. The file sharing application 412 transmits the handed file name list to the conference client application 211 of the user terminal 2-2 in response.

Note that the file "PROPOSAL" exists in the file arrangement table FT[Group-1, PUBLIC] without fail and the file entity of the file "PROPOSAL" is the conference material file uploaded form the user terminal 2-1. Therefore, the file entity that the user terminal 2-2 can refer to by the file name of "PROPOSAL" is also a conference material file. This is because, if files having a same name are found in the file arrangement table FT[Group-1] and the file arrangement table FT[PUBLIC] respectively, the FT record of the file "PROPOSAL" found in the FT[Group-1] is succeeded to the file arrangement table FT[Group-1, PUBLIC] as described above for the operation of reading in a conference material file in (C-2-1).

Figure 27:
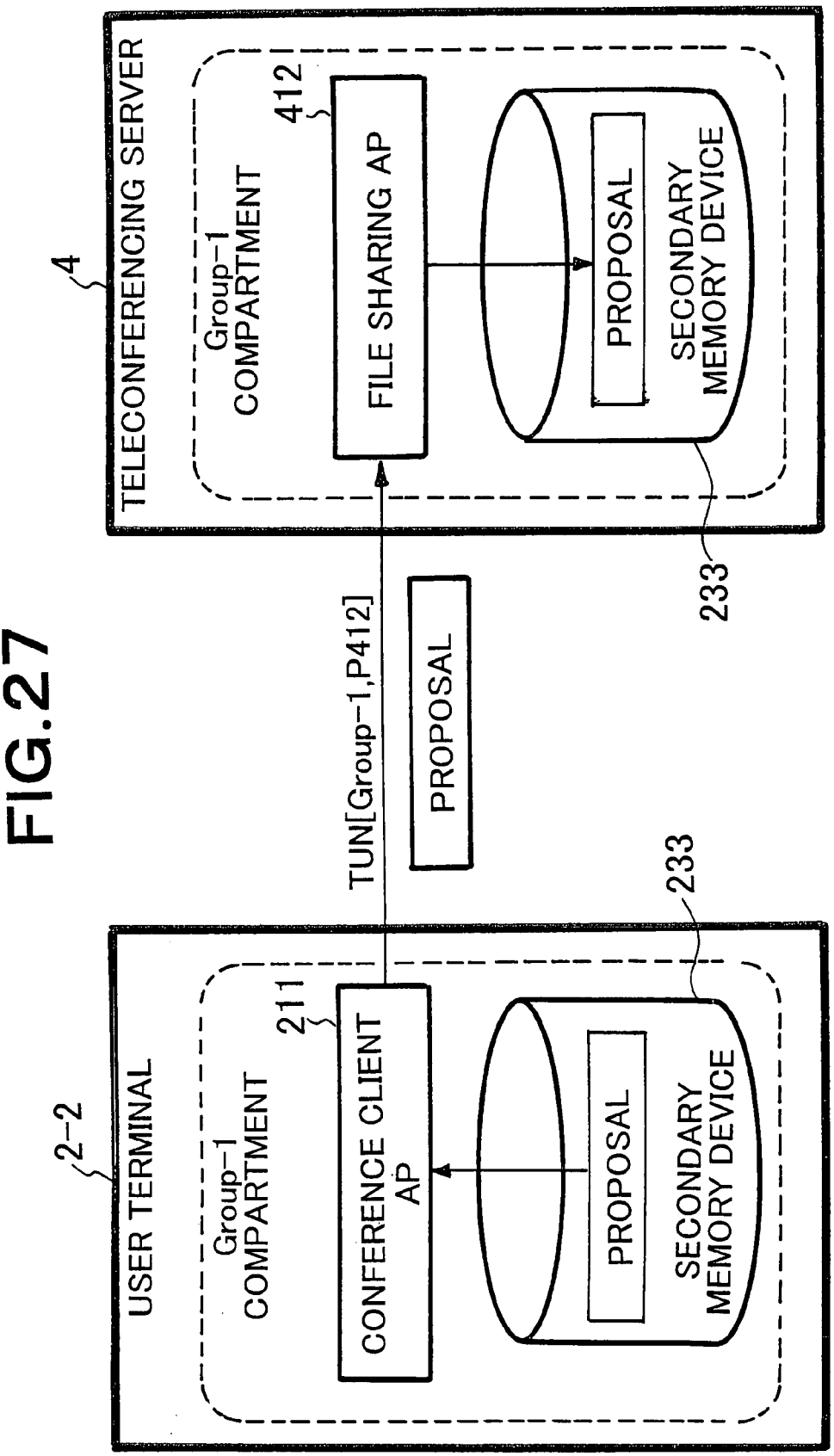
FIG. 27 is a schematic illustration of a file download process of the exemplary system.

Therefore, when the conference client application 211 of the user terminal 2-2 downloads the file "PROPOSAL" from the file sharing application 412 of the teleconferencing server 4, the downloaded file entity is reliably the most updated conference material file. Additionally, the configuration material file downloaded to the user terminal 2-2 is stored in the Group-1 compartment same as that of the conference client application 211 as shown in FIG. 27.

(D) Operation at Information Sharing Time Among Group Members Other than Teleconference Now, the operation that takes plane when group members share information other than at a teleconference will be described. The hosts having the Group-1 compartment can share a file entity in the compartment according to the processes of (A) through (C) as described above. When communicating for sharing a file, only the two hosts including the origin of communication and the destination of communication are required to mutually authenticate each other and a third party server such as a key server is not required.

Thus, as user terminals directly communicate with each other, it is possible to distribute a conference material file to the Group-1 members that do not attend the teleconference by utilizing the features of file sharing and mutual authentication as described above. It is assumed in this example that the user terminal 2-3 is the terminal that a member of the Group-1 who does not attend the teleconference uses.

The user terminal 2-2 stores the conference material file downloaded in the teleconference in the Group-1 compartment. Assume here that the user of the user terminal 2-2 meets the user of the user terminal 2-3 and wants to deliver the conference material file to the user of the user terminal 2-3. In this example, a file exchange application 213 for mutually transferring a file is installed in both the user terminal 2-2 and the user terminal 2-3. Additionally, the file exchange application 213 of the user terminal 2-2 and that of the user terminal 2-3 are started already as objects commonly belonging to the Group-1 compartment.

Firstly, the file exchange application 213 of the user terminal 2-2 issues a connection request event for connection to the file exchange application 213 of the user terminal 2-3. Then, the monitoring means 22 of the user terminal 2-2 and the monitoring means 22 of the user terminal 2-3 mutually authenticate each other by means of the authentication key of the Group-1 and establish a tunnel TUN[Group-1, P213]. Note that P213 denotes the waiting port that the file exchange application 213 is listening to.

Figure 28:
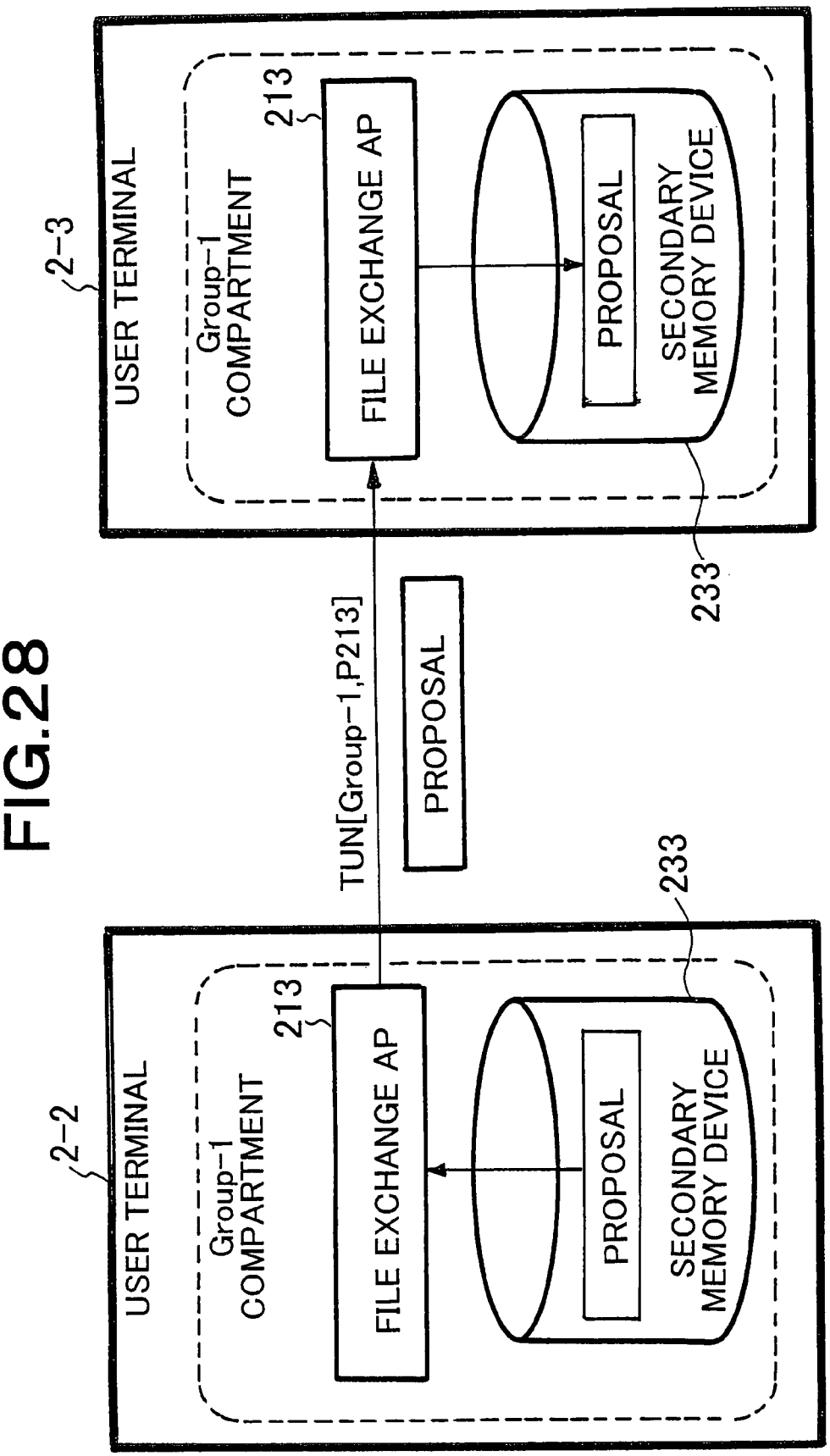
FIG. 28 is a schematic illustration of a file exchange process between two user terminals of the exemplary system.

The file exchange application 213 of the user terminal 2-2 transfers the conference material file to the file exchange application 213 of the user terminal 2-3. Then, the file exchange application 213 of the user terminal 2-3 stores the transferred conference material file in the secondary memory device 233 as a file that belong to the Group-1 compartment as shown in FIG. 28.

If the user terminal 2-4 that does not belong to the Group-1 tries to acquire the conference material file from the file exchange application 213 of the user terminal 2-2, both the monitoring means 22 of the user terminal 2-2 and the monitoring means 22 of the user terminal 2-4 fail in mutual authentication. Therefore, the file exchange application 213 of the user terminal 2-2 cannot transfer the conference material file to the file exchange application 213 of the user terminal 2-4.

Assume now that the user terminal 2-3 also belongs to Group-2 that is different from the Group-1. Then, if the conference material file is transferred to the user terminal 2-5 that belongs only to the Group-2, the application 21 that can access the conference material file only on the user terminal 2-3 is limited to the objects belonging to the Group-1 compartment. Therefore, both the monitoring means 22 of the user terminal 2-3 and the monitoring means 22 of the user terminal 2-5 fail in mutual authentication. Therefore, it is not possible to transfer the conference material file to the user terminal 2-5. This also applies to a case where the same file exchange application 213 is operating in both the Group-1 compartment and the Group-2 compartment.

Thus, the user terminals 2 that belong to a same group can freely share information regardless of the sharing method but information does not leak to any user terminals that do not belong to the group.

(Second Embodiment)

Figure 29:
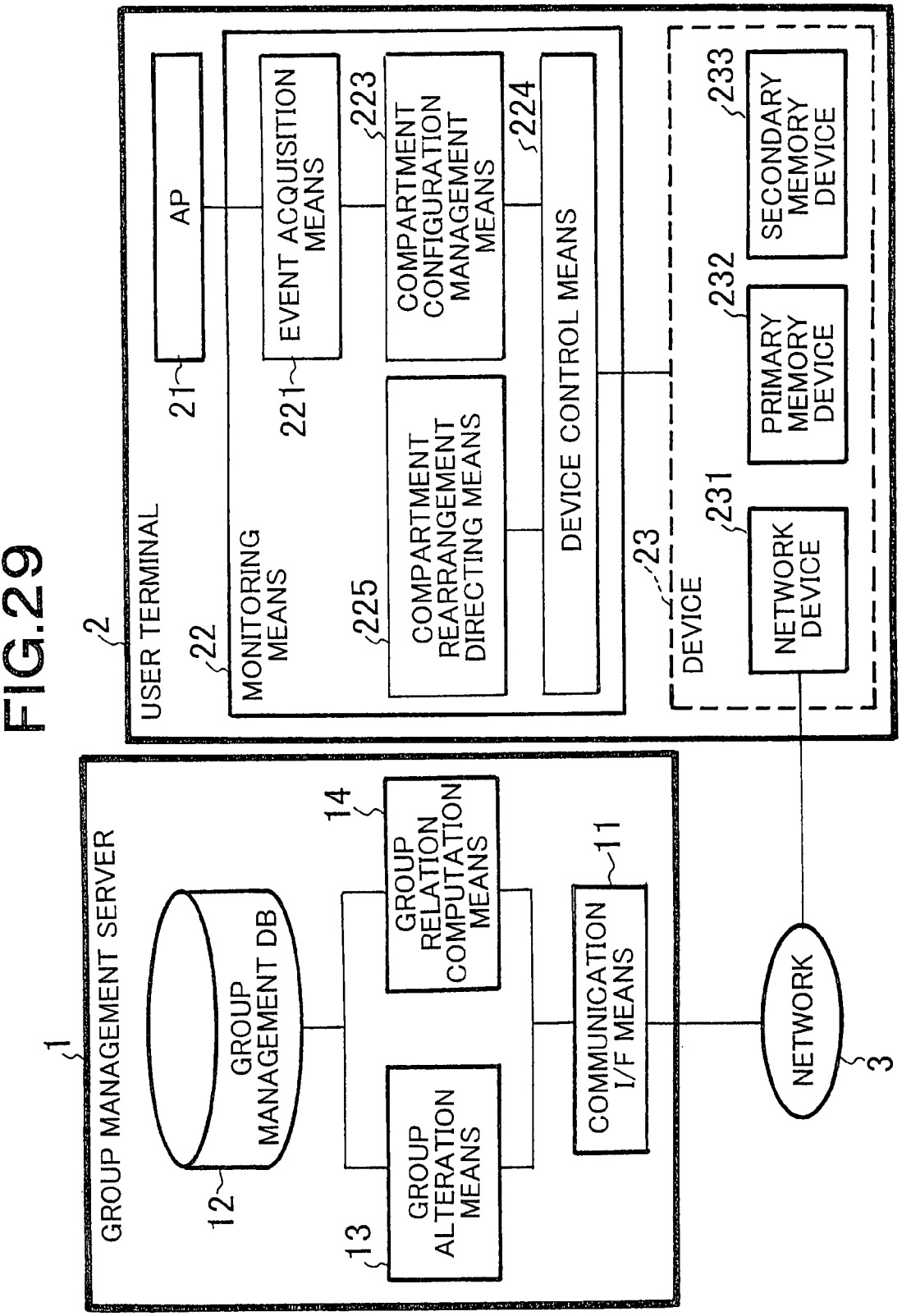
FIG. 29 is a schematic block diagram of the group management server and the user terminals of the second embodiment, showing a possible configuration thereof.

Now, the second embodiment of the present invention will be described by referring to the related drawings. FIG. 29 is a schematic block diagram of the group management server 1 and the user terminals 2 of the second embodiment, showing a possible configuration thereof. As shown in FIG. 29, the group management server 1 of this embodiment comprises a group alteration means 13 and a group relation computation means 14 in addition to the components of the group management server 1 of the first embodiment. The monitoring means 22 of each of the user terminals 2 has a compartment rearrangement directing means 225 in place of the compartment generation means 221 of the first embodiment.

To be more specific, the group alteration means 13 and the group relation computation means 14 are realized by the CPU of the group management server 1 that operates according to programs. The group alteration means 13 has a function of altering the configuration of any group. As the communication interface means 11 receives a group assignment alteration request such as a request for newly jointing a group or a request for withdrawing from a group from any of the user terminals 2, the group alteration means 13 updates the group management database 12 to alter the configuration of the group.

The group relation computation means 14 has a function of referring to all the groups. As the communication interface means 11 receives a member ID from any of the user terminals 2, the group relation computation means 14 refers to all the groups including the group having the received member ID based on the group management database 12. The group relation computation means 14 also has a function of extracting the sequence of the group IDs and the authentication keys of all the groups (to be referred to as group ID/authentication key sequence hereinafter) to be sent back to the user terminal 2 from the group management database 12. The group relation computation means 14 also has a function of generating a group adjacency matrix, which is a matrix indicating the adjacency relationship and the inclusion relationship among groups, based on the inclusion relationship of the groups. The group relation computation means 14 also has a function of sending back (transmitting) the group ID/authentication key sequence and the group adjacency matrix to the user terminal 2 via the communication interface means 11 and the network 3.

The compartment rearrangement directing means 225 has a function of receiving the group ID/authentication key sequence delivered from the group management server 1 via the network 3, the device control means 224 and the network device 231. The compartment rearrangement directing means 225 also has a function of directing the compartment configuration management means 223 to alter the configuration of the compartment configuration graph G based on the group ID/authentication key sequence and the group adjacency matrix delivered to it.

While the group management server 1 has the group relation computation means 14 in the above description of the embodiment, it may alternatively be so arranged that each of the user terminal 2 has a group relation computation means 14. If such is the case, the user terminal 2 generates a group adjacency matrix, using the group relation computation means 14, and rearranges the compartment based on the generated group adjacency matrix.

Figure 30:
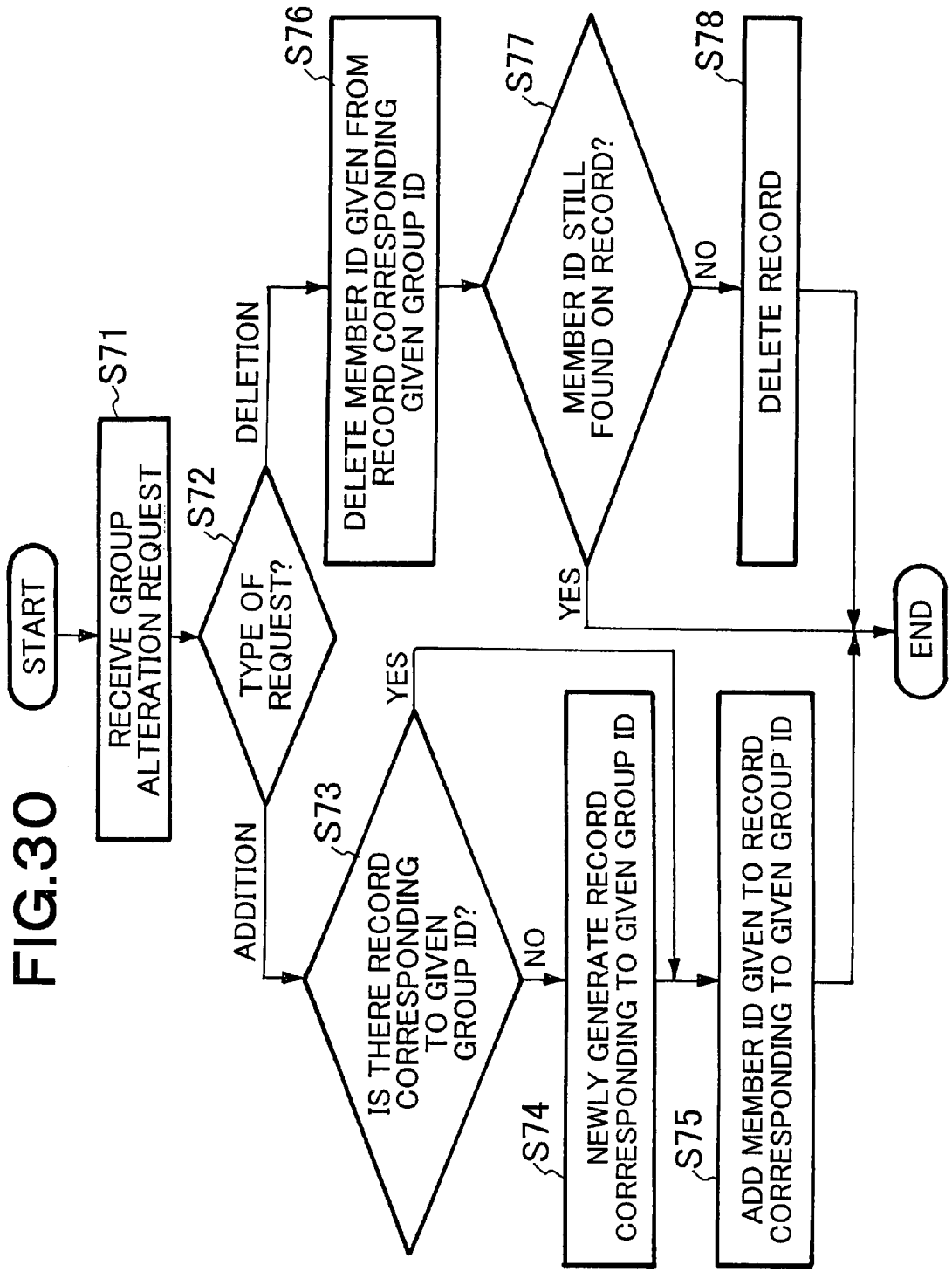
FIG. 30 is a flowchart of a group alteration process that the group management server can execute in the second embodiment.

Now, the operation of this embodiment will be described below. Firstly, the operation of a group alteration process for altering a group will be described. FIG. 30 is a flowchart of a group alteration process that the group management server 1 can execute in the second embodiment. Referring to FIG. 30, when the user of a user terminal 2 wants to alter the group it belongs to, he or she operates the user terminal 2 and directs it to connect itself to the group management server 1. Thus, the user terminal 2 of the user who wants to alter the group is connected to the group management server 1 via the network 3. Then, the user terminal 2 transmits a group alteration request that includes at least the identifier of the altering operation (addition or deletion), the group ID and the member ID of the user. Thus, the group management server 1 receives the group alteration request via the network 3 (Step S71).

The group alteration request is transmitted to the group alteration means 13 via the communication interface means 11. Upon receiving the group alteration request from the communication interface means 11, the group alteration means 13 determines if the type of the alteration request is "addition" or "deletion" of a group based on the operation identifier of the group alteration request (Step S72). Then, the group alteration means 13 proceeds to an alteration process for group addition or to an alteration process for group deletion depending on the result of the determination that is "addition" or "deletion", which will be described below.

(A) Alteration Process for Group Addition

Firstly, the alteration process for group addition will be described. If the operation identifier of the group alteration request indicates "addition", the group alteration means 13 retrieves the record of the group management database 12, using the group ID contained in the group alteration request as key. Then, the group alteration means 13 determines if the group management database 12 contains a record that corresponds to the group ID or not (Step S73).

If, as a result, there is no corresponding record, the group alteration means 13 prepares a new record in the group management database 12 (Step S74). The group alteration means 13 randomly generates a new authentication key and stores it in the generated new record, associating it with the group ID and the member ID contained in the group alteration request. For example, the group alteration means 13 may randomly generate an authentication key, using a random number. Note that, when newly generating an authentication key, the group alteration means 13 generates a key that is different from any authentication key in the group management database 12.

If, on the other hand, the group alteration means 13 can retrieve a record in Step S73 (and hence there is a record corresponding to the group ID), the group alteration means 13 adds the member ID contained in the group alteration request as a new member ID and ends the group alteration process (Step S75).

(B) Alteration Process for Group Deletion

Now, the alteration process for group deletion will be described. If the operation identifier of the group alteration request indicates "deletion", the group alteration means 13 retrieves the record corresponding to the group ID from the group management database 12 based on the group ID and the member ID contained in the group alteration request. Then, the group alteration means 13 deletes the member ID contained in the group alteration request from the extracted record (Step S76).

Then, the group alteration manes 13 determines if the record contains one or more than one member IDs after the deletion of the member ID or not (Step S77). If it is determined that the record contains one or more than one member IDs, the group alteration means 13 immediately ends the group alteration process. If, on the other hand, it is determined that the record does not contain any member ID any longer, the group alteration means 13 deletes the record from the group management database 12 and ends the group alteration process (Step S78).

Now, the operation of a compartment rearrangement process for rearranging a compartment will be described. The process that the group management server 1 executes and the process that the user terminal 2 executes will be described separately for the compartment rearrangement process.

(A) Process of Group Management Server

Figure 31:
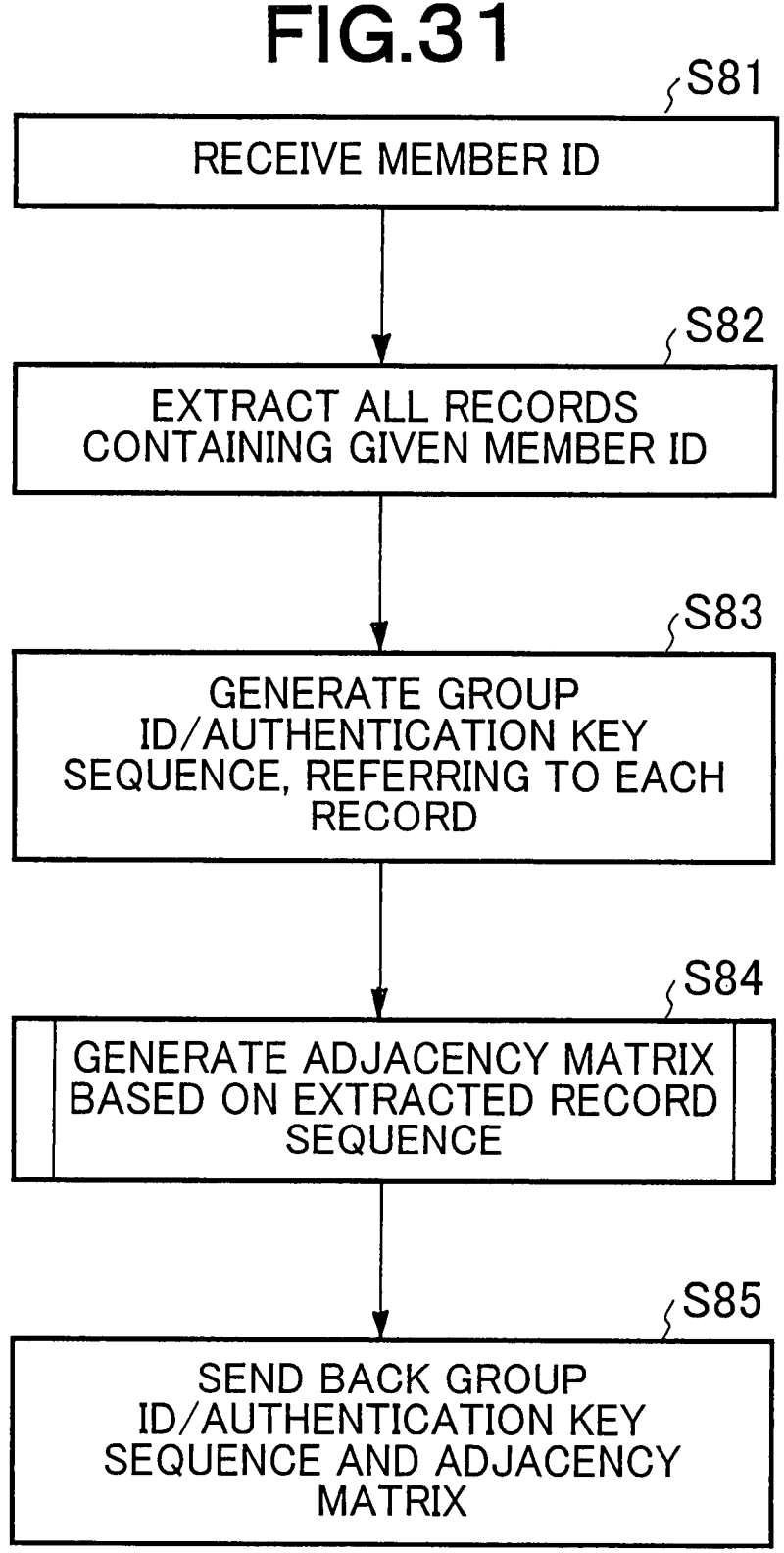
FIG. 31 is a flowchart of a group relation computation process that the group relation computation means of the group management server can execute for computationally determining the relations among groups in the second embodiment.

Firstly, the process that the group management server 1 executes will be described. FIG. 31 is a flowchart of a group relation computation process that the group relation computation means 14 of the group management server 1 can execute for computationally determining the relations among groups in the second embodiment. Referring to FIG. 31, the compartment rearrangement directing means 225 of the user terminal 2 transmits the member ID to the group management server 1 via the network 3, the network device 231 and the device control means 224 typically when the user terminal 2 is started. Then, the communication interface means 11 of the group management server 1 receives the member ID from the user terminal 2 (Step S81).

Thereafter, the communication interface means 11 transmits (outputs) the received member ID to the group relation computation means 14. Then, the group relation computation means 14 extracts all the records containing the received member ID from the group management database 12 (Step S82). Additionally, the group relation computation means 14 generates a group ID/authentication key sequence based on each of the extracted records (Step S83).

Subsequently, the group relation computation means 14 generates an adjacency matrix showing the order relationship of the groups contained in the extracted group ID/authentication key sequence (Step S84). Then, the group relation computation means 14 sends back (transmits) the group ID/authentication key sequence and the adjacency matrix it generates to the compartment rearrangement directing means 225 of the user terminal 2 via the communication interface means 11 and the network 3 (Step S85).

Figure 32:
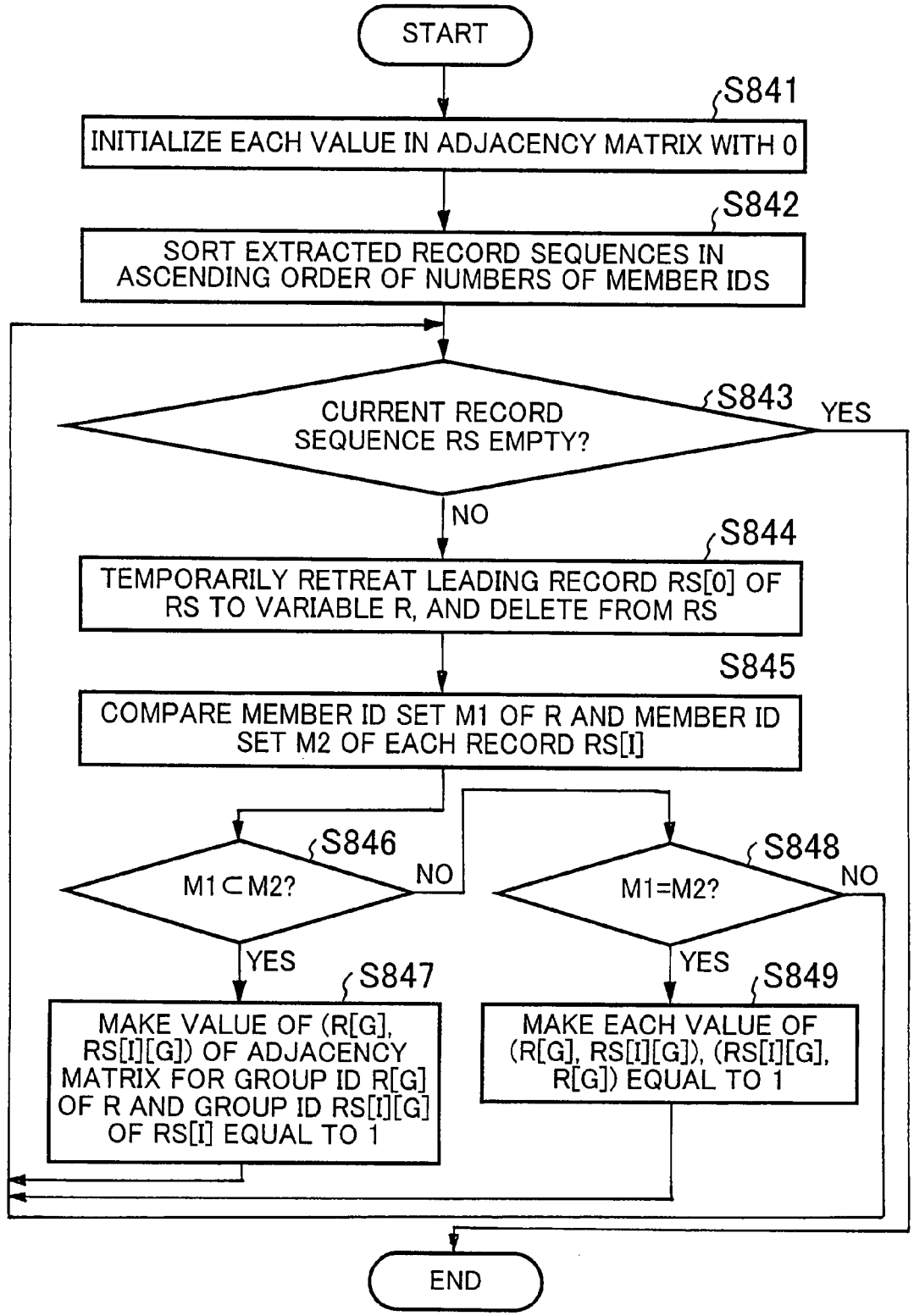
FIG. 32 is an adjacency matrix computation process that the group relation computation means can execute to computationally determine an adjacency matrix in the second embodiment.

The process of computationally determining the adjacency matrix in Step S84 will be described below. FIG. 32 is a flowchart of an adjacency matrix computation process that the group relation computation means 14 can execute to computationally determine an adjacency matrix in the second embodiment. Referring to FIG. 32, firstly if the number of records of the record sequence extracted in Step S82 is N, the group relation computation means 14 generates an adjacency matrix of N×N and initializes the value of each of the rows and the columns of the generated matrix to 0 (Step S841). In other words, the group relation computation mans 14 generates an initial matrix of the adjacency matrix.

Then, the group relation computation means 14 counts the number of IDs contained in each set of member IDs. Then, the group relation computation means 14 sorts the record sequences in the ascending order of the determined numbers of IDs and determines the sorted record sequence RS (Step S842). Thereafter, the group relation computation means 14 counts the number of records of the record sequence RS and tests (judges) if the number of records is equal to 0 or not (Step S843). If, as a result, it is determined that the number of records of the record sequence RS is equal to 0, the group relation computation means 14 immediately ends the computation process.

If, on the other hand, it is determined that the record sequence RS contains at least a record, the group relation computation means 14 temporarily retreats (stores) the leading record RS[0] of the record sequence RS to a predetermined variable r and deletes the leading record RS[0] from the record sequence RS (Step S844). Then, the group relation computation means 14 extracts the member ID set M1 of the variable r and the member ID set M2 of the records RS[i] of the record sequence RS and compares the inclusion relation of the member ID set M1 and the member ID set M2, following the sequence as described below (Step S845).

Firstly, the group relation computation means 14 tests (judges) if the member ID set M1 is "truly" included in the member ID set M2 or not and hence if M1□M2 or not (Step S846). If, as a result, it is determined that M1□M2 holds true, the group relation computation means 14 sets the value (r[G], RS[i][G]) located at the row r[G] and the column RS[i][G] in the adjacency matrix to 1 for the group ID (r[G]) of the variable r and the group ID (RS[i][G]) of the record RS[i] (Step S847) and returns to Step S843.

If, on the other hand, it is determined M1□M2 does not hold true, the group relation computation means 14 tests (judges) if M1=M2 or not (Step S848). If, as a result, it is determined that M1=M2, the group relation computation means 14 sets the two values of the matrix elements (r[G], RS[i][G]) and (RS[i][G], r[G]) to 1 (Step S849) and returns to Step S843.

As the processing operations from Step S841 to Step S849 are carried out, it is possible to encode the inclusion relation and the equivalence relation of the members of any group that includes the member ID of the user terminal 2.

(B) Process of User Terminal

Figure 33:
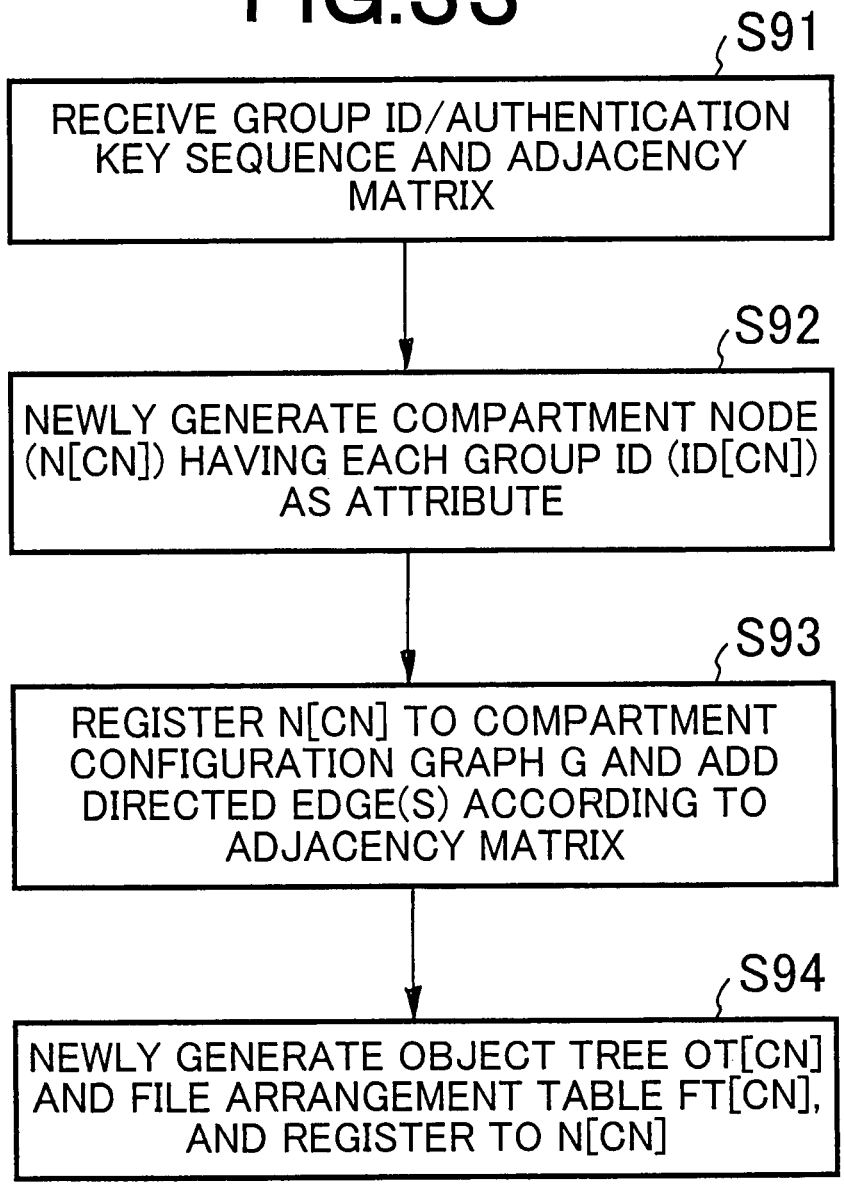
FIG. 33 is a flowchart of a process that the compartment rearrangement directing means can execute to direct a rearrangement of compartments in the second embodiment.

Now, the process that the user terminal 2 executes will be described below. FIG. 33 is a flowchart of a process that the compartment rearrangement directing means 225 can execute to direct a rearrangement of compartments in the second embodiment. Referring to FIG. 33, as an adjacency matrix is generated in Step S84, the compartment rearrangement directing means 225 of the user terminal 2 receives the group ID/authentication key sequence and the adjacency matrix from the group management server 1 via the network 3, the network device 231 and the device control means 224 (Step S91). Then, the compartment rearrangement directing means 225 directs to generate a compartment node based on each of the combinations of a group ID and an authentication key contained in the group ID/authentication key sequence like the compartment generation directing means 222 described above for the first embodiment.

Then, the compartment rearrangement directing means 225 has each of the generated compartment nodes registered to the compartment configuration graph G that is managed by the compartment configuration management means 223. In this case, the compartment rearrangement directing means 225 directs to add directed edges connecting the registered compartment nodes (Step S93).

Figure 34:
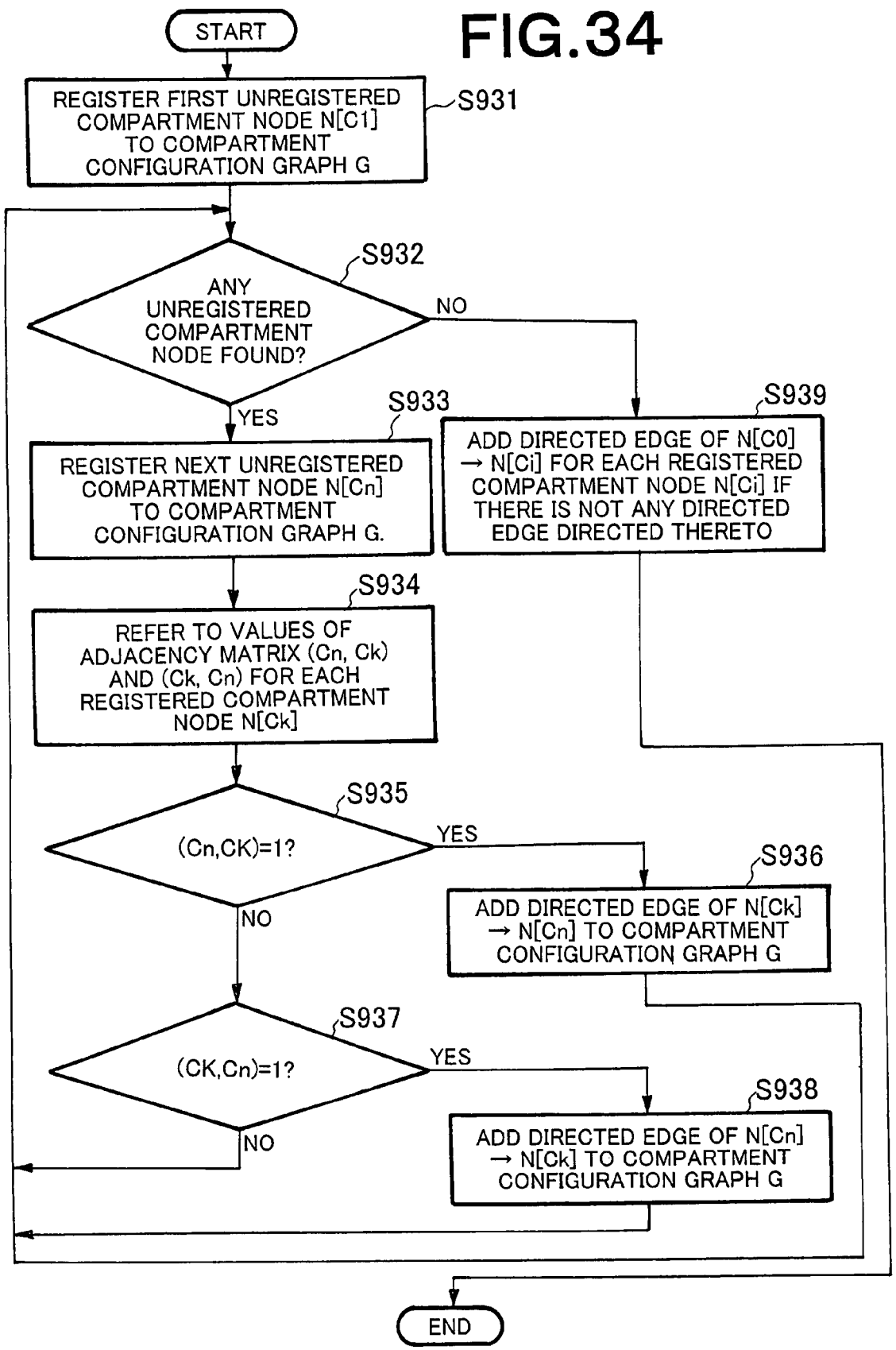
FIG. 34 is a flowchart of a process that can be executed to register a compartment node to a compartment configuration graph in the second embodiment.

FIG. 34 is a flowchart of a process that can be executed to register a compartment node to a compartment configuration graph in the second embodiment. Referring to FIG. 34, the compartment rearrangement directing means 225 directs the compartment configuration management means 223 to register the compartment node N[C1] generated in Step S92 as in the case of the compartment generation directing means 221 of the first embodiment.

Then, the compartment rearrangement directing means 225 determines if there is an unregistered compartment node yet or not (Step S932). If, as a result, it is determined that there is no unregistered compartment node, the compartment rearrangement directing means 225 immediately moves to Step S939.

If, on the other hand, it is determined that there still is an unregistered compartment node, the compartment rearrangement directing means 225 has (the second or the subsequent) unregistered compartment node N[Cn] registered to the compartment configuration graph G (Step S933). Additionally, the compartment rearrangement directing means 225 refers to the values of (Cn, Ck) and (Ck, Cn) of the adjacency matrix for each of the compartment nodes N[Ck] registered so far (Step S934).

Thereafter, the compartment rearrangement directing means 225 determines if the value of (Cn, Ck) is equal to 1 or not. If, as a result, it is determined that the value of (Cn, Ck) is equal to 1, the compartment rearrangement directing means 225 has a directed edge that is directed from N[Ck] to N[Cn] added (Step S936) and returns to Step S932. If, on the other hand, it is determined that the value of (Cn, Ck) is not equal to 1, the compartment rearrangement directing means 225 then determines if the value of (Ck, Cn) is equal to 1 or not (Step S937). If, as a result, it is determined that the value of (Ck, Cn) is equal to 1, the compartment rearrangement directing means 225 has a directed edge that is directed from N[Cn] to N[Ck] added (Step S938) and returns to Step S932. If, on the other hand, it is determined that the value of (Ck, Cn) is not equal to 1, the compartment rearrangement directing means 225 then returns to Step S932.

If it is determined in Step S932 that there is not any unregistered compartment node, the compartment rearrangement directing means 225 sequentially refers to all the directed edges connected to N[Cn] in the compartment configuration graph G at that time and determines if there is a directed edge that is directed to N[Cn] or not. If it is determined that there is not any such directed edge, the compartment rearrangement directing means 225 directs to add a directed edge that is directed from the lowest order compartment node N[C0] to N[Cn] (Step S939).

After having a directed edge added, the compartment rearrangement directing means 225 directs to newly generate an object tree OT[Cn] and a file arrangement table FT[Cn] for each of the newly registered compartment modes N[Cn] as in the case of the compartment generation means 221 of the first embodiment as shown in FIG. 33. Then, the compartment rearrangement directing means 225 has the object tree OT[Cn] and the file arrangement table FT[Cn] registered as attributes of the compartment node N[Cn].

The operations of the processing Steps S91 through S94 of FIG. 33 (including Steps S931 through S939 in FIG. 34) are carried out in the above-described manner. As a result, the structure of the compartment configuration graph G that the compartment configuration management means 223 of the user terminal 2 manages can be made to satisfy the relationship requirement of Cn<Cm for the security level of the compartment Cn that corresponds to a certain group Gn and the security level of the compartment Cm that corresponds to a group Gm included in the group Gn. In other words, any piece of information shared within the group Gn can be shared within the group Gm but conversely any piece of information shared within the group Gm cannot be shared within the group Gn. With this arrangement, it is possible to prevent information from flowing from the Group Gm to the group Gn.

Figure 35:
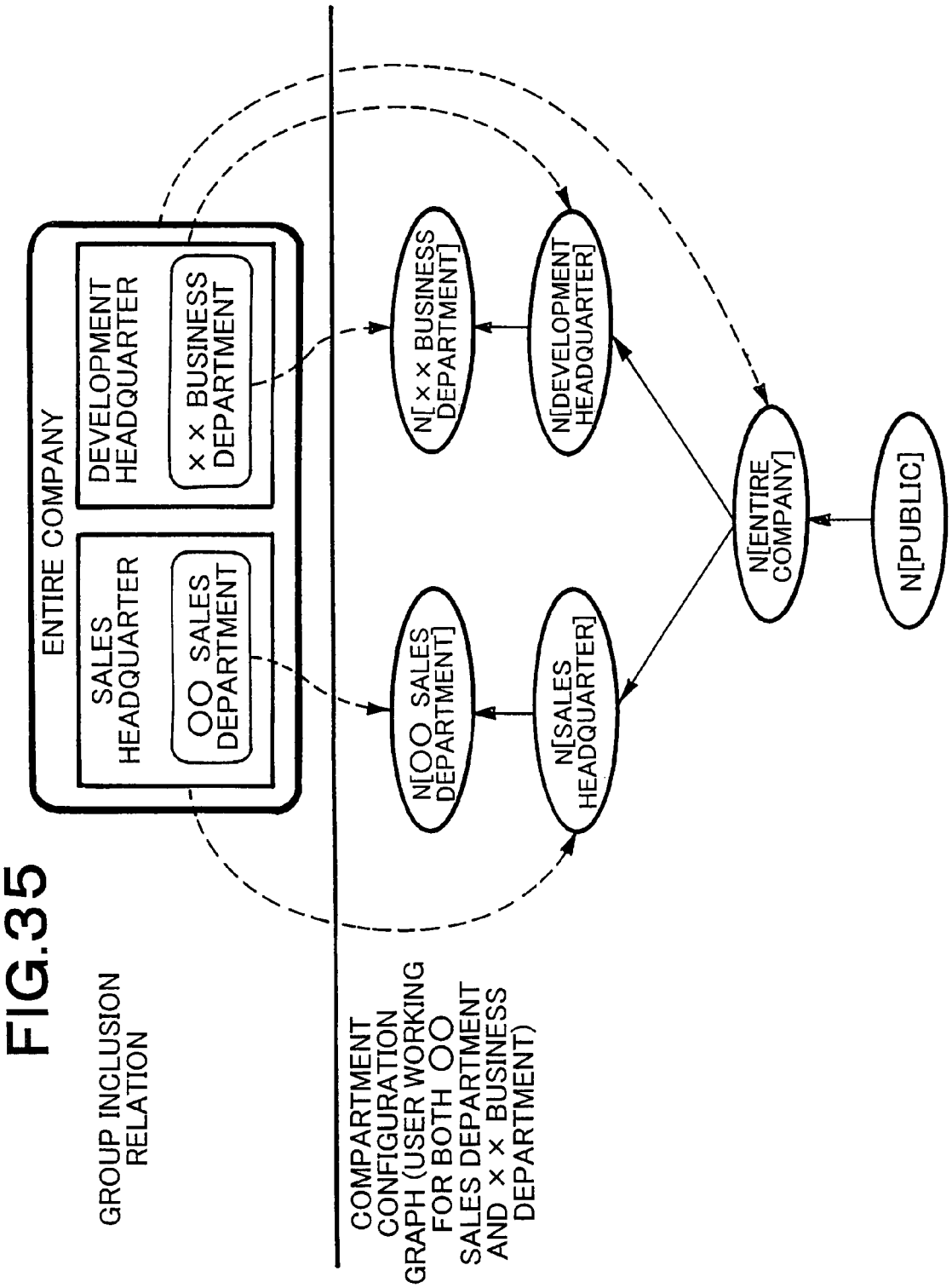
FIG. 35 is a schematic illustration of inclusion relationship of systems that can be used in the second embodiment.

For example, it is possible to automatically draw a compartment configuration graph that matches the inclusion relation of an organization by using this embodiment of information sharing system typically as shown in FIG. 35. More specifically, in the instance illustrated in FIG. 35, the members of "the oo sales department" can share not only information limited to "the oo sales department" but also information of higher order organizations such as "the sales headquarter" and "the entire company". However, a member who works for both "the oo sales department" and "the xx business department" cannot leak any information that is limited to either of the two department because the two department do not have any inclusion relation.

As described above, in this embodiment, the group relation computation means 14 of the group management server 1 extracts the groups that users respectively belongs to and generates an adjacency matrix, computationally determining the inclusion relation of the groups. On the other hand, the compartment rearrangement directing means 225 of the user terminal 2 generates compartments that correspond to respective groups and defines the security level of the compartment that corresponds a group based on an adjacency matrix in such a way that the security level of a smaller group is higher than the security level of a broader group that includes the former group without fail.

With this arrangement, a user of a smaller group can refer to and edit information that is shared by the members of a broader group so as to take it into the smaller group and make it shared by the members of the latter group, while freely editing information being limitedly shared by the members of the smaller group. It is also possible to prevent any exchange of information from taking place among groups that do not have any inclusion relation. Thus, it is now possible to make information to be shared in a closed manner within a smaller group and also between a broader group and the smaller group, while prevent information from leaking to any unrelated groups.

(Third Embodiment)

Figure 36:
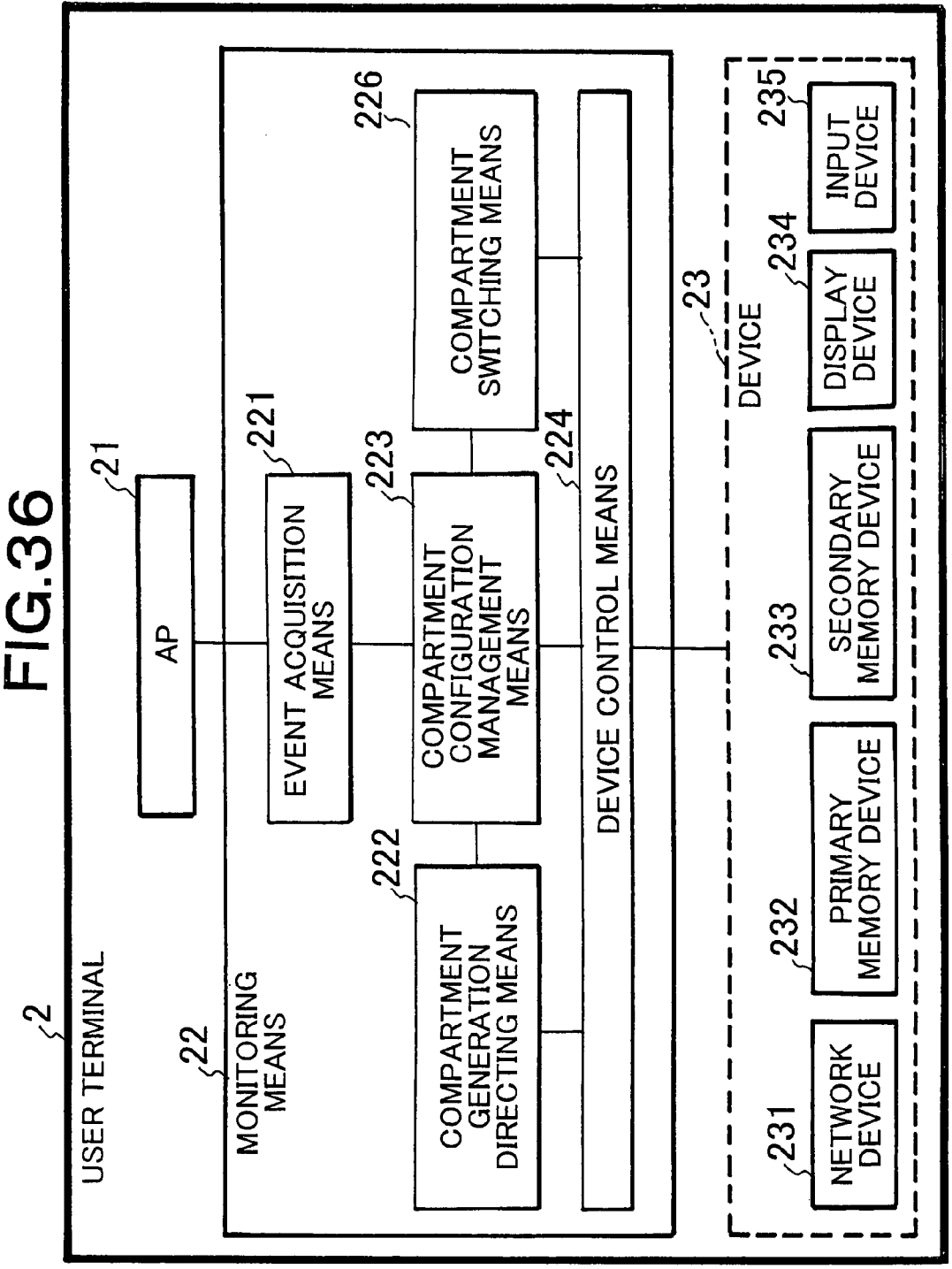
FIG. 36 is a schematic block diagram of a user terminal of the third embodiment, showing a possible configuration thereof.

Now, the third embodiment of the invention will be described below by referring to the related drawings. FIG. 36 is a schematic block diagram of a user terminal of the third embodiment, showing a possible configuration thereof. As shown in FIG. 36, the monitoring means 22 of the user terminal 2 comprises a compartment switching means 226 in addition to the components of the monitoring means 22 of the first embodiment. Additionally, the user terminal 2 includes a display device 234 and an input device 235 as devices 23 in addition to the various devices described above for the first embodiment.

To be more specific, the display device 234 is a display apparatus of the user terminal 2 such as a CRT. The input device 235 is an input apparatus such as a keyboard/mouse. The display device 234 and the input device 235 are connected to the compartment switching means 226 via the device control means 224. The compartment switching means 226 functions to have the display device 234 display a compartment switching dialog via the device control means 224 when a predetermined input operation is performed by the user at the input device 235. Additionally, the compartment switching means 226 functions to transmit (output) a compartment switching request to the compartment configuration management means 223 according to a compartment switching operation of the user.

Figure 37:
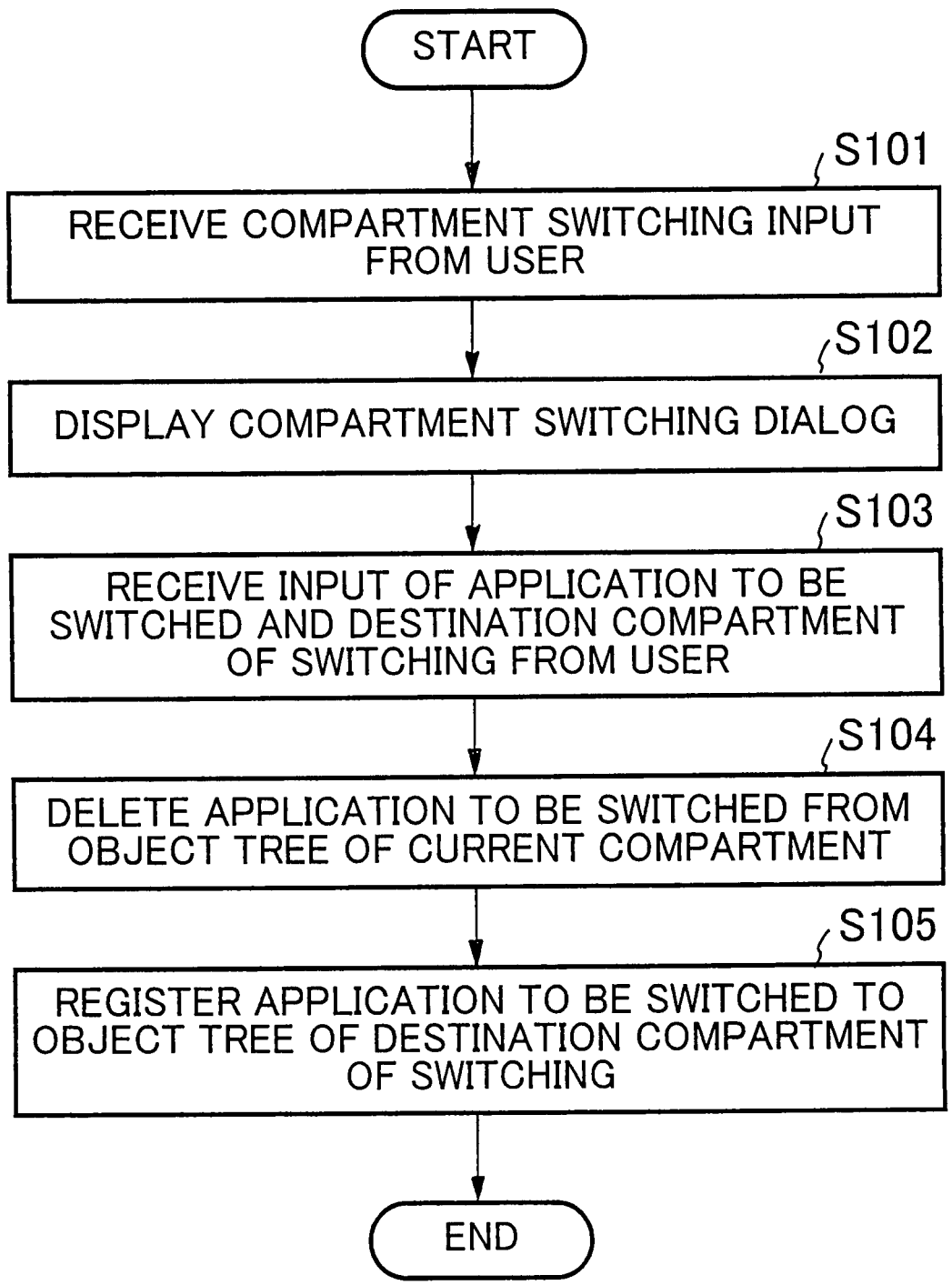
FIG. 37 is a flowchart of a compartment switching process that a compartment switching means can execute to switch compartments in the third embodiment.

Now, the operation of this embodiment will be described below. FIG. 37 is a flowchart of a compartment switching process that a compartment switching means 226 can execute to switch compartments in this embodiment. Referring to FIG. 37, the user gives a predetermined input directive (e.g., by depressing a key) to switch a compartment by means of the input device 235 of the user terminal 2. Then, the compartment switching means 226 receives the compartment switching input request according to the user's directing operation (Step S101). Subsequently, the compartment switching means 226 has the display device 234 display a compartment switching dialog for a compartment switching operation.

Figure 38:
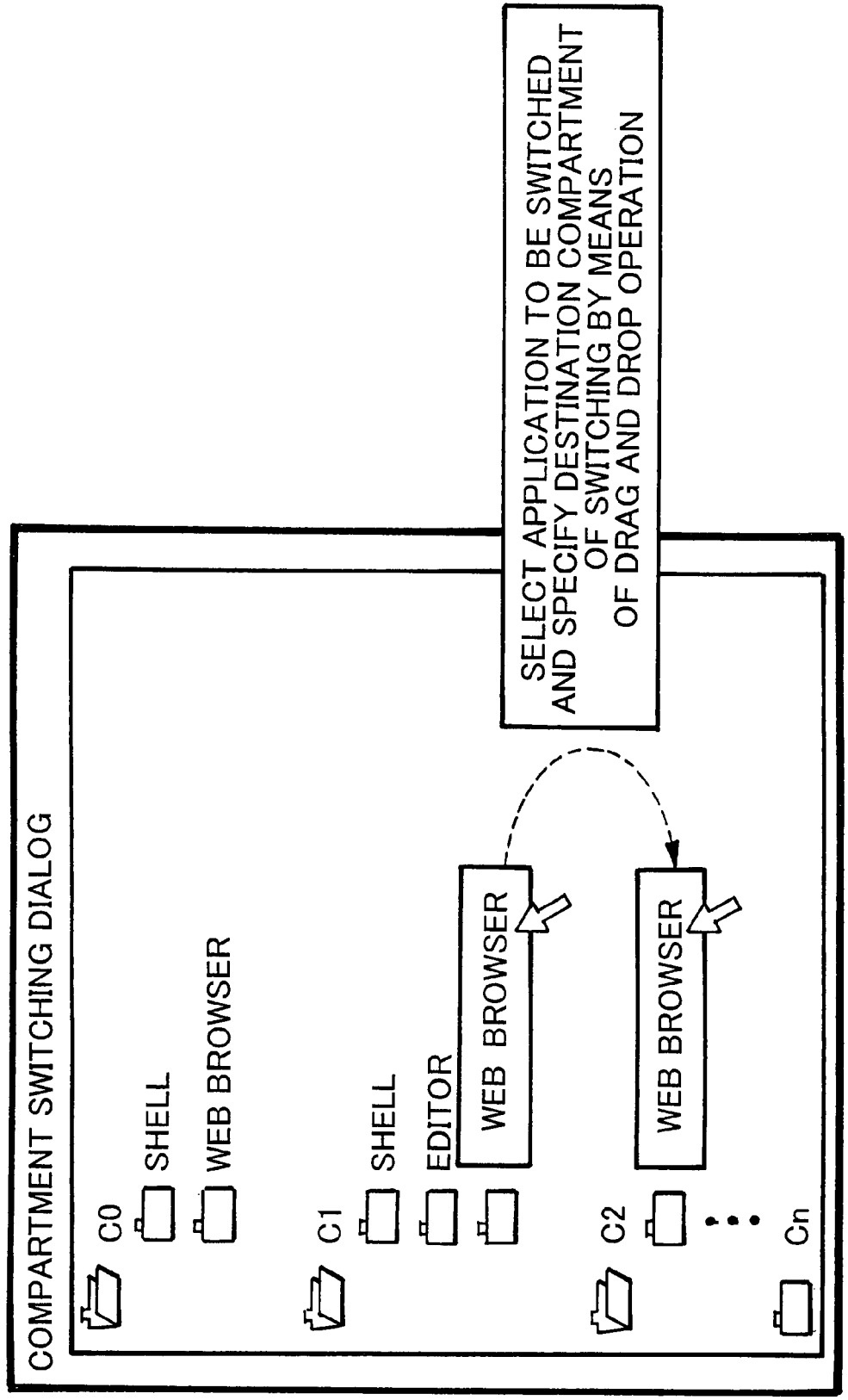
FIG. 38 is a schematic illustration of a compartment switching dialog that a user terminal can display in the third embodiment.

FIG. 38 is a schematic illustration of a compartment switching dialog that a user terminal 2 can display in this embodiment. As shown in FIG. 38, the compartment switching dialog includes at least a group ID list, the group IDs being the identifiers of all the compartments that the compartment configuration management means 223 manages, and a list of applications 21 that is managed by means of the object trees belonging to the respective compartments.

Then, the user further operates the input device 235 to select and indicate the application 21 to be used for compartment switching and specifies the compartment to be selected. The compartment switching means 226 selects the application 21 according to the user's directing operation and input it to the compartment to be selected (Step S103).

When the compartment to be selected is specified, it is desirable that the compartment switching means 226 determines the security level of the selected component Cn and confirms that the security level of the selected compartment Cn is not lower than the security level of the compartment Cm to which the application 21 currently belongs. If the security level of the selected compartment Cn is not higher than the security level of the compartment Cm, the compartment switching means 226 has an error message displayed so as to return to the processing step of Step S103. To compare the security levels of different compartments, the compartment switching means 226 may determine if the compartment node N[Cn] can be reached from the compartment node N[Cm], tracing a directed edge or directed edges on the compartment configuration graph G.

Thereafter, the compartment switching means 226 inputs the application 21 selected for switching and the selected compartment and then directs the compartment configuration management means 223 to delete the object node of the application 21 from the current object tree (Step S104). Then, the compartment switching means 226 has the selected application registered to the object tree of the selected compartment (Step S105).

Figure 39:
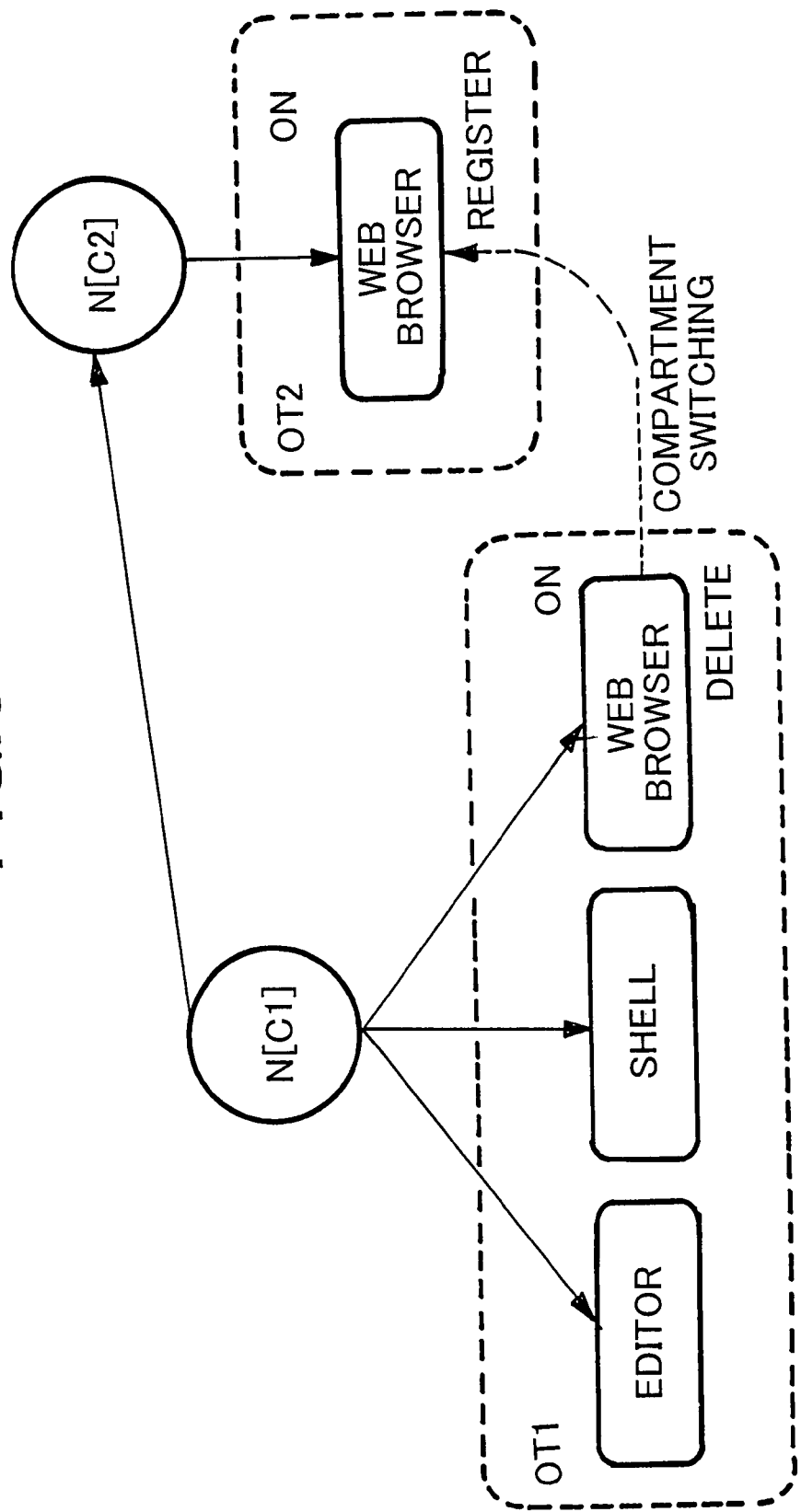
FIG. 39 is a schematic illustration of a change in compartment configuration graph that can take place as a result of a compartment switching process in the third embodiment.

More specifically, as shown in FIG. 39, the monitoring means 22 deletes the link to the parent node on the current object tree OT1 for the object node ON of the application 21 and re-registers all the children nodes to the OT1 as new children nodes of the parent node. Then, the monitoring means 22 registers the object node ON as a new child node of the root node on the object tree OT2 that belongs to the selected compartment.

As the processing operations of Steps S101 through S105 are carried out in the above-described manner, the user can easily grasp the compartment that is being currently operated and explicitly specify a compartment of operation for each application 21.

Figure 40:
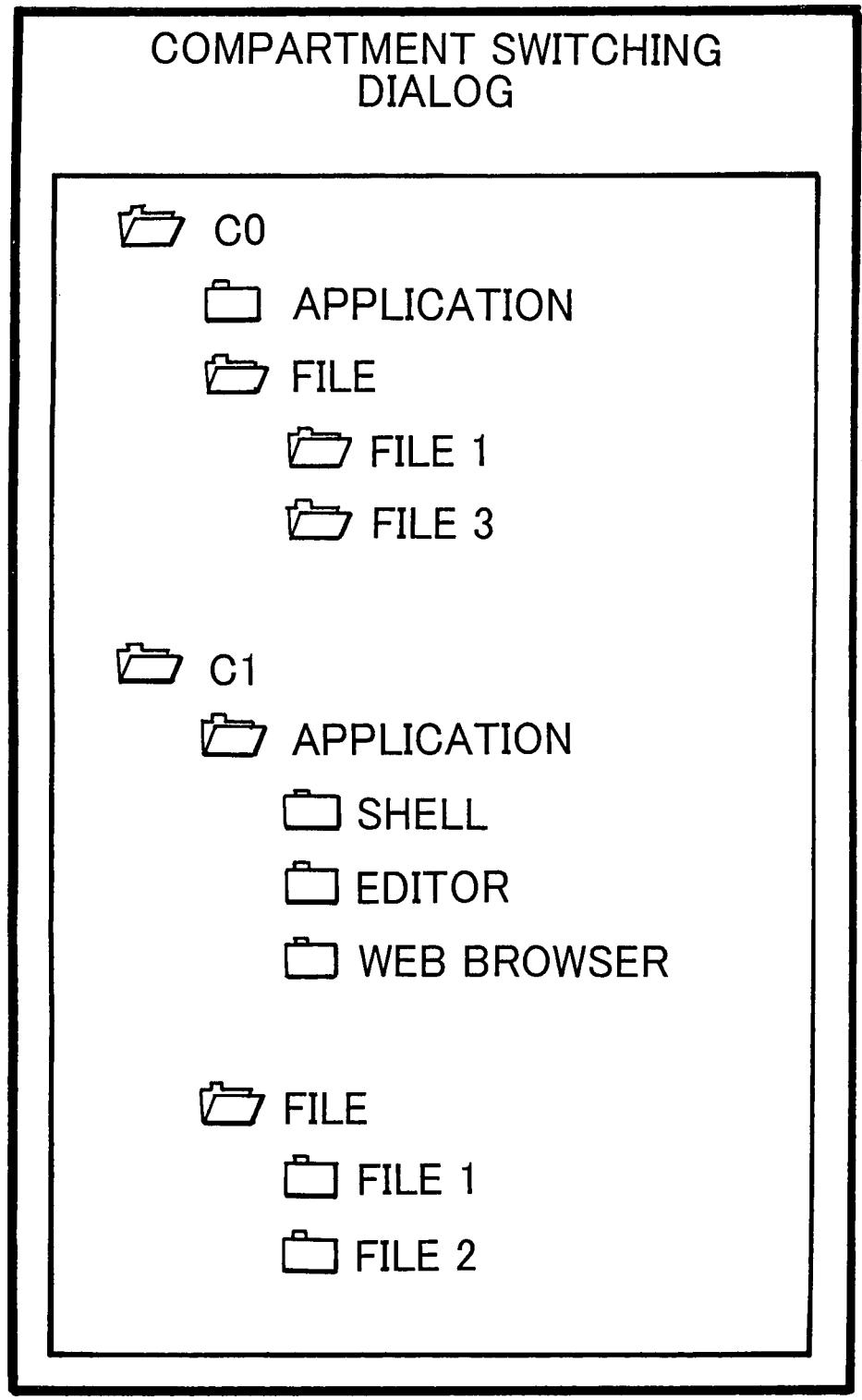
FIG. 40 is a schematic illustration of another compartment switching dialog that a user terminal can display in the third embodiment.

Alternatively, the compartment switching means 226 may have a file list of each compartment displayed with the list of applications 21 in the compartment switching dialog in Step S102 as shown in FIG. 40. With this arrangement, the user can easily confirm the compartment to which a piece of information belongs.

INDUSTRIAL APPLICABILITY

The present invention can find applications in the field of file server apparatus for sharing in-house document files and that of programs for realizing such file servers by means of computers. Additionally, the present invention can find applications in the filed of file exchange apparatus for exchanging/sharing files via networks and that of programs for realizing such file exchange apparatus by means of computers.

The invention claimed is:

1. A multi-level security information sharing system using a computer for sharing information within groups, comprising:

group management means arranged in a server configured to: manage interactions between each of the groups and members belonging to the group; and output group identification information for identifying at least one of the groups when member identification information for identifying the members is input;

compartment generation means configured to generate a respective compartment dedicated to each respective one of the groups, said compartment generation means arranged in a user terminal communicably connected to the server via a communication network, the compartment comprising computing resources including application software and files associated and assigned to the group based on the group identification information, the compartment being configured to have a belonging relation to make a relationship among the groups analyzable, the compartment being associated with a group security level wherein the group security level ranges from a lowest level of security to a highest level of security; and monitoring means configured to: monitor the operation of the application software accessing the computing resources, said monitoring means arranged in the user terminal; analyze the belonging relation of the compartment and the application software; and control authorization/non-authorization of execution of input/output processes between the application software and the computing resources based on the result of the analysis, said monitoring means comprising:

means for managing a compartment configuration graph of nodes and edges connecting the nodes as a graph of a data structure showing at least the belonging relation of compartments and pieces of application software in an analyzable manner, the compartment configuration graph initially comprising initial nodes having lowest security, the means for managing the compartment configuration graph registers a newly generated compartment as a generated node in the compartment configuration graph by adding the generated node to a position linked to at least one of the initial nodes by at least a single directed edge; and means for independently generating a file arrangement table for each compartment based on the compartment configuration graph, the file arrangement table indicating the file arrangement corresponding to a respective one of the nodes, when an application having a belonging relation with a higher order compartment updates a file belonging to a lower order compartment, the updated file is stored as a separate file entity and the file arrangement table of the higher order compartment is updated to reflect a new arrangement address for the updated file without updating the file arrangement table of the lower order compartment, the compartment generating means storing the updated file arrangement table as an attribute of the node, wherein the compartment generating means generates an object tree showing a tree structure of objects corresponding to the respective node, and stores the object tree in the compartment graph as attributes of the node; and when a message is transmitted from a first application to a second application, the monitoring means merges the object tree that corresponds to the compartment to which the first application belongs and the object tree that corresponds to the compartment to which the second application belongs, determines whether the message is authorized to reach the second application from the first application based on the merged tree, and controls authorization/non-authorization of execution of transmission of the message based on result of the determination.

2. The information sharing system according to claim 1, wherein, said group management means is configured to:
associate the group identification information for identifying the group and the member identification information for identifying the members and accumulates these pieces of information;
extract, when the member identification information is received from the user terminal, the group identification information corresponding to the received member identification information; and
transmit the extracted group identification information to the user terminal via the communication network; and said compartment generation means is configured to generate the compartment that corresponds to the group based on the group identification information, and said monitoring means is configured to:
monitor the operation of the application software installed in the user terminal,
identify, when an event of the application software is detected, the compartment to which the application software of which the event is detected belongs, and
control authorization/non-authorization of execution of an input/output process corresponding to the event between the application software and the computing resources based on the identified compartment.

3. The information sharing system according to claim 1, wherein said group management means is configured to output a combination of at least one or more than one group identifiers and an authentication key as group identification information based on the member identification information.

4. The information sharing system according to claim 1, wherein said monitoring means is configured to control authorization or non-authorization of execution of at least a file input/output event or a network input/output event for authorization or non authorization of execution of the input/output process.

5. The information sharing system according to claim 2, wherein said compartment generation means is configured to generate the compartment by generating predetermined configuration information based on the group identification information.

6. The information sharing system according to claim 1, wherein
said group management means includes means for generating an adjacency matrix showing the inclusion relation between a plurality of the groups; and
said compartment generation means includes means for defining the order relation between compartments by adding a directed edge between the generated compartments based on the adjacency matrix.

7. The information sharing system according to claim 1, wherein said monitoring means includes means for limiting the range within which the application software can transmit the message in a same host computer to the compartment to which the application software belongs or to application software belonging to any of lower order compartments relative to the former compartment based on the compartment configuration graph.

8. The information sharing system according to claim 1, wherein said monitoring means includes means for limiting the range within which the application software can transmit the message in a same host computer or some other computer other than the host computer connected via a network to the pieces of application software belonging to the same compartment.

9. The information sharing system according to claim 1, wherein said monitoring means includes means for altering the compartment to which a piece of application software belongs and managing the files of each compartment according to a directive from the user.

10. The information sharing system according to claim 1, wherein said group management means includes means for performing at least one of preparing a new group, deleting a group, adding a group and excluding a member.

11. A user terminal used in a multi-level security information sharing system for sharing information within a group, comprising:

compartment generation means configured to generate a compartment dedicated to the group, the compartment comprising computing resources including application software and files in the user terminal associated and assigned to the group based on the combination of a group identifier and an authentication key for identifying the group, the compartment being configured to have a belonging relation to make a relationship among the groups analyzable, the compartment being associated with a group security level wherein the group security level ranges from a lowest level of security to a highest level of security; and monitoring means configured to monitor the operation of the application software accessing the computing resources, said monitoring means comprising:

means for analyzing the belonging relation of each compartment and application software and controlling authorization/non-authorization of execution of at least either a file input/output event or a network input/output event based on the belonging relation;

means for managing a compartment configuration graph of nodes and edges connecting the nodes as a graph of a data structure showing at least the belonging relation of compartments and pieces of application software in an analyzable manner, the compartment configuration graph initially comprising initial nodes having lowest security, the means for managing the compartment configuration graph registers a newly generated compartment as a generated node in the compartment configuration graph by adding the generated node to a position linked to at least one of the initial nodes by at least a single directed edge; and means for independently generating a file arrangement table for each compartment based on the compartment configuration graph, the file arrangement table indicating the file arrangement corresponding to a respective one of the nodes, when an application having a belonging relation with a higher order compartment updates a file belonging to a lower order compartment, the updated file is stored as a separate file entity and the file arrangement table of the higher order compartment is updated to reflect a new arrangement address for the updated file without updating the file arrangement table of the lower order compartment, the compartment generating means storing the updated file arrangement table as an attribute of the node, wherein the compartment generating means generates an object tree showing a tree structure of objects corresponding to the respective node, and stores the object tree in the compartment graph as attributes of the node; and when a message is transmitted from a first application to a second application, the monitoring means merges the object tree that corresponds to the compartment to which the first application belongs and the object tree that corresponds to the compartment to which the second application belongs, determines whether the message is authorized to reach the second application from the first application based on the merged tree, and controls authorization/non-authorization of execution of transmission of the message based on result of the determination.

12. The user terminal according to claim 11, further comprising:

means for generating an adjacency matrix showing the inclusion relation between a plurality of the groups; and means for defining the order relation among compartments by adding one or more than one directed edges among the compartments based on the adjacency matrix.

13. A multi-level security information sharing method of sharing information within groups by means of an information sharing system comprising a server and a user terminal communicably connected to the server via a communication network, comprising:

a step in which the server manages interactions of the group and members belonging to the group and transmits a combination of at least one or more than one group identifiers and an authentication key to the user terminal via the communication network upon receiving member identification information for identifying a member;

a step in which the user terminal generates a compartment dedicated to a respective one of the groups, the compartment comprising computing resources including application software and files associated and assigned to the group, the compartment being configured to make a relationship among the groups analyzable, corresponding to each combination of the group identifiers and the authentication key received from the server, the compartment being associated with a group security level wherein the group security level ranges from a lowest level of security to a highest level of security;

a step in which the user terminal generates a compartment configuration graph as a graph of a data structure including at least one piece of information of order relations among compartments, a belonging relation between a compartment and the application software or a belonging relation between a compartment and a file, the compartment configuration graph initially comprising initial nodes having lowest security, a newly generated compartment being registered as a generated node in the compartment configuration graph by adding the generated node to a position linked to at least one of the initial nodes by at least a single directed edge;

a step in which the user terminal monitors the operation of the application software and controls authorization or non-authorization of execution of at least a file input/output event or a network input/output event based on the compartment configuration graph; and a step in which the user terminal independently generates a file arrangement table for each compartment based on the compartment configuration graph, the file arrangement table indicating the file arrangement corresponding to a respective one of the nodes, when an application having a belonging relation with a higher order compartment updates a file belonging to a lower order compartment, the updated file is stored as a separate file entity and the file arrangement table of the higher order compartment is updated to reflect a new arrangement address for the updated file without updating the file arrangement table of the lower order compartment, and a step of storing the updated file arrangement table as an attribute of the node, wherein the compartment generating step generates an object tree showing a tree structure of objects corresponding to the node, and stores the object tree in the compartment graph as attributes of the node; and when a message is transmitted from a first application to a second application, the monitoring step merges the object tree that corresponds to a compartment to which the first application belongs and the object tree that corresponds to a compartment to which the second application belongs, determines whether the message is authorized to reach the second application from the first application based on the merged tree, and controls authorization/non-authorization of execution of transmission of the message based on result of the determination.

14. The multi-level security information sharing method according to claim 13, further comprising:
a step in which the server generates an adjacency matrix showing the inclusion relation between the group and another group upon receiving the member identification information;
a step in which the server transmits the generated adjacency matrix to the user terminal via the communication network along with the combination of the group identifiers and the authentication key, wherein the belonging relation between a compartment and application software or the belonging relation between a compartment and a file is based on each combination of the group identifier and the authentication key and the adjacency matrix received from the server; and
a step in which the user terminal monitors the operation of the application software and controls authorization/non-authorization of execution of the application software so as to authorize an access to and read the information belonging to the compartment of the group from the application software belonging to the compartment of the other group.

15. A computer readable storage device storing a program of instructions executable by a machine to perform a method for compartment management to be used by a multi-level security information sharing system for sharing information within a group, the program causing a computer to execute:
a process of generating a compartment dedicated to a group, the compartment arranged in a user terminal communicably connected to a server via a communication network, the compartment comprising computing resources including software and files in the computer associated and assigned to the group, the compartment being so configured as to make a relationship among the groups analyzable, corresponding to each combination of a group identifier for identifying the group and an authentication key, the compartment being associated with a group security level wherein the group security level ranges from a lowest level of security to a highest level of security;
a process of generating a compartment configuration graph of nodes and edges connecting the nodes as a graph of a data structure including at least one piece of information of order relations among compartments, a belonging relation between a compartment and application software or a belonging relation between a compartment and a file, the compartment configuration graph initially comprising initial nodes having lowest security and registering a newly generated compartment as a generated node in the compartment configuration graph by adding the generated node to a position linked to at least one of the initial nodes by at least a single directed edge;
a process of monitoring the operation of the application software and controlling authorization or non-authorization of execution of at least a file input/output event or a network input/output event based on the compartment configuration graph;
a process of independently generating a file arrangement table for each compartment based on the compartment configuration graph, the file arrangement table indicating the file arrangement corresponding to a respective one of the nodes;
when an application having a belonging relation with a higher order compartment updates a file belonging to a lower order compartment, the updated file is stored as a separate file entity and the file arrangement table of the higher order compartment is updated to reflect a new arrangement address for the updated file without updating the file arrangement table of the lower order compartment; and
a process of storing the updated file arrangement table as an attribute of the node, wherein
the compartment generating process generates an object tree showing a tree structure of objects corresponding to the respective node, and stores the object tree in the compartment graph as attributes of the node; and
when a message is transmitted from a first application to a second application, the monitoring process merges the object tree that corresponds to the compartment to which the first application belongs and the object tree that corresponds to the compartment to which the second application belongs, determines whether the message is authorized to reach the second application from the first application based on the merged tree, and controls authorization/non-authorization of execution of transmission of the message based on result of the determination.

16. The computer readable storage device according to claim 15, wherein said process of generating a compartment configuration graph further comprises a process of inputting an adjacency matrix representing the inclusion relation of the group and some other group along with each combination of the group identifier and the authentication key, and generating a compartment configuration graph based on each combination of the group identifier and the authentication key and the adjacency matrix.

17. A multi-level security information sharing system using a computer for sharing information within groups, comprising:
a group manager arranged in a server configured to:
manage interactions between each of the groups and members belonging to the group; and
output group identification information for identifying at least one of the groups when member identification information for identifying the members is input;
a compartment generator configured to generate a compartment dedicated to a group, the compartment generator arranged in a user terminal communicably connected to the server via a communication network, the compartment comprising computing resources including application software and files in the computer associated and assigned to the group based on the group identification information, the compartment being configured to have a belonging relation to make a relationship among the groups analyzable, the compartment being associated with a group security level wherein the group security level ranges from a lowest level of security to a highest level of security; and
a monitor configured to:
monitor the operation of the application software accessing the computing resources, the monitor arranged in the user terminal;
analyze the belonging relation of the compartment and the application software; and control authorization/non-authorization of execution of input/output processes between the application software and the computing resources based on the result of the analysis, said monitor comprising:

a manager unit configured to manage a compartment configuration graph of nodes and edges connecting the nodes as a graph of a data structure showing at least the belonging relation of compartments and pieces of application software in an analyzable manner, the compartment configuration graph initially comprising initial nodes having lowest security, the manager unit registers a newly generated compartment as a generated node in the compartment configuration graph by adding the generated node to a position linked to at least one of the initial nodes by at least a single directed edge; and a generator unit configured to independently generate a file arrangement table for each compartment based on the compartment configuration graph, the file arrangement table indicating the file arrangement corresponding to a respective one of the nodes, when an application having a belonging relation with a higher order compartment updates a file belonging to a lower order compartment, the updated file is stored as a separate file entity and the file arrangement table of the higher order compartment is updated to reflect a new arrangement address for the updated file without updating the file arrangement table of the lower order compartment, the compartment generator storing the updated file arrangement table as an attribute of the node, wherein the compartment generator generates an object tree showing a tree structure of objects corresponding to the respective node, and stores the object tree in the compartment graph as attributes of the node; and when a message is transmitted from a first application to a second application, the monitor merges the object tree that corresponds to the compartment to which the first application belongs and the object tree that corresponds to the compartment to which the second application belongs, determines whether the message is authorized to reach the second application from the first application based on the merged tree, and controls authorization/non-authorization of execution of transmission of the message based on result of the determination.

18. A user terminal used in a multi-level security information sharing system for sharing information within a group, comprising:

a compartment generator configured to generate a compartment dedicated to the group, the compartment comprising computing resources including software and files in the user terminal associated and assigned to the group based on the combination of a group identifier and an authentication key for identifying the group, the compartment being configured to make a relationship among the groups analyzable, the compartment being associated with a group security level wherein the group security level ranges from a lowest level of security to a highest level of security; and a monitor configured to monitor the operation of the application software accessing the computing resources, said monitor comprising:

an analyzer unit configured to analyze a belonging relation of each compartment and application software and controlling authorization/non-authorization of execution of at least either a file input/output event or a network input/output event based on the belonging relation;

a manager unit configured to manage a compartment configuration graph of nodes and edges connecting the nodes as a graph of a data structure showing at least the belonging relation of compartments and pieces of application software in an analyzable manner, the compartment configuration graph initially comprising initial nodes having lowest security, the manager unit registers a newly generated compartment as a generated node in the compartment configuration graph by adding the generated node to a position linked to at least one of-the initial nodes by at least a single directed edge; and a generator unit configured to independently generate a file arrangement table for each compartment based on the compartment configuration graph, the file arrangement table indicating the file arrangement corresponding to a respective one of the nodes, when an application having a belonging relation with a higher order compartment updates a file belonging to a lower order compartment, the updated file is stored as a separate file entity and the file arrangement table of the higher order compartment is updated to reflect a new arrangement address for the updated file without updating the file arrangement table of the lower order compartment, the compartment generator storing the updated file arrangement table as an attribute of the node, wherein the compartment generator generates an object tree showing a tree structure of objects corresponding to the respective node, and stores the object tree in the compartment graph as attributes of the node; and when a message is transmitted from a first application to a second application, the monitor merges the object tree that corresponds to the compartment to which the first application belongs and the object tree that corresponds to the compartment to which the second application belongs, determines whether the message is authorized to reach the second application from the first application based on the merged tree, and controls authorization/non-authorization of execution of transmission of the message based on result of the determination.

* * * * *